(12) United States Patent
Hamada et al.

(10) Patent No.: US 6,628,592 B2
(45) Date of Patent: Sep. 30, 2003

(54) RECORDING APPARATUS, RECORDING METHOD, PLAYBACK APPARATUS, PLAYBACK METHOD, RECORDING/PLAYBACK APPARATUS, RECORDING/PLAYBACK METHOD, PRESENTATION MEDIUM AND RECORDING MEDIUM

(75) Inventors: Toshiya Hamada, Saitama (JP); Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/120,273

(22) Filed: Apr. 10, 2002

(65) Prior Publication Data

US 2002/0110058 A1 Aug. 15, 2002

Related U.S. Application Data

(62) Division of application No. 09/174,845, filed on Oct. 19, 1998.

(30) Foreign Application Priority Data

| Oct. 21, 1997 | (JP) | ............................................ P09-288182 |
| Feb. 27, 1998 | (JP) | ............................................ P10-046859 |
| Apr. 24, 1998 | (JP) | ............................................ P10-114566 |
| Apr. 24, 1998 | (JP) | ............................................ P10-114568 |

(51) Int. Cl.⁷ .................................................. G11B 7/00
(52) U.S. Cl. .................................. 369/53.21; 369/47.13; 369/83; 369/275.1
(58) Field of Search .............................. 369/47.1, 47.12, 369/47.13, 47.24, 47.55, 53.1, 53.12, 53.2, 53.21, 53.31, 53.45, 59.1, 83, 84, 275.1, 275.5

(56) References Cited

U.S. PATENT DOCUMENTS

| 4,695,993 A | | 9/1987 | Takagi et al. |
| 5,546,365 A | | 8/1996 | Roth |
| 5,729,516 A | * | 3/1998 | Tozaki et al. ............ 369/53.21 |
| 5,764,607 A | * | 6/1998 | Maeda et al. ............ 369/47.12 |
| 5,825,736 A | | 10/1998 | Kimura et al. |
| 6,070,799 A | | 6/2000 | Ashe |
| 6,157,606 A | | 12/2000 | Inazawa et al. |

FOREIGN PATENT DOCUMENTS

| EP | 406 021 | 1/1991 |
| EP | 676 761 | 10/1995 |
| EP | 694 918 | 1/1996 |
| EP | 737 974 | 10/1996 |
| GB | 2 219 886 | 12/1989 |

* cited by examiner

*Primary Examiner*—Muhammad Edun
(74) *Attorney, Agent, or Firm*—Frommer Lawrence & Haug LLP; William S. Frommer

(57) ABSTRACT

This invention relates to a recording apparatus for recording a plurality of pieces of data into a recording medium is characterized in that the recording apparatus including a specifying means for specifying that a write operation over a combination of the pieces of data is prohibited, a judgment means for forming a judgment on what is specified for a predetermined piece of data by the specifying means in response to a command to perform a recording operation over the piece of data, and a control means for controlling an operation to record the pieces of data into the recording medium in accordance with a result of a judgment formed by the judgment means; and relates to a recording method adopted in a recording apparatus for recording a plurality of pieces of data into a recording medium is characterized in that the recording method including a specifying step of specifying that a write operation over a combination of the pieces of data is prohibited, a judgment step of forming a judgment on what is specified for a predetermined piece of data at the specifying step in response to a command to perform a recording operation over the piece of data, and a control step of controlling an operation to record the pieces of data into the recording medium in accordance with a result of a judgment formed at the judgment step.

54 Claims, 44 Drawing Sheets

FIG. 2

| Syntax | Number of Bits | Mnemonic |
|---|---|---|
| VOLUME.TOC{ | | |
|     file_type_id | 8*16 | char[16] |
|     volume_information() | | |
|     text_block() | | |
| } | | |

FIG. 3

| Syntax | Number of Bits | Mnemonic |
|---|---|---|
| volume_information(){ | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
|---|---|---|
| volume_attribute(){ | | |
|     volume_attribute_length | 32 | uimsbf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG. 5

| Syntax | Number of Bits | Mnemonic |
|---|---|---|
| resume() { | | |
|     resume_length | 32 | uimsbf |
|     reserved    // for byte alignment | 3 | bslbf |
|     resume_switch | 1 | bit |
|     reserved | 4 | bslbf |
|     number_of_records | 4 | uimsbf |
|     reserved    // for byte alignment | 7 | bslbf |
|     resume_auto_execute_time_flag | 1 | bit |
|     resume_auto_execute_time() | 4*14 | bcd |
|     reserved | 4 | bslbf |
|     resume_auto_execute_record_number | 4 | uimsbf |
|     for(i=0;i<number_of_records;i++) { | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
|         switch(object_type) { | | |
|             case title: | | |
|                 title_number | 16 | uimsbf |
|                 title_local_time_stamp | 64 | uimsbf |
|                 break; | | |
|             case program: | | |
|                 program_number | 16 | uimsbf |
|                 program_local_time_stamp | 64 | uimsbf |
|                 break; | | |
|             case program_bind: | | |
|                 program_bind_number | 16 | uimsbf |
|                 program_order | 16 | uimsbf |
|                 program_number | 16 | uimsbf |
|                 program_local_time_stamp | 64 | uimsbf |
|                 break; | | |
|             case play_item: | | |
|                 play_item_number | 16 | uimsbf |
|                 play_item_local_time_stamp | 64 | uimsbf |
|                 break | | |
|         } | | |
|     } | | |
| } | | |

FIG. 6

| Syntax | Number of Bits | Mnemonic |
|---|---|---|
| volume_rating() { | | |
|    volume_rating_id | 8*16 | char[16] |
|    volume_rating_length | 32 | uimsbf |
|    reserved | 6 | bslbf |
|    volume_rating_type | 2 | bslbf |
|    volume_rating_password | 128 | bslbf |
|    switch (volume_rating_type) { | | |
|     case age_limited: | | |
|        number_of_rating | 8 | uimsbf |
|        for (i=0;i<number_of_rating;i++) { | | |
|           country_code_for_rating | 24 | bslbf |
|           age_for_volume_rating | 8 | uimsbf |
|        } | | |
|        break; | | |
|     case CARA: | | |
|        reserved | 4 | bslbf |
|        CARA_category | 4 | bslbf |
|        reserved | 24 | bslbf |
|        break; | | |
|     case RSAC: | | |
|        reserved | 4 | bslbf |
|        RSAC_category | 4 | bslbf |
|        reserved | 4 | bslbf |
|        RSAC_level | 4 | bslbf |
|        reserved | 16 | bslbf |
|        break; | | |
|    } | | |
| } | | |

F I G. 7

| Syntax | Number of Bits | Mnemonic |
|---|---|---|
| write_protect() { | | |
|     write_protect_length | 32 | uimsbf |
|     volume_write_protect_level | 4 | uimsbf |
|     password_enable_flag | 1 | bslbf |
|     append_only_flag | 1 | bslbf |
|     expiration_time_enable_flag | 1 | bslbf |
|     number_of_times_enable_flag | 1 | bslbf |
|     password_for_volume_write_protect | 128 | bslbf |
|     reserved | 8 | bslbf |
|     write_protect_set_time() | 56 | bcd |
|     reserved | 8 | bslbf |
|     write_protect_expiration_time() | 56 | bcd |
|     number_of_times | 16 | uimsbf |
| } | | |

F I G. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     reserved | 8 | bslbf |
|     play_protect_set_time() | 56 | bcd |
|     reserved | 8 | bslbf |
|     play_protect_expiration_time() | 56 | bcd |
|     number_of_times | 16 | uimsbf |
| } | | |

F I G. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0;i<number_of_entry;i++) { | | |
|         date_and_time | | |
|         channel | | |
|         program | | |
|         : | | |
|     } | | |
| } | | |

FIG. 10

| Syntax | Number of Bits | Mnemonic |
|---|---|---|
| text_block() { | | |
|     text_block_length | 32 | uimsbf |
|     number_of_language_sets | 8 | uimsbf |
|     number_of_text_items | 16 | uimsbf |
|     for(i=0;i<number_of_language_sets;i++) { | | |
|         language_set() | | |
|     } | | |
|     for(i=0;i<number_of_text_items;i++) { | | |
|         text_item() | | |
|     } | | |
| } | | |

FIG. 11

| Syntax | Number of Bits | Mnemonic |
|---|---|---|
| language_set() { | | |
|     reserved | 8 | bslbf |
|     language_code | 24 | bslbf |
|     character_set_type | 8 | bslbf |
|     number_of_language_set_names | 8 | uimsbf |
|     for(i=0;i<number_of_language_set_names;i++) { | | |
|         character_set_type_for_name | 8 | bslbf |
|         language_set_name_length | 8 | uimsbf |
|         language_set_name | 8*language_set_name_length | bslbf |
|     } | | |
| } | | |

FIG. 12

| Syntax | Number of Bits | Mnemonic |
|---|---|---|
| text_item() { | | |
|     text_item_length | 16 | uimsbf |
|     text_item_id | 16 | uimsbf |
|     text_item_sub_id | 16 | uimsbf |
|     flags | 8 | bslbf |
|     number_of_used_language_sets | 8 | uimsbf |
|     //loop for each language set | | |
|     for(i=0;i<number_of_used_language_sets;i++) { | | |
|         language_set_id | 8 | uimsbf |
|         reserved | 4 | bslbf |
|         text_string_length | 16 | uimsbf |
|         text_string | 8*text_string_length | bslbf |
|         bitmap() | | |
|     } | | |
|     stuffing_bytes | 8*n | bslbf |
| } | | |

FIG. 13

| Syntax | Number of Bits | Mnemonic |
|---|---|---|
| ALBUM.STR{ | | |
|     file_type_id | 8*16 | char[16] |
|     album() | | |
|     text_block() | | |
| } | | |

FIG. 14

| Syntax | Number of Bits | Mnemonic |
|---|---|---|
| album() { | | |
|   album_length | 32 | uimsbf |
|   reserved | 6 | bslbf |
|   volume_status | 1 | bslbf |
|   if (volume_status== "1b" ) { | | |
|     chief_volume_flag | 1 | bslbf |
|   } else { | | |
|     reserved | 1 | "0" |
|   } | | |
| | | |
|   if (volume_status== "1b" ) { | | |
|     if (chief_volume_flag== "1b" ) { | | |
|       reserved | 6 | bslbf |
|       album_type | 2 | bslbf |
|       albim_id | 128 | bslbf |
| | | |
|         number_of_discs_in_album | 16 | uimsbf |
|         number_of_volumes_in_album | 16 | uimsbf |
| | | |
|         for (i=0;i<number_of_volumes_in_album;i++) { | | |
|           disc_id_for_album_member | 128 | bslbf |
|           volume_id_for_album_member | 128 | bslbf |
|           title_offset_number | 16 | uimsbf |
|         } | | |
|         reserved_for_program_bind | 8 | bslbf |
|         number_of_program_binds | 8 | uimsbf |
|         for (i=0;i<number_of_program_binds;i++) { | | |
|           number_of_program_in_this_program_bind | 16 | uimsbf |
|           for(i=0;i<number_of_programs_in_this_program_bind;i++){ | | |
|             disc_id_for_program_bind_member | 128 | uimsbf |
|             volume_id_for_program_bind_member | 128 | uimsbf |
|             program_number | 16 | uimsbf |
|           } | | |
|         } | | |
|     }else{        //chief_volume_flag== "0b" | | |
|       chief_disc_id | 128 | uimsbf |
|       chief_volume_id | 128 | uimsbf |
|       (album_id | 128 | bslbf |
|     } | | |
|   } | | |
| } | | |

F I G. 15

| Syntax | Number of Bits | Mnemonic |
|---|---|---|
| TITLE_###. VDR{ | | |
|     file_type_id | 8*16 | char [16] |
|     title_info() | | |
|     text_block() | | |
| } | | |

F I G. 16

| Syntax | Number of Bits | Mnemonic |
|---|---|---|
| title_info() { | | |
|     title_info_length | 32 | uimsbf |
|     flags_for_title | 32 | bslbf |
|     cgit_file_id | 16 | uimsbf |
|     title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for (i=0;i<number_of_marks;i++) { | | |
|         reserved | 4 | bslbf |
|         mark_type | 4 | bslbf |
|         mark_chunk_group_time_stamp | 64 | uimsbf |
|     } | | |
|     stuffing_bytes | 8*n | bslbf |
| } | | |

F I G. 17

| Syntax | Number of Bits | Mnemonic |
|---|---|---|
| PROGRAM_$$$.PGI { | | |
|     file_type_id | 8*16 | char[16] |
|     program() | | |
|     text_block() | | |
| } | | |

FIG. 18

| Syntax | Number of Bits | Mnemonic |
|---|---|---|
| program() { | | |
|     program_length | 32 | uimsbf |
|     flags_for_program | 32 | bslbf |
|     program_status | 4 | bslbf |
|     program_playback_time() | 32 | bcd |
|     reserved | 32 | bslbf |
|     number_of_play_sequences | 16 | uimsbf |
|     for(j=0;j<number_of_play_sequence;j++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

FIG. 19

| Syntax | Number of Bits | Mnemonic |
|---|---|---|
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=1;PIN<=number_of_play_items_in_program;PIN++) { | | |
|         play_item() | | |
|     } | | |
| } | | |

FIG. 20

| Syntax | Number of Bits | Mnemonic |
| --- | --- | --- |
| play_item() { | | |
|     play_item_length | 32 | uimsbf |
|     play_item_type | 8 | bslbf |
|     play_mode | 8 | bslbf |
|     total_playback_time() | 32 | bcd |
| | | |
|     menu_item_number | 16 | uimsbf |
|     return_item_number | 16 | uimsbf |
|     next_item_number | 16 | uimsbf |
|     prev_item_number | 16 | uimsbf |
| | | |
|     if(play_item_type= "0000b" ){ | | |
|       //play item for one "cut" | | |
|       title_number | 16 | uimsbf |
|       //IN point | | |
|       item_start_time_stamp | 64 | uimsbf |
|       //OUT point | | |
|       item_end_time_stamp | 64 | uimsbf |
|     } | | |
| } | | |

FIG. 21

| Syntax | Number of Bits | Mnemonic |
| --- | --- | --- |
| CHUNKGROUP_###.CGIT{ | | |
|     file_type_id | 8*16 | char[16] |
| | | |
|     chunkgroup_time_base_flags | 32 | bslbf |
|     chunkgroup_time_base_offset | 64 | uimsbf |
| | | |
|     chunk_connection_info() | | |
|     text_block() | | |
| } | | |

FIG. 22

| Syntax | Number of Bits | Mnemonic |
|---|---|---|
| chunk_connection_info() { | | |
|     chunk_connection_info_length | 32 | uimsbf |
|     reserved | 16 | bslbf |
|     number_of_chunks | 16 | uimsbf |
|     chunk_sync_play_flag | 8 | bslbf |
|     // chunk info file list | | |
|     for( i =0; i <number_of_chunks;i++) { | | |
|         chunk_arrangement_info() | | |
|     } | | |
| } | | |

FIG. 23

| Syntax | Number of Bits | Mnemonic |
|---|---|---|
| chunk_arrangement_info() { | | |
|     chunk_arrangement_info_length | 32 | uimsbf |
|     chunk_info_file_id | 16 | bslbf |
|     reserved | 5 | bslbf |
|     chunk_switch_stream_id | 16 | bslbf |
|     presentation_start_cg_time_count | 64 | uimsbf |
|     presentation_end_cg_time_count | 64 | uimsbf |
|     reserved | 4 | bslbf |
|     chunk_time_count_type | 4 | bslbf |
|     number_of_start_original_time_count_extension | 8 | uimsbf |
|     number_of_end_original_time_count_extension | 8 | uimsbf |
|     // presentation start position and time | | |
|     presentation_start_original_time_count | 64 | uimsbf |
|     presentation_end_original_time_count | 64 | uimsbf |
|     for(i=0;j<number_of_start_original_time_count_extension;j++) | | |
|         tc_ext_attributes | 16 | bslbf |
|         start_original_time_count_extension | 64 | uimsbf |
|     } | | |
|     // presentation end position and time | | |
|     for(k=0;k<number_of_end_original_time_count_extension;k++) { | | |
|         tc_ext_attributes | 16 | bslbf |
|         end_original_time_count_extension | 64 | uimsbf |
|     } | | |
|     transition_info() | | |
| } | | |

FIG. 24

| Syntax | Number of Bits | Mnemonic |
|---|---|---|

```
CHUNK_XXXX.ABST{
    file_type_id                                    8*16    char[16]
    reserved                                        4       bslbf
    chunk_file_id                                   16      uimsbf
    info_type                                       4       bslbf
    //stream_info()

if (info_type== "MPEG2_System_TS" ) {
        number_of_programs                          8       uimsbf
    else {
        number_of_programs                          8       "0000 0001"
    }
    for(i=0;i<number_of_programs;i++){
        number_of_streams                           8       uimsbf
        for (i=0;i<number_of_streams;i++) {
            stream_identifier                       16      bslbf //slot type information                 4
            reserved                                4       bslbf
            slot_unit_type                                  bslbf
            if (slot_unit_type== "time_stamp" ) {   32
                slot_time_length                            uimsbf
            } else {                                32
                reserved                                    bslbf
            }                                       32
            number_of_slots                         4       uimsbf
            reserved                                        bslbf
            switch(info_type)
                case MPEG1_System:
                case MPEG2_System_PS:
                case MPEG2_System_TS:
                case video_elementary_stream        4
                    number_of_I_pictures_in_slot            uimsbf
                    break;
                default:                            4
                    reserved                                bslbf
                    break;
            }

//stream attribute
            ES_attribute()
        }

//loop of slot info
        for (i=0;i<number_of_streams;i++) {
            for (i=0;i<number_of_slots;i++) {
                slot_info()
            }
        }
    }
}
```

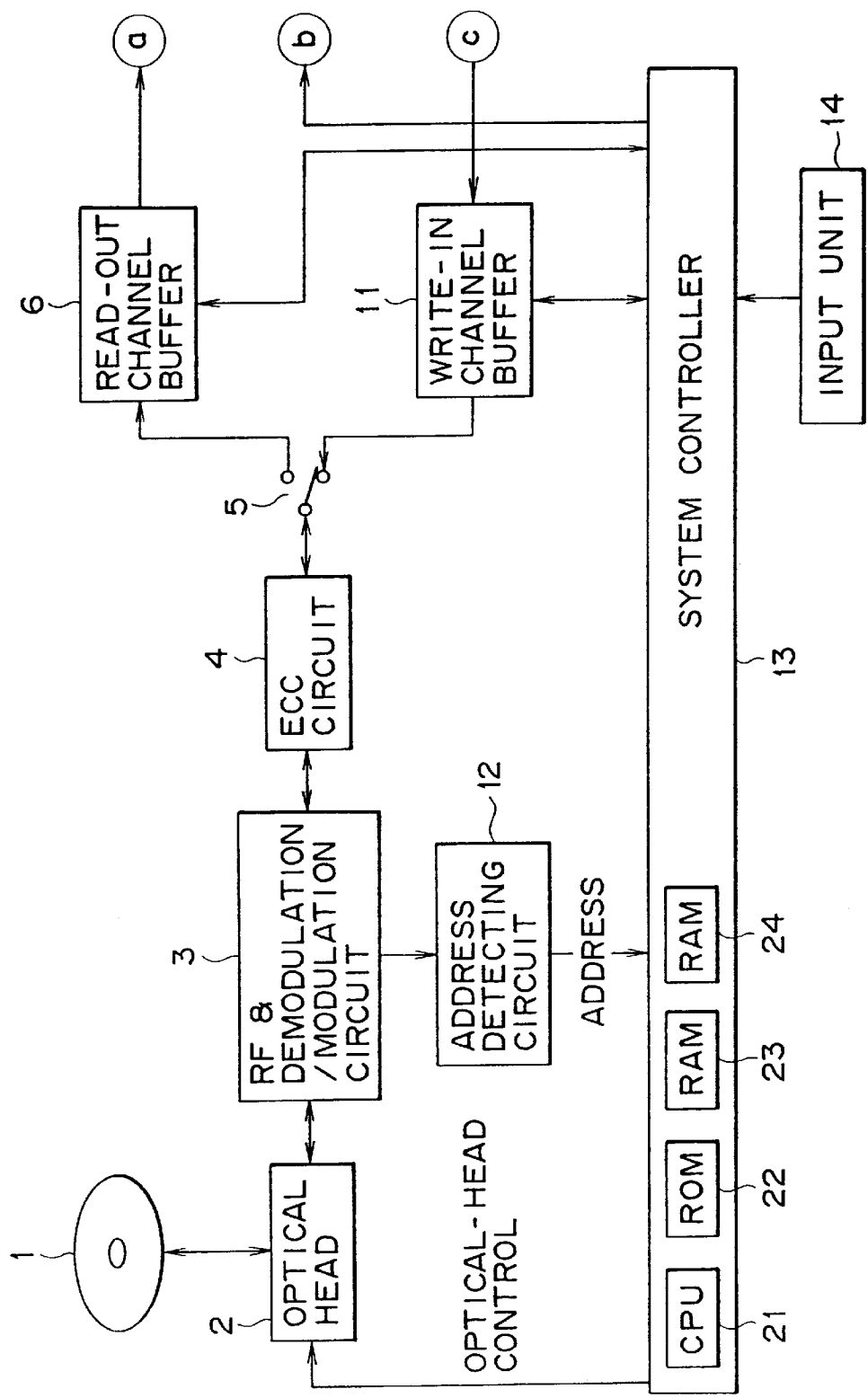

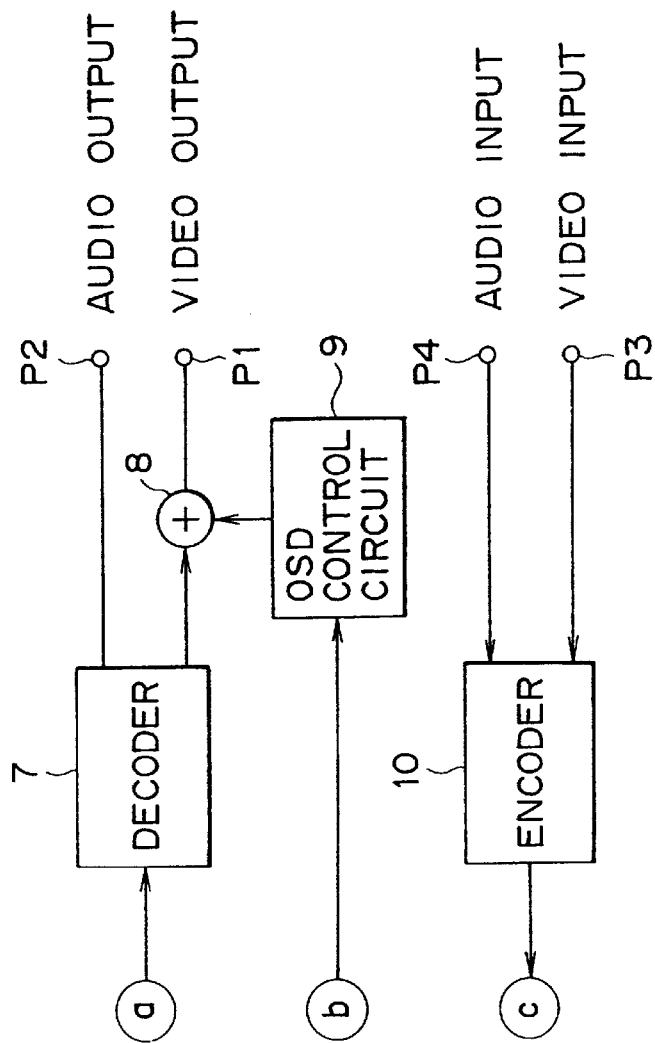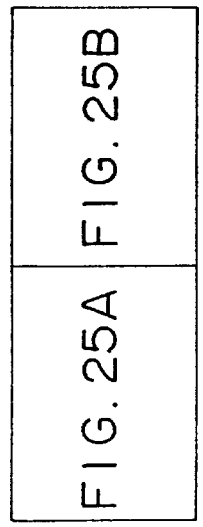

FIG.26

```
|———VOLUME.TOC
   —ALBUM.STR
   —PROGRAM
   |      —PROGRAM_001.PGI
   —TITLE
   |      —TITLE_001.VDR
   |      —TITLE_002.VDR
   |      —TITLE_003.VDR
   |
   —CHUNKGROUP
   |      —CHUNKGROUP_001.CGIT
   |      —CHUNKGROUP_002.CGIT
   |
   —CHUNK
   |      —CHUNK_0001.ABST
   |      —CHUNK_0011.ABST
   |      —CHUNK_0012.ABST
   |
   —MPEGAV
          —STREAMS_001
          |      —CHUNK_0001.MPEG2
          |
          —STREAMS_002
                 —CHUNK_0011.MPEG2
                 —CHUNK_0012.MPEG2
```

F I G. 27
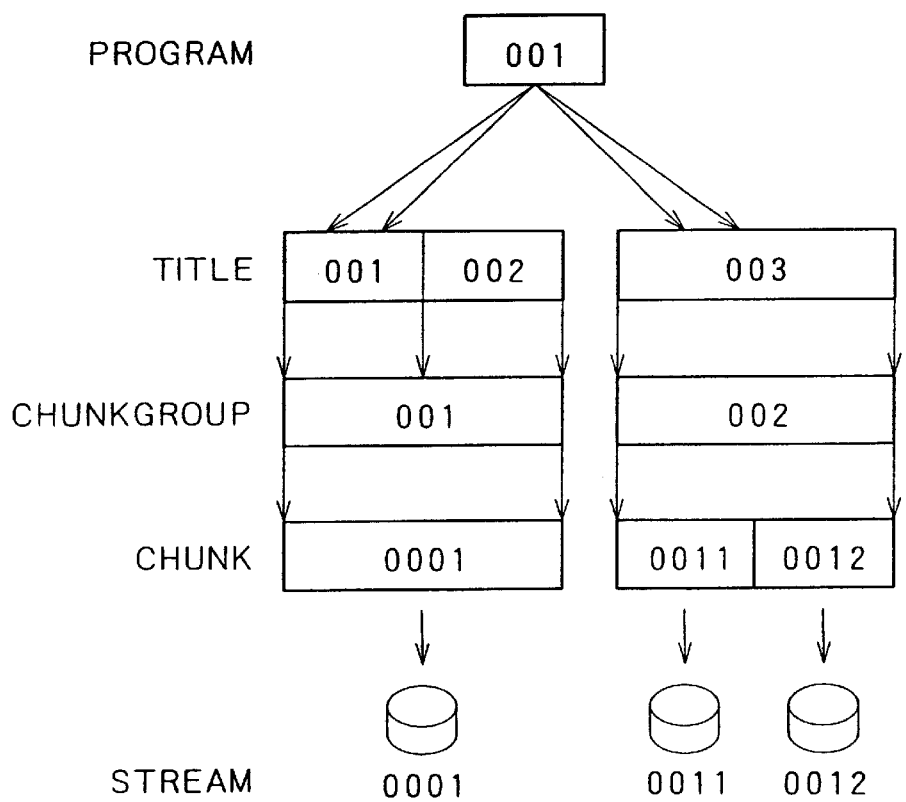
F I G. 28
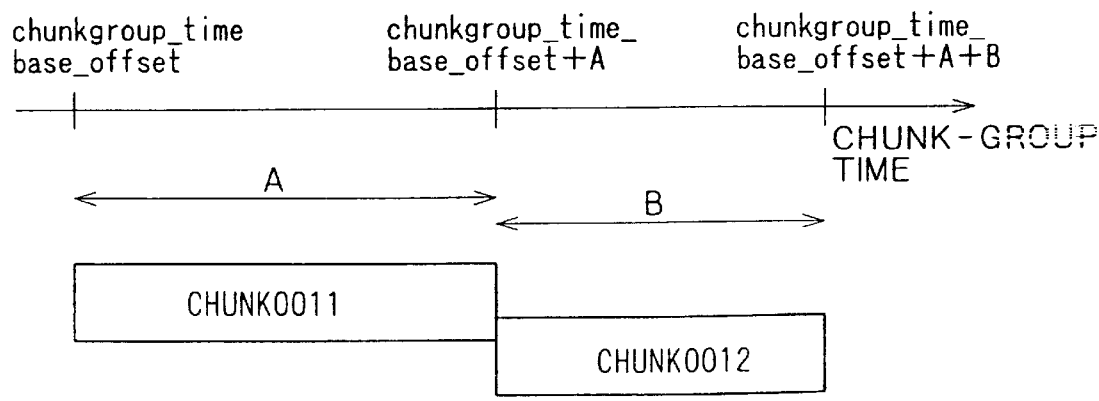

FIG. 29

```
/-----MPEGAV
     |    -STREAMS_003
     |    |      -CHUNK_0031.MPEG2
```

FIG. 30

```
/---VOLUME.TOC
   -ALBUM.STR
   -PROGRAM
   |     -PROGRAM_001.PGI
   -TITLE
   |     -TITLE_001.VDR
   |     -TITLE_002.VDR
   |     -TITLE_003.VDR
   |     -TITLE_004.VDR*
   |
   -CHUNKGROUP
   |     -CHUNKGROUP_001.CGIT
   |     -CHUNKGROUP_002.CGIT
   |     -CHUNKGROUP_003.CGIT*
   |
   -CHUNK
   |     -CHUNK_0001.ABST
   |     -CHUNK_0011.ABST
   |     -CHUNK_0012.ABST
   |     -CHUNK_0031.ABST*
   |
   -MPEGAV
        |    -STREAMS_001
        |    |      -CHUNK_0001.MPEG2
        |    |
        |    -STREAMS_002
        |    |      -CHUNK_0011.MPEG2
        |    |      -CHUNK_0012.MPEG2
        |    |
        |    -STREAMS_003*
        |    |      -CHUNK_0031.MPEG2*
        |    |
```

FIG. 32

```
/-----MPEGAV
      |     -STREAMS_002
      |     |       -CHUNK_0031.MPEG2
```

FIG. 33

```
/---VOLUME.TOC
    -ALBUM.STR
    -PROGRAM
    |     -PROGRAM_001.PGI
    -TITLE
    |     -TITLE_001.VDR
    |     -TITLE_002.VDR
    |     -TITLE_003.VDR
    |     -TITLE_004.VDR*
    |
    -CHUNKGROUP
    |     -CHUNKGROUP_001.CGIT
    |     -CHUNKGROUP_002.CGIT
    |
    -CHUNK
    |     -CHUNK_0001.ABST
    |     -CHUNK_0011.ABST
    |     -CHUNK_0012.ABST
    |     -CHUNK_0031.ABST*
    |
    -MPEGAV
    |     -STREAMS_001
    |     |       -CHUNK_0001.MPEG2
    |     |
    |     -STREAMS_002
    |     |       -CHUNK_0011.MPEG2
    |     |       -CHUNK_0012.MPEG2
    |     |       -CHUNK_0031.MPEG2*
    |     |
```

F I G. 36

| volume_write_protect_level | Meaning |
|---|---|
| 0 | write protect is disabled |
| 1 | Only volume_write_protect_level can be modified |
| 2 | ALBUM.STR can be modified |
| 3 | VOLUME.TOC can be modified |
| 4 | program(*.PGI) can be modified |
| 5 | title(.VDR) can be modified |
| 6 | *.MPEG2, *.ABST and *.CGIT can be modified |
| 7-15 | reserved |

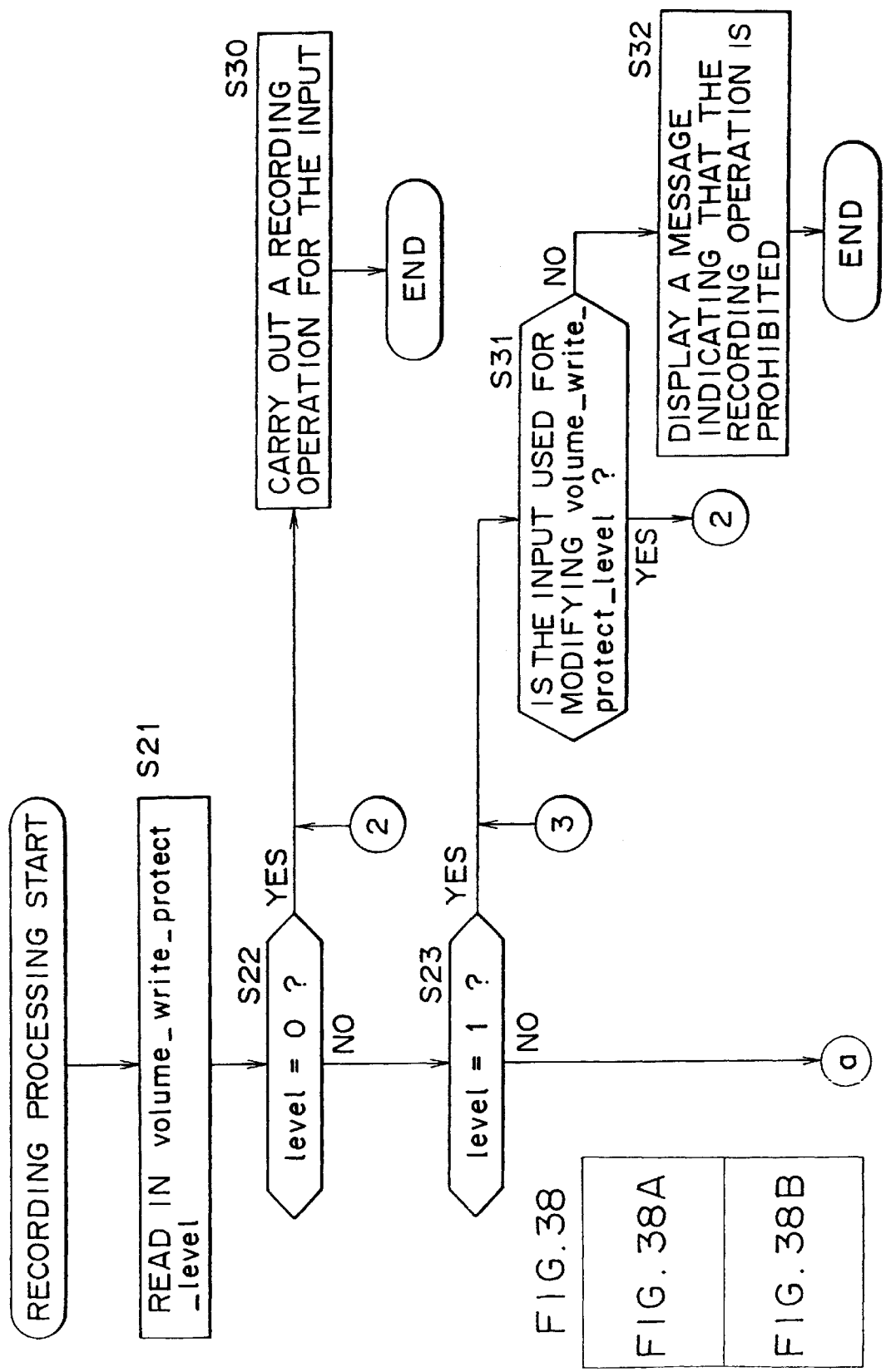

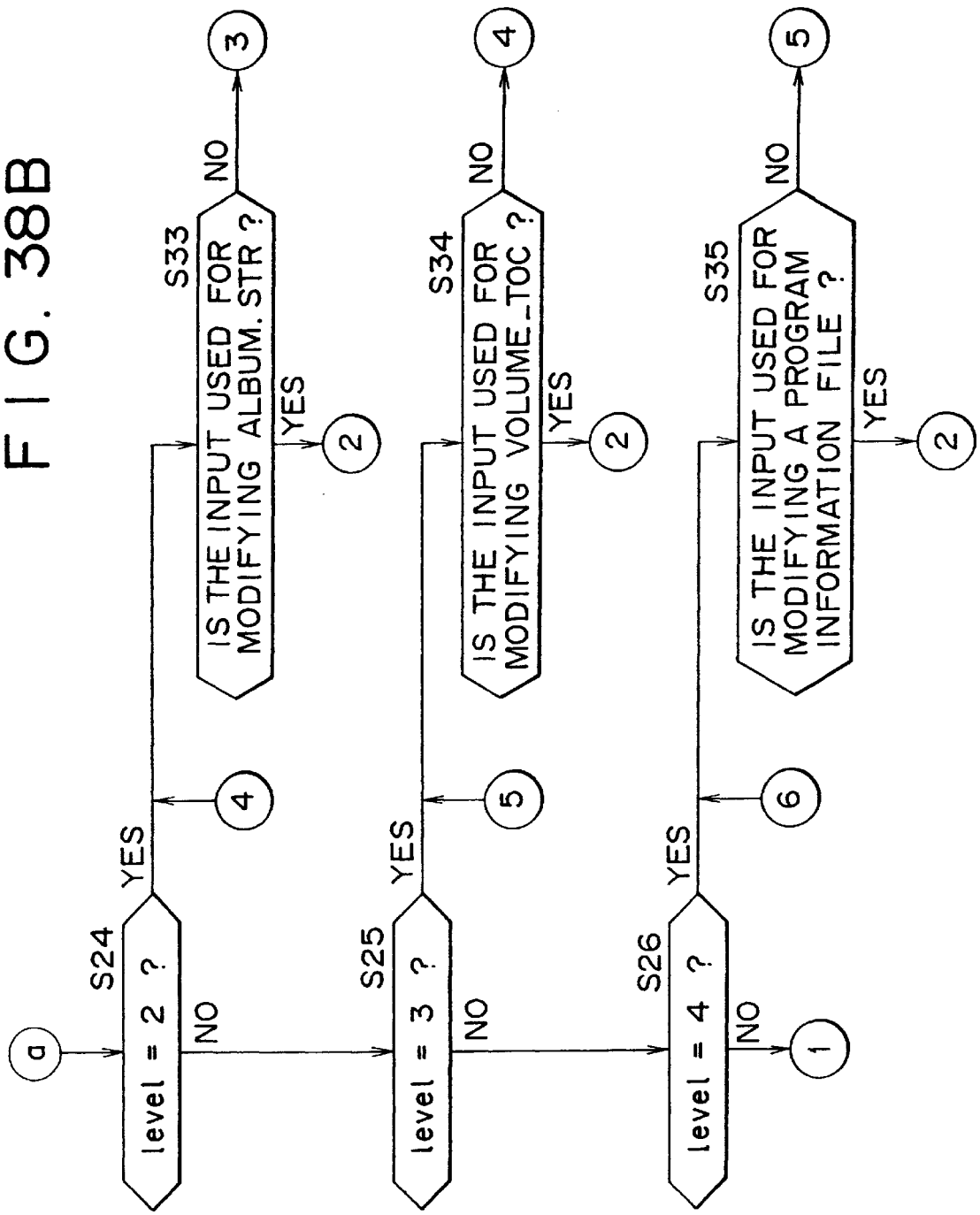

F I G. 40
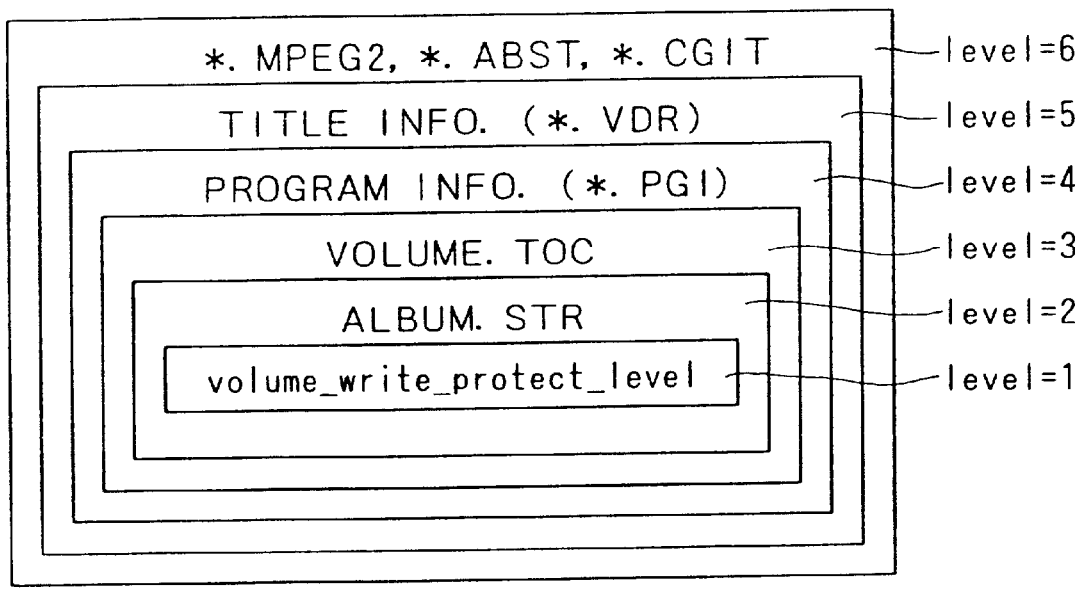

FIG. 41

| volume_play_protect_flag | Meaning |
|---|---|
| 00 | THE USER IS ALLOWED TO GIVE A COMMAND TO PLAY BACK ALL TITLES AND ALL PROGRAMS |
| 01 | AN OPERATION TO PLAY BACK A TITLE IS NOT ALLWED BUT AN OPERATION TO PLAY BACK A PROGRAM IS ALLOWED |
| 10 | AN OPERATION TO PLAY BACK A PROGRAM IS NOT ALLOWED BUT AN OPERATION TO PLAY BACK A TITLE IS ALLOWED |
| 11 | AN OPERATION TO PLAY BACK A PROGRAM OR A TITLE IS NOT ALLOWED |

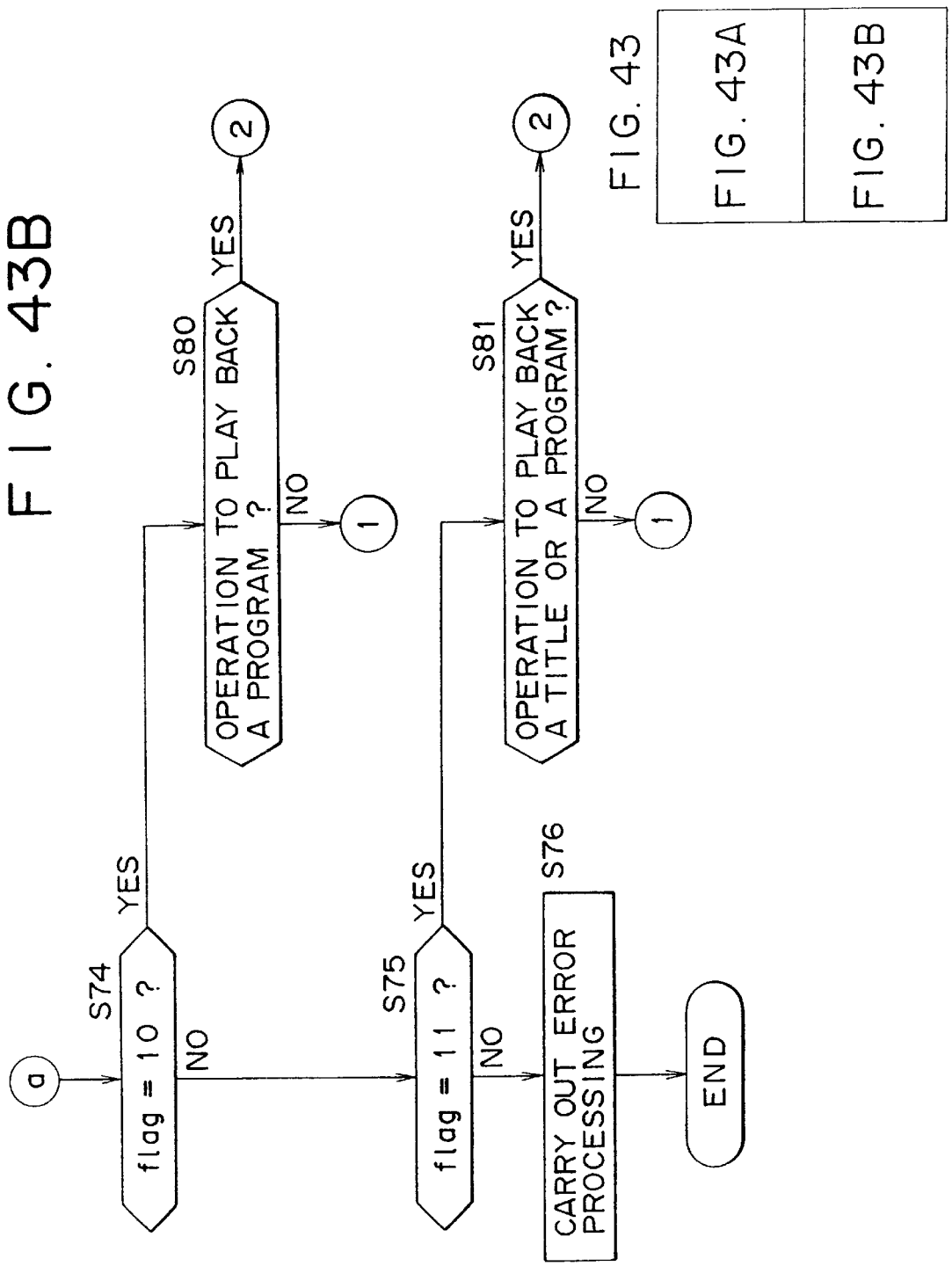

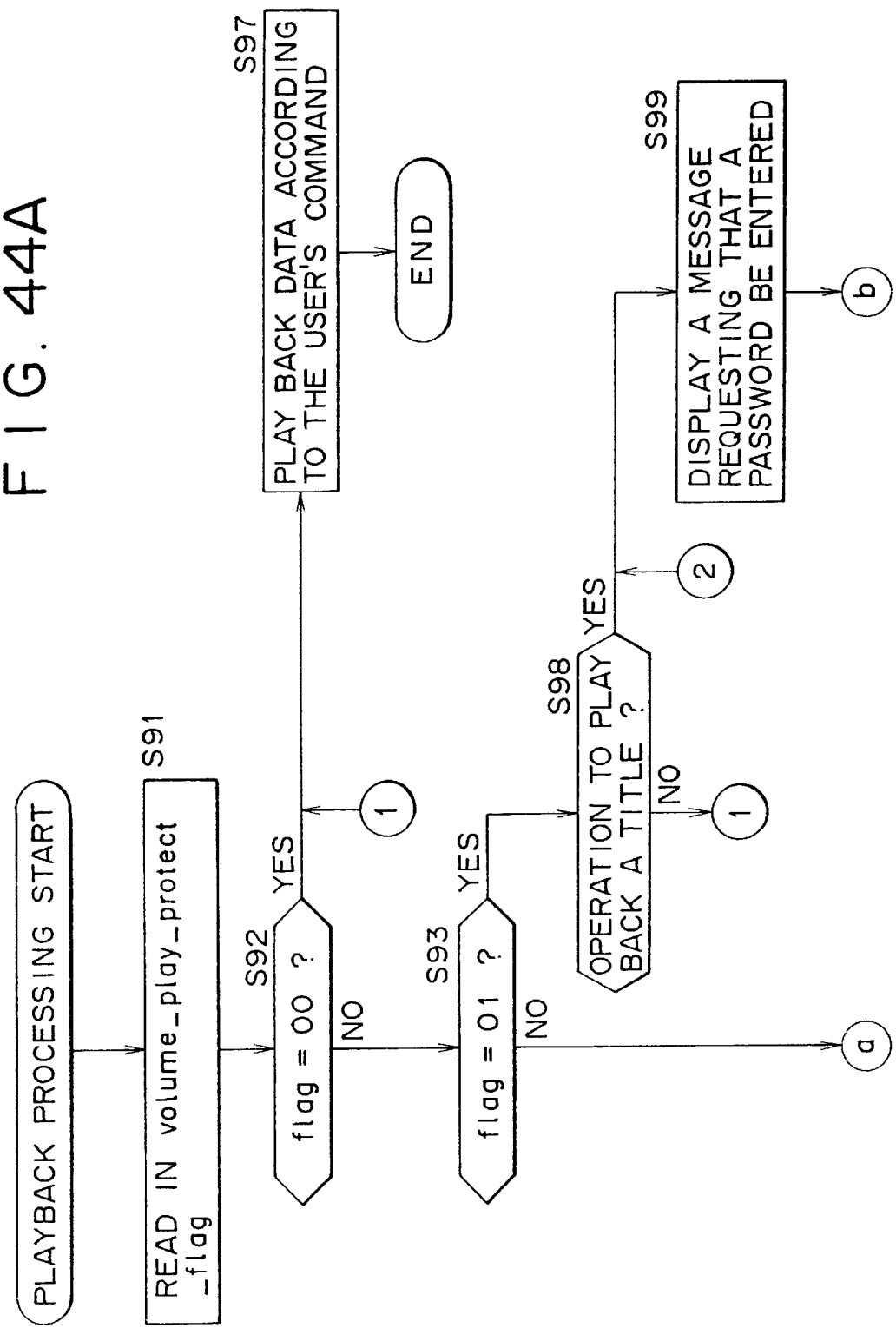

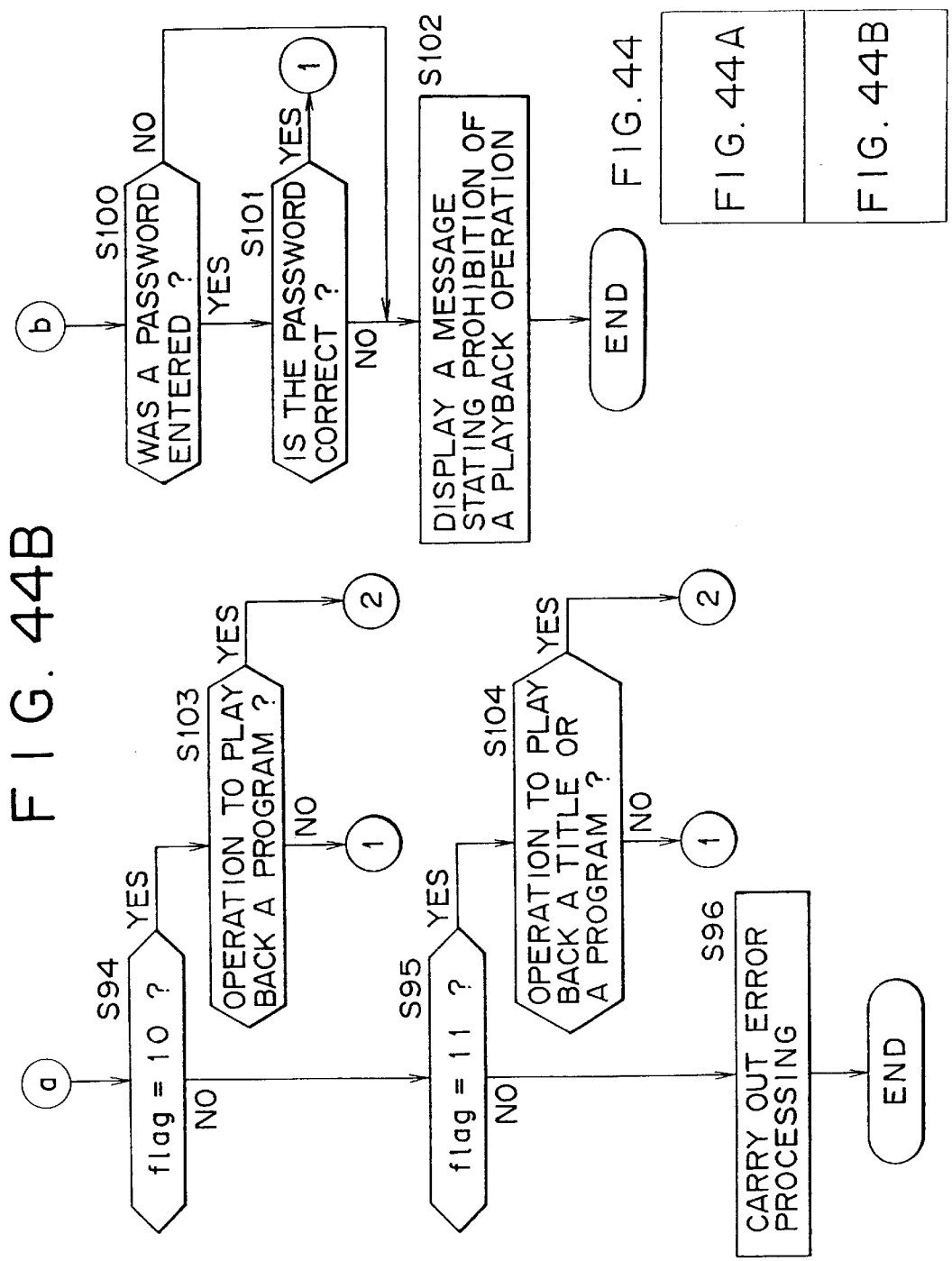

FIG.45

| Bit | volume_rating_type |
|---|---|
| 00b | age_limited |
| 01b | CARA |
| 10b | RSAC |
| 11b | reserved |

FIG.46

| Bit | CARA_category |
|---|---|
| 0000b | reserved |
| 0001b | G |
| 0010b | PG |
| 0011b | PG-13 |
| 0100b | NC-17 |
| 0101b-1111b | reserved |

FIG. 47

| Bit | RSAC_category |
|---|---|
| 0000b | Violence Rating |
| 0001b | Nudity Rating |
| 0010b | Sex Rating |
| 0011b | Language Rating |
| 0100b-0111b | reserved |

FIG. 48

| Bit | RSAC_level |
|---|---|
| 0000b | 0 |
| 0001b | 1 |
| 0010b | 2 |
| 0011b | 3 |
| 0100b | 4 |
| 0101b-1111b | reserved |

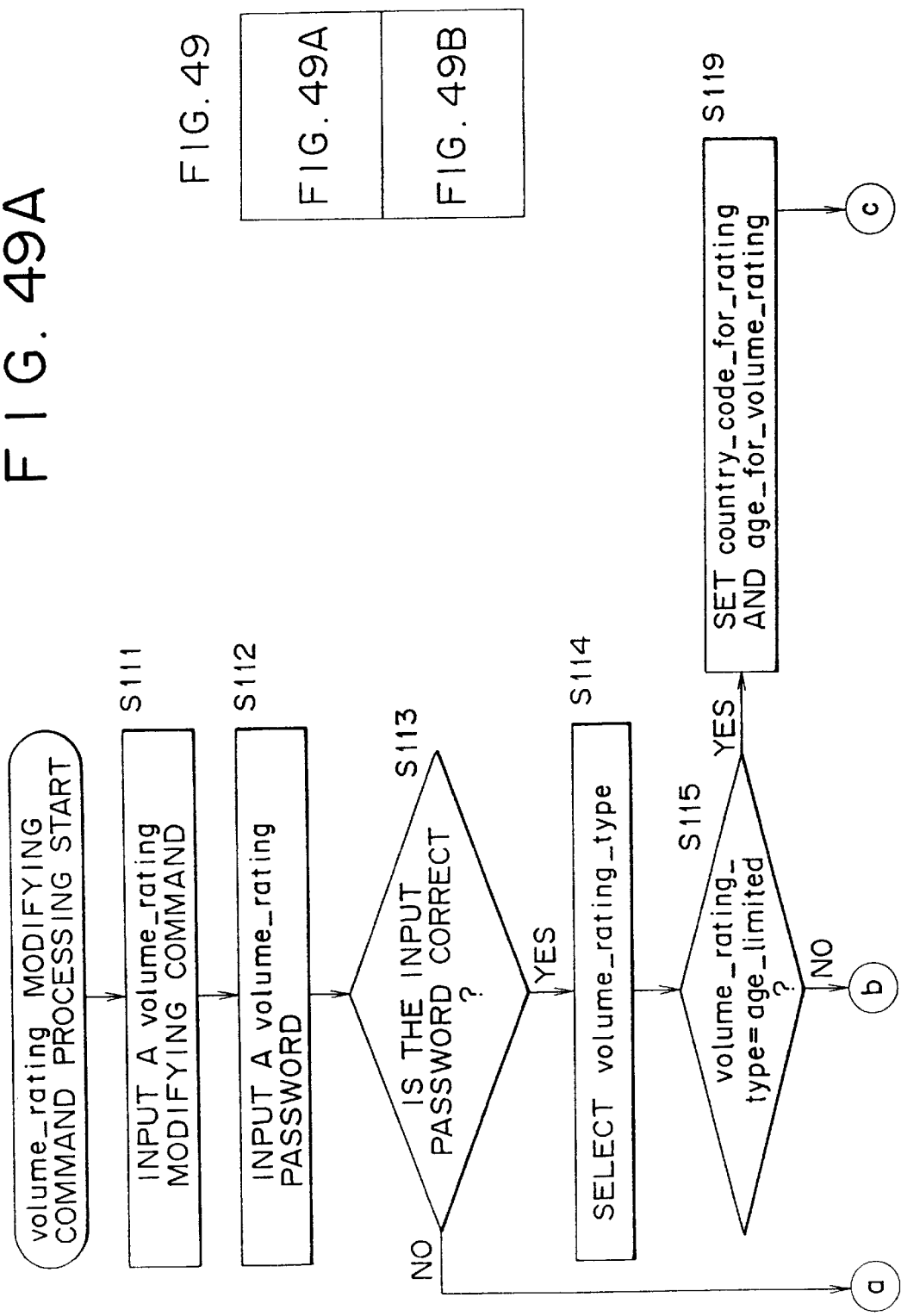

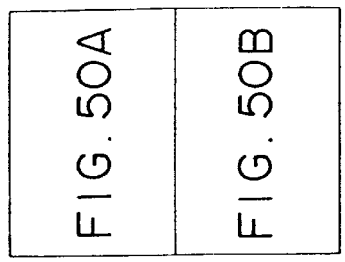
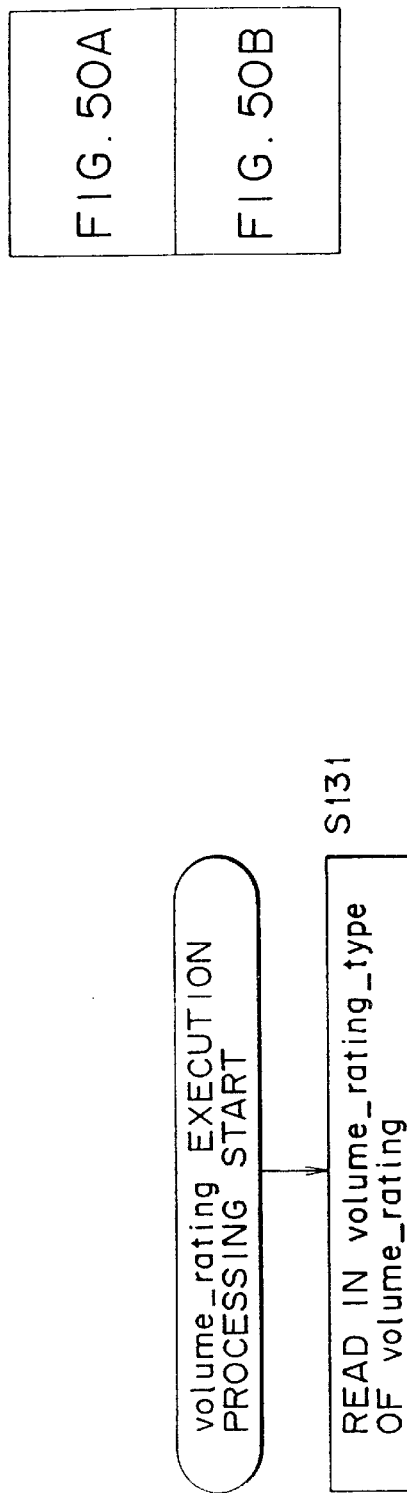

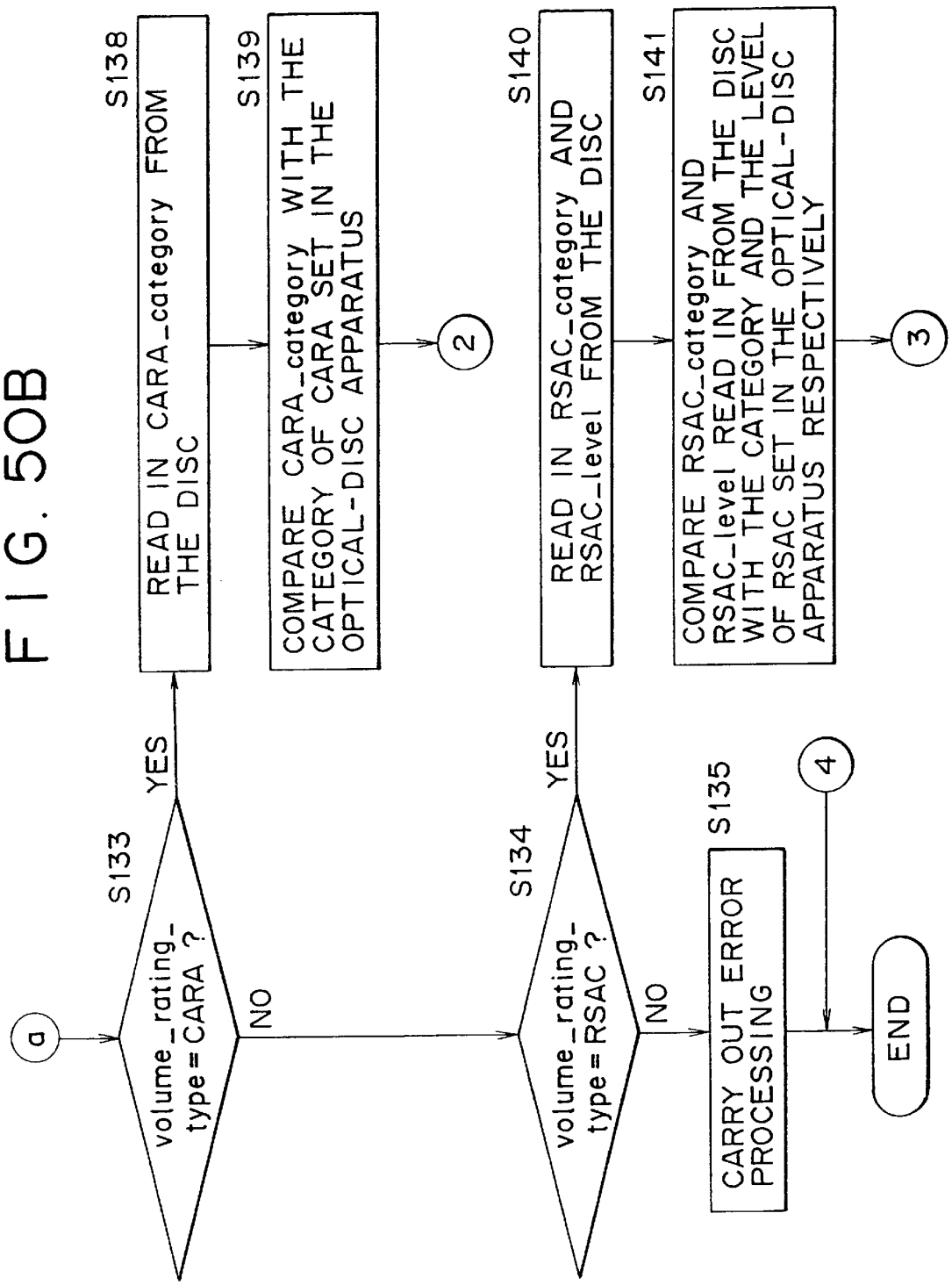

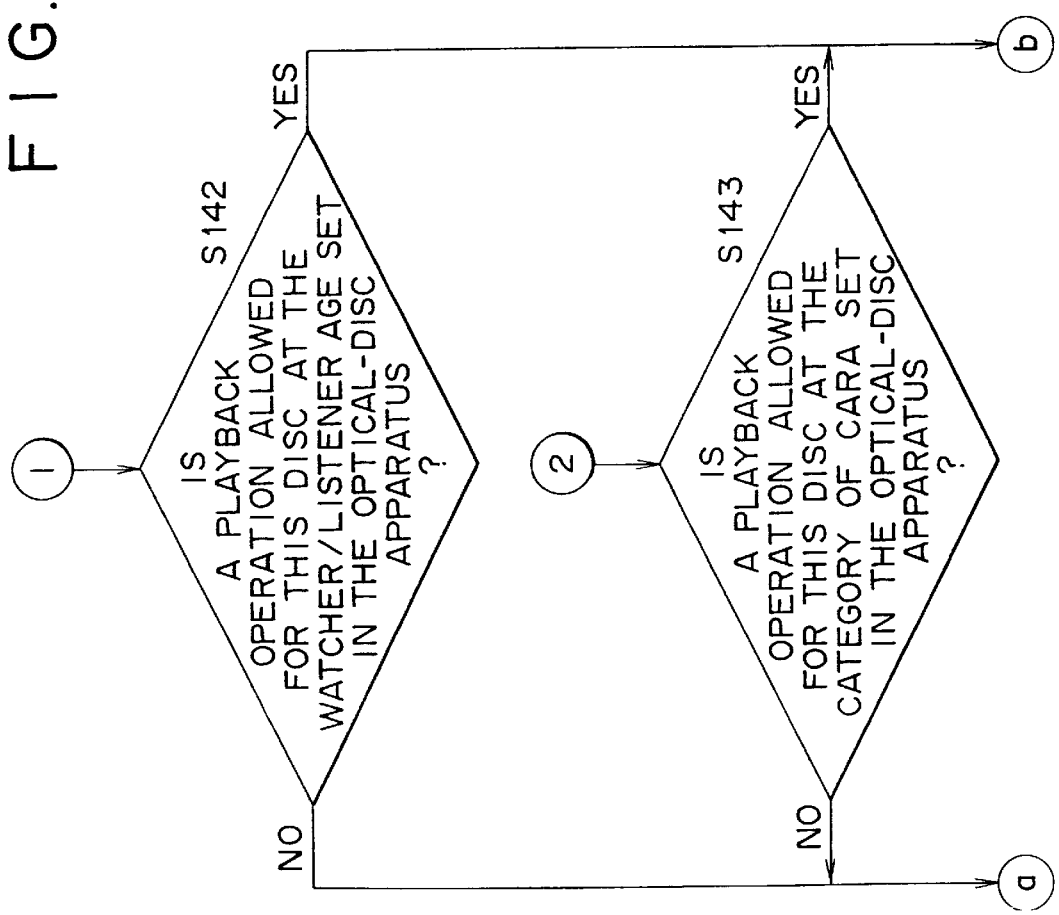
FIG. 51A
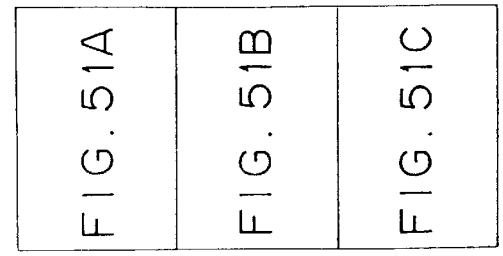
FIG. 51 | FIG. 51A | FIG. 51B | FIG. 51C

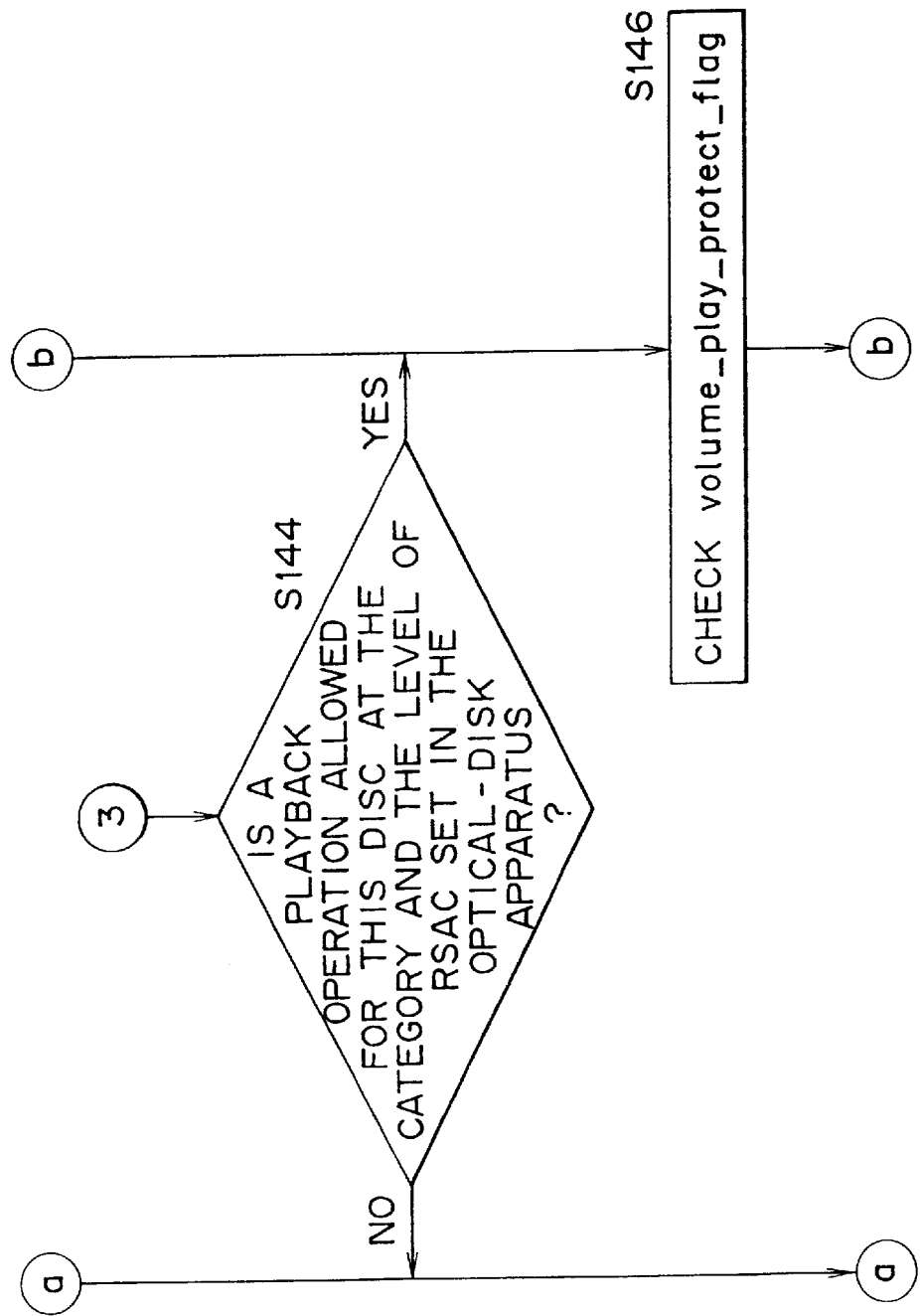
F I G. 51B

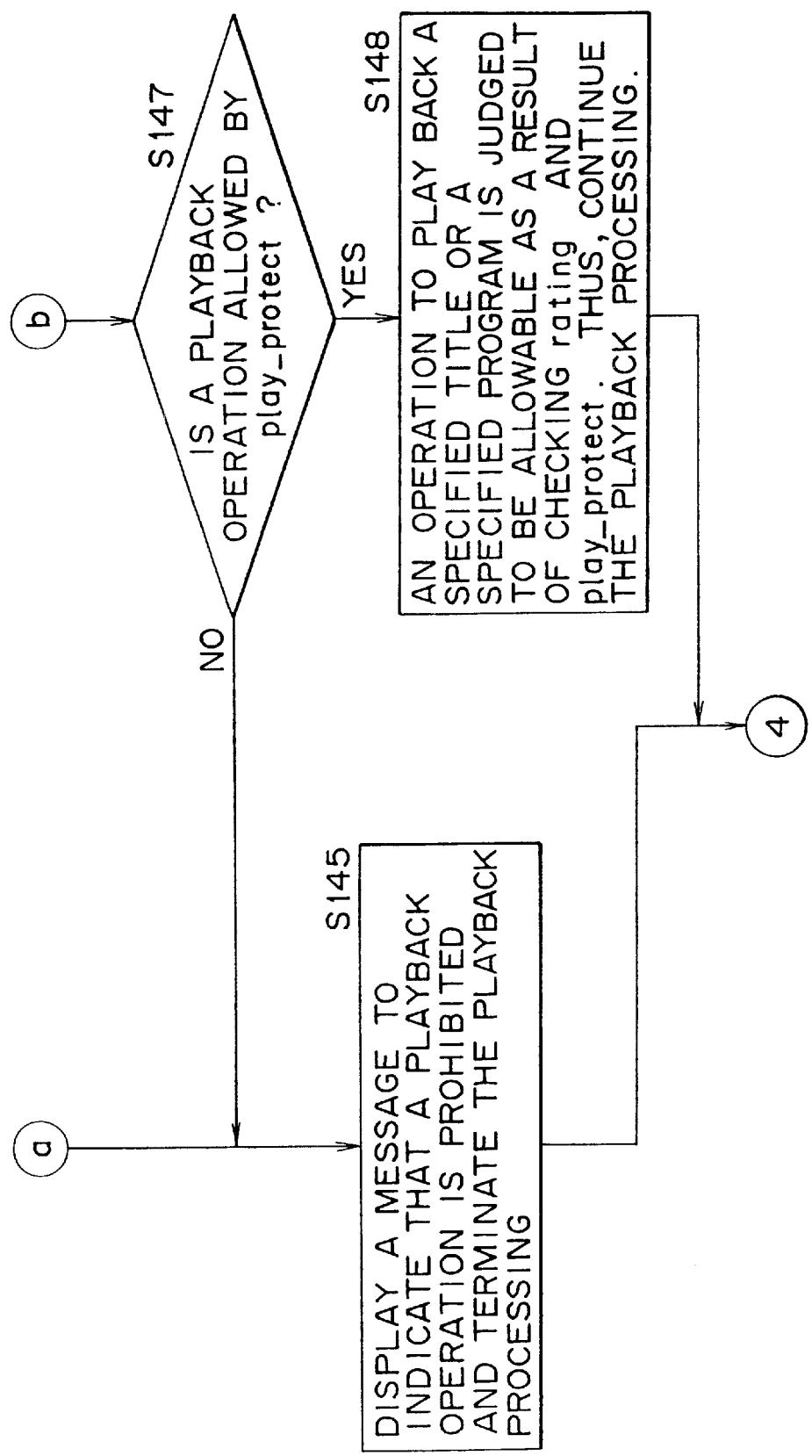

RECORDING APPARATUS, RECORDING METHOD, PLAYBACK APPARATUS, PLAYBACK METHOD, RECORDING/ PLAYBACK APPARATUS, RECORDING/ PLAYBACK METHOD, PRESENTATION MEDIUM AND RECORDING MEDIUM

This is a divisional of application Ser. No. 09/174,845, filed Oct. 19, 1998.

BACKGROUND OF THE INVENTION

In general, the present invention relates to a recording apparatus, a recording method, a playback apparatus, a playback method, a recording/playback apparatus, a recording/playback method, a presentation medium and a recording medium. More particularly, the present invention relates to a recording apparatus, a recording method, a playback apparatus, a playback method, a recording/ playback apparatus, a recording/playback method, a presentation medium and a recording medium offering improved operatability of the recording/playback apparatus by virtue of a facility for specifying whether or not to prohibit a write operation over for each type of data.

An optical disc can be used for recording a plurality of titles (or a program). The user is allowed select a desired title recorded in the optical disc to be played back.

In addition, the user is also capable of specifying any plurality of titles which are combined to be played back as a program which comprises the same plurality of specified titles.

In the related-art optical-disc apparatus, however, while an overwrite operation on the optical disc itself or a write operation over any title can be prohibited, a write operation over a program for example can not be prohibited, giving rise to a problem of poor operatability of the optical-disc apparatus.

In addition, in the related-art disc apparatus, there is also raised a problem that once titles or a program have been recorded on a disc, the playback person is capable of playing them back with a high degree of freedom, but the recording person is not capable of controlling data recorded on the disc in a way adjusted to the person playing back the data.

SUMMARY OF THE INVENTION

It is thus an object of the present invention addressing the problems described above to offer improved operatability of an optical-disc apparatus by virtue of a facility for specifying whether or not to prohibit a overwrite operation for a combination of pieces of data. It is fruther an object of the present invention an person recording data is capsble of controlling an operation to play back the data.

In accordance with one aspect of the present invention, there is provided a recording apparatus for recording a plurality of pieces of data into a recording medium is characterized in that the recording apparatus including a specifying means for specifying that a write operation over a combination of the pieces of data is prohibited, a judgment means for forming a judgment on what is specified for a predetermined piece of data by the specifying means in response to a command to perform a recording operation over the piece of data, and a control means for controlling an operation to record the pieces of data into the recording medium in accordance with a result of a judgment formed by the judgment means.

In accordance with another aspect of the present invention, there is provided a recording method adopted in a recording apparatus for recording a plurality of pieces of data into a recording medium is characterized in that the recording method including a specifying step of specifying that a write operation over a combination of the pieces of data is prohibited, a judgment step of forming a judgment on what is specified for a predetermined piece of data at the specifying step in response to a command to perform a recording operation over the piece of data, and a control step of controlling an operation to record the pieces of data into the recording medium in accordance with a result of a judgment formed at the judgment step.

In accordance with further aspect of the present invention, there is provided a presentation medium is characterized in that the presentation medium is used for presenting a program readable by a computer for execution to make a recording apparatus for recording a plurality of pieces of data into a recording medium carry out processing including a specifying step of specifying that a write operation over a combination of the pieces of data is prohibited, a judgment step of forming a judgment on what is specified for a predetermined piece of data at the specifying step in response to a command to perform a recording operation over the piece of data, and a control step of controlling an operation to record the pieces of data into the recording medium in accordance with a result of a judgment formed at the judgment step.

In accordance with still further aspect of the present invention, there is provided a recording medium for recording a plurality of pieces of data is characterized in that the recording medium is also used for recording specifying information for specifying that a write operation over a combination of the pieces of data is prohibited.

In accordance with yet further aspect of the present invention, there is provided a recording/playback apparatus for recording and playing back a plurality of pieces of data into and from a recording medium is characterized in that the recording/playback apparatus including a recording means for recording specifying information stating prohibition of an overwrite operation for a combination of the pieces of data into the recording medium, a playback means for playing back the specifying information for a piece of data subjected to a recording operation in accordance with a command from the recording medium, a judgment means for forming a judgment on the specifying information played back by the playback means, and a control means for controlling an operation to record the piece of data into the recording medium in accordance with a result of a judgment formed by the judgment means.

In accordance with yet aspect of the present invention, there is provided a recording/playback method adopted in a recording/playback apparatus for recording and playing back a plurality of pieces of data into and from a recording medium is characterized in that the recording/playback method including a recording step of recording specifying information stating prohibition of an overwrite operation for a combination of the pieces of data into the recording medium, a playback step of playing back the specifying information for a piece of data subjected to a recording operation in accordance with a command from the recording medium, a judgment step of forming a judgment on the specifying information played back at the playback step, and a control step of controlling an operation to record the piece of data into the recording medium in accordance with a result of a judgment formed at the judgment step.

In accordance with yet aspect of the present invention, there is provided a presentation medium is characterized in that the presentation medium is used for presenting a program readable by a computer for execution to make a recording/playback apparatus for recording and playing back a plurality of pieces of data into and from a recording medium carry out processing including a recording step of recording specifying information stating prohibition of an overwrite operation for a combination of the pieces of data into the recording medium, a playback step of playing back the specifying information for a piece of data subjected to a recording operation in accordance with a command from the recording medium, a judgment step of forming a judgment on the specifying information played back at the playback step, and a control step of controlling an operation to record the piece of data into the recording medium in accordance with a result of a judgment formed at the judgment step.

In accordance with yet aspect of the present invention, there is provided a playback apparatus for playing back data from a recording medium is characterized in the playback apparatus including a specifying means for specifying whether or not an operation to play back data recorded in the recording medium is allowed, a judgment means for forming a judgment on what is specified by the specifying means, and a control means for controlling an operation to play back data from the recording medium in accordance with a result of a judgment formed by the judgment means.

In accordance with yet aspect of the present invention, there is provided a playback method adopted in a playback apparatus for playing back data from a recording medium is characterized in that the playback method including a specifying step of specifying whether or not operation to play back data recorded in the recording medium is allowed, a judgment step of forming a judgment on what is specified at the specifying step, and a control step of controlling an operation to play back data from the recording medium in accordance with a result of a judgment formed at the judgment step.

In accordance with yet aspect of the present invention, there is provided a presentation medium is characterized in that the presentation medium is used for presenting a program readable by a computer for execution to make a playback apparatus for playing back data from a recording medium carry out processing including a specifying step of specifying whether or not an operation to play back data recorded in the recording medium is allowed, a judgment step of forming a judgment on what is specified at the specifying step, and a control step of controlling an operation to play back data from the recording medium in accordance with a result of a judgment formed at the judgment step.

In accordance with yet aspect of the present invention, there is provided a recording medium for recording data is characterized in that the recording medium is also used for recording specifying information for specifying whether or not an operation to play back the data is prohibited.

In accordance with yet aspect of the present invention, there is provided a recording apparatus for recording data into a recording medium is characterized in that the recording apparatus including a specifying means for specifying whether or not an operation to play back data from the recording medium is prohibited and a recording means for recording what is specified by the specifying means into the recording medium.

In accordance with yet aspect of the present invention, there is provided a recording method adopted in a recording apparatus for recording data into a recording medium is characterized in that the recording method including a specifying step of specifying whether or not an operation to play back data from the recording medium is prohibited and a recording step of recording what is specified at the specifying step into the recording medium.

In accordance with yet aspect of the present invention, there is provided a presentation medium is characterized in that the presentation medium is used for presenting a program readable by a computer for execution to make a recording apparatus for recording data into a recording medium carry out processing including a specifying step of specifying whether or not an operation to play back data from the recording medium is prohibited and a recording step of recording what is specified at the specifying step into the recording medium.

In accordance with yet aspect of the present invention, there is provided a recording/playback apparatus for recording and playing back data into and from a recording medium is characterized in that the recording/playback apparatus including a recording means for recording specifying information specifying whether or not to prohibit an operation to play back data recorded in the recording medium into the recording medium, a playback means for playing back the specifying information for data subjected to a playback operation in accordance with a command from the recording medium, a judgment means for forming a judgment on the specifying information played back by the playback means, and a control means for controlling an operation to play back data from the recording medium in accordance with a result of a judgment formed by the judgment means.

In accordance with yet aspect of the present invention, there is provided a recording/playback method adopted in a recording/playback apparatus for recording and playing back data into and from a recording medium is characterized in that the recording/playback method including a recording step of recording specifying information specifying whether or not to prohibit an operation to play back data recorded in the recording medium into the recording medium, a playback step of playing back the specifying information for data subjected to a playback operation in accordance with a command from the recording medium, a judgment step of forming a judgment on the specifying information played back at the playback step, and a control step of controlling an operation to play back data from the recording medium in accordance with a result of a judgment formed at the judgment step.

In accordance with yet aspect of the present invention, there is provided a presentation medium is characterized in that the presentation medium is used for presenting a program readable by a computer for execution to make a recording/playback apparatus for recording and playing back data into and from a recording medium carry out processing including a recording step of recording specifying information specifying whether or not to prohibit an operation to play back data recorded in the recording medium into the recording medium, a playback step of playing back the specifying information for data subjected to a playback operation in accordance with a command from the recording medium, a judgment step of forming a judgment on the specifying information played back at the playback step, and a control step of controlling an operation to play back data from the recording medium in accordance with a result of a judgment formed at the judgment step.

In the recording apparatus, the recording method, the presentation medium and the recording medium according to the present invention, prohibition of a write operation over a combination of pieces of data is specified.

In the recording/playback apparatus, the recording/playback method and the presentation medium according to the present invention, specifying information stating prohibition of an overwrite operation for a combination of pieces of data is recorded into a recording medium, the specifying information for a piece of data subjected to a recording operation in accordance with a command is played back from the recording medium, and an operation to record the piece of data into the recording medium is controlled in accordance with a result of a judgment formed on the specifying information played back from the recording medium.

In the playback apparatus, the recording playback method and the presentation medium according to the present invention, an operation to play back data from a recording medium is controlled in accordance with a prescribed regulation as to whether or not the operation to play back the data recorded in the recording medium is allowed.

A recording medium according to the present invention is also used for recording specifying information for specifying whether or not an operation to play back the data is prohibited.

In the recording apparatus, the recording method and the presentation medium according to the present invention, a prescribed regulation as to whether or not to prohibit an operation to play back data recorded in a recording medium is recorded in the recording medium.

In the recording/playback apparatus, the recording/playback method and the presentation medium according to the present invention, specifying information specifying whether or not to prohibit an operation to play back data recorded in a recording medium is recorded into the recording medium, the specifying information for data subjected to a playback operation in accordance with a command is played back from the recording medium, and an operation to play back data from the recording medium is controlled in accordance with a result of a judgment formed on the specifying information played back from the recording medium.

BRIEF DESCRIPTION OF THE DRAWINGS

FIG. 2 is an explanatory diagram used for describing the structure of a VOLUME.TOC file;

FIG. 3 is an explanatory diagram used for describing the structure of volume_information ( );

FIG. 4 is an explanatory diagram used for describing the structure of volume_attribute ( );

FIG. 5 is an explanatory diagram used for describing the structure of resume ( );

FIG. 6 is an explanatory diagram used for describing the structure of volume_rating ( );

FIG. 7 is an explanatory diagram used for describing the structure of write_protect ( );

FIG. 8 is an explanatory diagram used for describing the structure of play_protect ( );

FIG. 9 is an explanatory diagram used for describing the structure of recording_timer ( );

FIG. 10 is an explanatory diagram used for describing the structure of text_block ( );

FIG. 11 is an explanatory diagram used for describing the structure of language_set ( );

FIG. 12 is an explanatory diagram used for describing the structure of text_item ( );

FIG. 13 is an explanatory diagram used for describing the structure of ALBUM.STR;

FIG. 14 is an explanatory diagram used for describing the structure of album ( );

FIG. 15 is an explanatory diagram used for describing the structure of TITLE_###.VDR;

FIG. 16 is an explanatory diagram used for describing the structure of title_info ( );

FIG. 17 is an explanatory diagram used for describing the structure of PROGRAM_$$$.PGI;

FIG. 18 is an explanatory diagram used for describing the structure of program ( );

FIG. 19 is an explanatory diagram used for describing the structure of play_list ( );

FIG. 20 is an explanatory diagram used for describing the structure of play_item ( );

FIG. 21 is an explanatory diagram used for describing the structure of CHUNKGROUP_###.CGIT;

FIG. 22 is an explanatory diagram used for describing the structure of chunk_connection_info ( );

FIG. 23 is an explanatory diagram used for describing the structure of chunk_arrangement_info ( );

FIG. 24 is an explanatory diagram used for describing the structure of CHUNK_%%%.ABST;

FIGS. 25A and 25B are block diagrams showing a typical configuration of an optical-disc apparatus to which the present invention is applied;

FIG. 26 is an explanatory diagram used for describing an organization of directories;

FIG. 27 is an explanatory diagram used for describing a logical organization of directories;

FIG. 28 is an explanatory diagram used for describing an offset;

FIG. 29 is an explanatory diagram used for describing an organization of directories;

FIG. 30 is an explanatory diagram used for describing an organization of directories;

FIG. 32 is an explanatory diagram used for describing an organization of directories;

FIG. 33 is an explanatory diagram used for describing an organization of directories;

FIG. 36 is an explanatory diagram used for describing volume_write_level;

FIGS. 38A and 38B are flowcharts representing recording processing;

FIG. 40 is an explanatory diagram used for describing a relation of volume_write_protect_level;

FIG. 41 is an explanatory diagram used for describing volume_play_protect_flag;

FIGS. 43A and 43B are flowcharts representing playback processing;

FIGS. 44A and 44B are flowcharts representing other playback processing;

FIG. 45 is an explanatory diagram used for describing volume_rating_type;

FIG. 46 is an explanatory diagram used for describing CARA_category;

FIG. 47 is an explanatory diagram used for describing RSAC_category;

FIG. 48 is an explanatory diagram used for describing RSAC level;

FIGS. 49A and 49B are flowcharts representing processing to modify volume_rating;

FIGS. 50A and 50B are flowcharts representing processing to execute volume_rating; and FIGS. 51A and 51B and 51C are flowcharts representing a continuation of the processing to execute volume_rating shown in FIG. 50.

DETAILED DESCRIPTION OF THE PREFERRED EMBODIMENTS

Before embodiments of the present invention are described, each means cited in claims of the patent in the specification is exemplified by a typical implementation appended after the means by enclosing the implementation in parentheses in the following description of characteristics of the present invention in order to clarify a relation associating the means with the implementation. It is needless to say, however, that the appended implementation is not to intended to be construed in a limiting sense, that is, examples of the means are not limited to the appended implementation.

According to claim 1, a recording apparatus for recording a plurality of pieces of data into a recording medium is characterized in that the recording apparatus comprises:

a specifying means (implemented typically by flags_for_program shown in FIG. 18) for specifying that a write operation over a combination of the pieces of data is prohibited;

a judgment means (implemented typically by steps S26 and S35 of a flowchart shown in FIG. 38) for forming a judgment on what is specified for a predetermined piece of data by the specifying means in response to a command to perform a recording operation over the piece of data; and a control means (implemented typically by steps S30 and S32 of the flowchart shown in FIG. 38) for controlling an operation to record the pieces of data into the recording medium in accordance with a result of a judgment formed by the judgment means.

According to claim 9, a recording/playback apparatus for recording and playing back a plurality of pieces of data into and from a recording medium is characterized in that the recording/playback apparatus comprises:

a recording means (implemented typically by a step S10 of a flowchart shown in FIG. 37) for recording specifying information (implemented typically by flags_for_program shown in FIG. 18) stating prohibition of an overwrite operation for a combination of the pieces of data into the recording medium;

a playback means (implemented typically by a step S21 of the flowchart shown in FIG. 38) for playing back the specifying information for a piece of data subjected to a recording operation in accordance with a command from the recording medium;

a judgment means (implemented typically by the steps S26 and S35 of the flowchart shown in FIG. 38) for forming a judgment on the specifying information played back by the playback means; and a control means (implemented typically by the steps S30 and S32 of the flowchart shown in FIG. 38) for controlling an operation to record the piece of data into the recording medium in accordance with a result of a judgment formed by the judgment means.

Figure 43A:
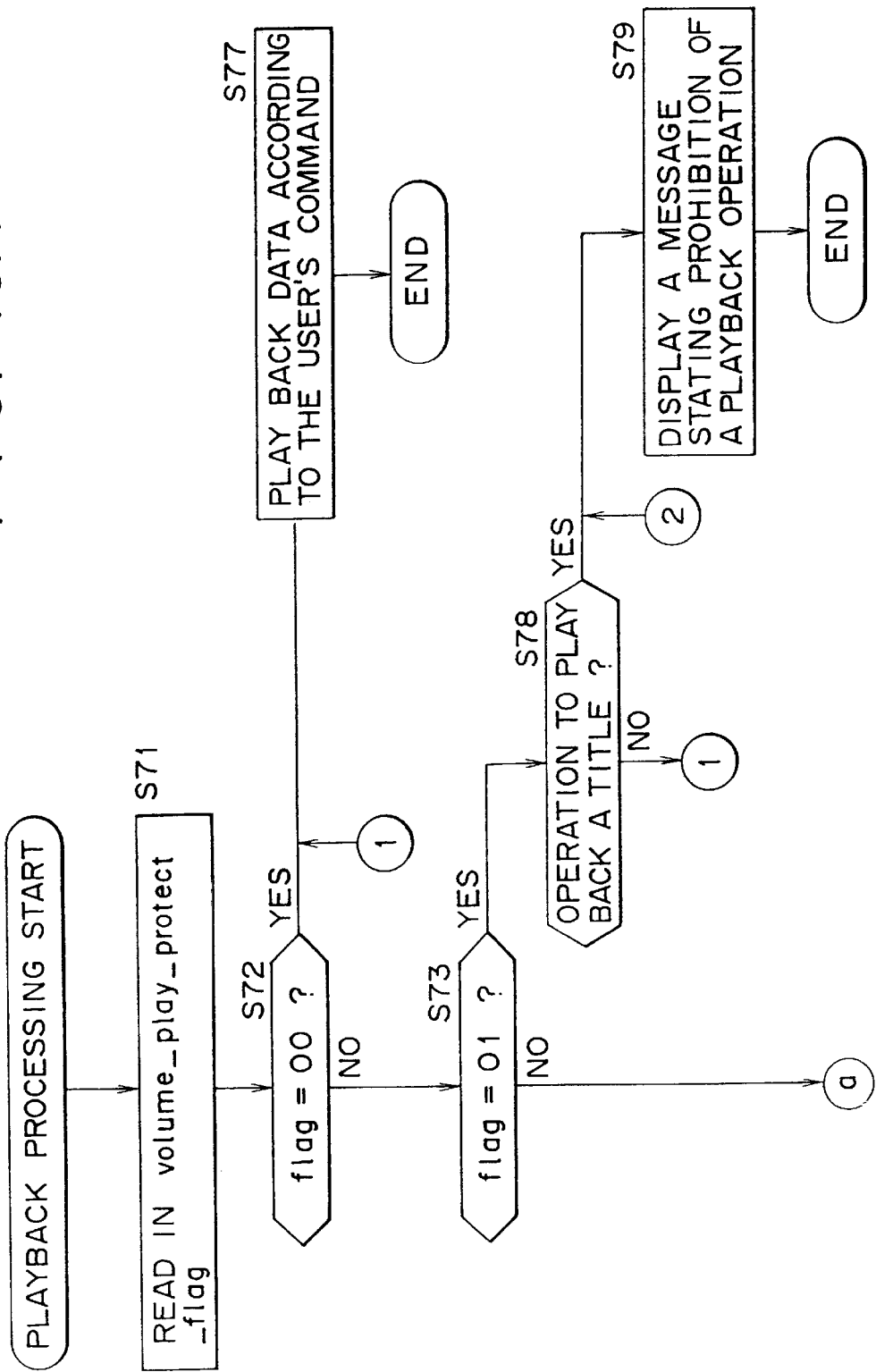

According to claim 12, a playback apparatus for playing back data from a recording medium is characterized in the playback apparatus comprises:

a specifying means (implemented typically by play_protect shown in FIG. 8) for specifying whether or not an operation to play back data recorded in the recording medium is allowed;

a judgment means (implemented typically by steps S72 to S75 of a flowchart shown in FIG. 43) for forming a judgment on what is specified by the specifying means; and a control means (implemented typically by steps S77 and S79 of the flowchart shown in FIG. 43) for controlling an operation to play back data from the recording medium in accordance with a result of a judgment formed by the judgment means.

According to claim 17, a recording apparatus for recording data into a recording medium is characterized in that the recording apparatus comprises:

a specifying means (implemented typically by play_protect ( ) shown in FIG. 8) for specifying whether or not an operation to play back data from the recording medium is prohibited; and a recording means (implemented typically by a step S60 of a flowchart shown in FIG. 42) for recording what is specified by the specifying means into the recording medium.

Figure 42:
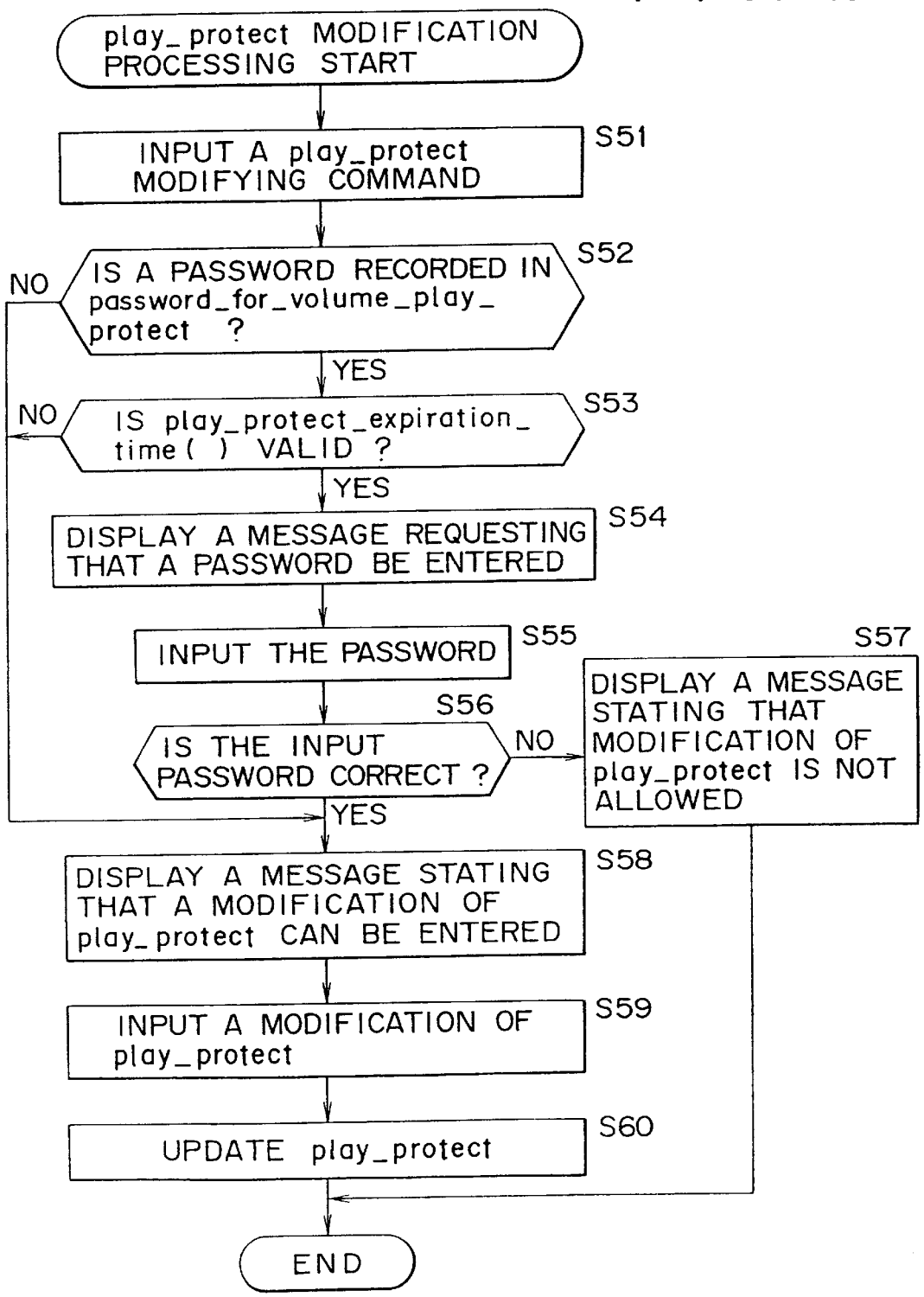
FIG. 42 is a flowchart representing processing to modify play_protect.

According to claim 20, a recording/playback apparatus for recording and playing back data into and from a recording medium is characterized in that the recording/playback apparatus comprises:

a recording means (implemented typically by the step S60 of the flowchart shown in FIG. 42) for recording specifying information (implemented typically by play_protect shown in FIG. 8) specifying whether or not to prohibit an operation to play back data recorded in the recording medium into the recording medium;

a playback means (implemented typically by a step S71 of the flowchart shown in FIG. 43) for playing back the specifying information for data subjected to a playback operation in accordance with a command from the recording medium;

a judgment means (implemented typically by the steps S72 to S75 of the flowchart shown in FIG. 43) for forming a judgment on the specifying information played back by the playback means; and a control means (implemented typically by the steps S77 and S79 of the flowchart shown in FIG. 43) for controlling an operation to play back data from the recording medium in accordance with a result of a judgment formed by the judgment means.

Figure 1:
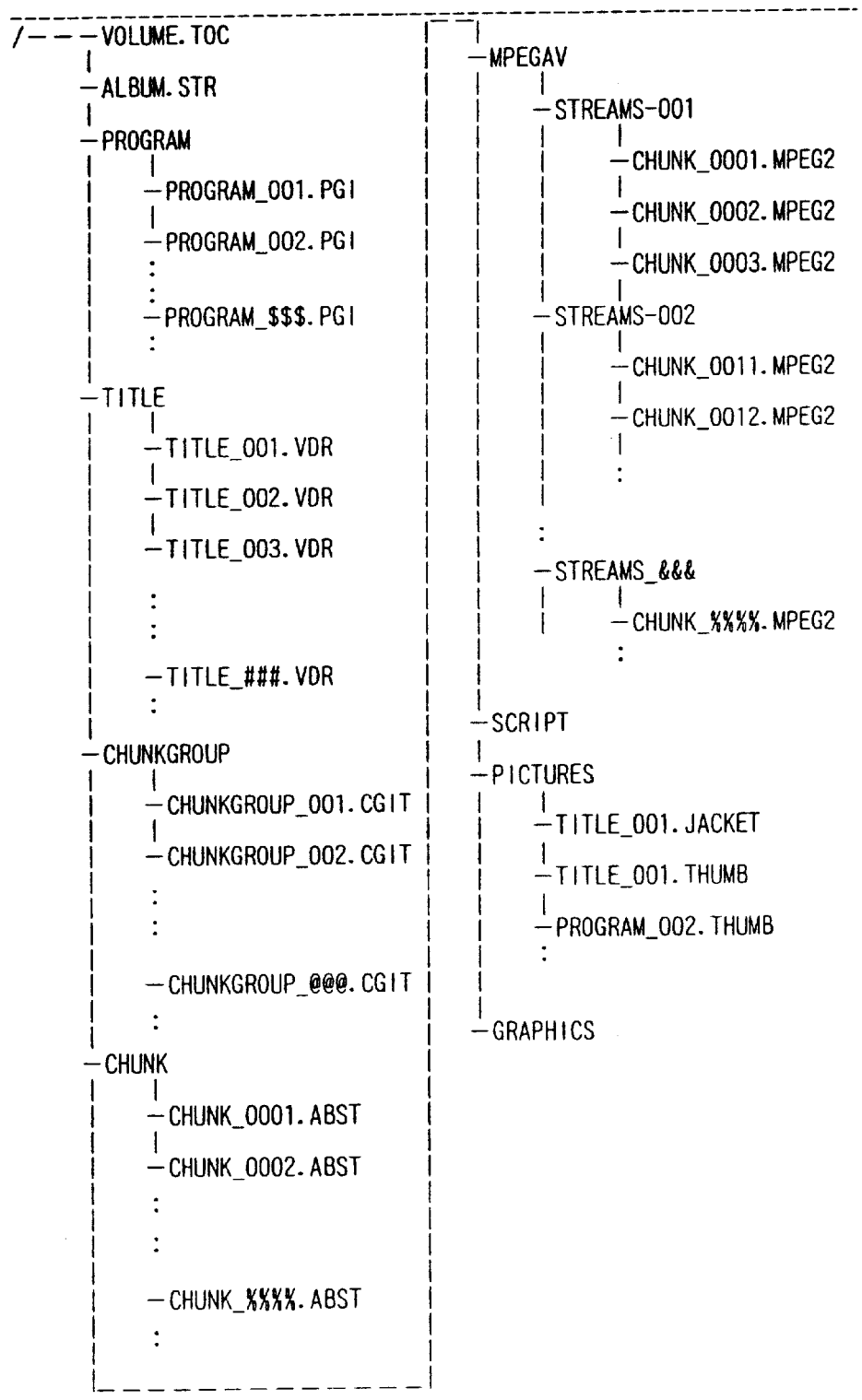
FIG. 1 is an explanatory diagram used for describing an organization of directories.

The description begins with an explanation of a layout of files on a recording medium provided by the present invention, which information is recorded into and played back from. Recorded on the recording medium, files shown in FIG. 1 are classified into 7 types listed below.

VOLUME.TOC
ALBUM.STR
PROGRAM_$$$.PGI
TITLE_###.VDR
CHUNKGROUP_@@@.CGIT
CHUNK_%%%%.ABST
CHUNK_%%%%.MPEG2

The VOLUME.TOC and ALBUM.STR files are placed in a root directory. A directory named "PROGRAM" is placed immediately below the root directory. The PROGRAM directory includes PROGRAM_$$.PGI files where notation $$$ represents the number of a program. By the same token, a directory named TITLE is placed immediately below the root directory. The TITLE directory includes TITLE_###.VDR files where notation ### represent the number of a title. Placed immediately below the root directory, a CHUNKGROUP directory includes CHUNKGROUP_@@@.CGIT files where notation @@@ represents the number of a chunk group and a CHUNK directory includes CHUNK_%%%%.ABST files where notation %%%% represents the number of a chunk.

Also placed immediately below the root directory, an MPEGAV directory contains a plurality of sub-directories which each include CHUNK_%%%%.MPEG2 files where %%%% represents the number of a chunk.

Normally, one VOLUME.TOC file exists in the recording medium. In a recording medium with a special structure such as a recording medium with a ROM and RAM hybrid structure, however, a plurality of VOLUME.TOC files may exist. This VOLUME.TOC file is used for showing the property of the recording medium as a whole.

FIG. 2 is a diagram showing the structure of the VOLUME.TOC file. As shown in the figure, file_type_id is placed at the head of the file to indicate that the file is a VOLUME.TOC file. file_type_id is followed by volume_information ( ) which is finally followed by text block ( ).

FIG. 3 is a diagram showing the structure of volume_information ( ). As shown in the figure, volume_information ( ) comprises volume attribute ( ), resume ( ), volume_rating ( ), write_protect ( ), play_protect ( ) and recording_timer ( ).

volume_attribute ( ) is an area used for recording attributes of the logical volume. FIG. 4 is a diagram showing a detailed structure of volume_attribute ( ). As shown in the figure, volume_attribute ( ) includes title_playback_mode_flag and program_playback_mode_flag.

resume ( ) is an area used for recording information used in restoration of a state immediately prior to an eject operation at the time the recording medium is reinserted. FIG. 5 is a diagram showing a detailed structure of resume ( ).

volume_rating ( ) shown in FIG. 3 is an area used for recording information used in implementation of age limitation of watchers/listeners of the volume as a whole in accordance with user ages and user categories. FIG. 6 is a diagram showing a detailed structure of volume_rating ( ).

write_protect ( ) shown in FIG. 3 is an area used for recording information used in limitation of operations to change and delete a title or a program. FIG. 7 is a diagram showing a detailed structure of write_protect ( ).

play_protect ( ) shown in FIG. 3 is an area used for recording information setting a playback enable function or a playback disable function and limiting the number of playback operations for a title or a program recorded in the volume. FIG. 8 is a diagram showing a detailed structure of play_protect ( ).

recording_timer ( ) shown in FIG. 3 is an area used for recording information controlling a recording time. FIG. 9 is a diagram showing a detailed structure of recording_timer ( ).

FIG. 10 is a diagram showing a detailed structure of text_block ( ) of the VOLUME.TOC file shown in FIG. 2. As shown in FIG. 10, text_block ( ) includes language_sets ( ) and text_items ( ). FIGS. 11 and 12 show detailed structures of language_set ( ) and text_item respectively.

Normally, one ALBUM.STR file shown in FIG. 1 exists in a recording medium. In a recording medium with a special structure such as a recording medium with a ROM and RAM hybrid structure, however, a plurality of ALBUM.STR files may exist. The ALBUM.STR file is used for combining a plurality of recording media into a configuration that makes the recording media appear as if there were only a single recording medium.

FIG. 13 is a diagram showing the structure of the ALBUM.STR file. As shown in the figure, file_type_id is placed at the head of the file to indicate that the file is ALBUM.STR. file_type_id is followed by album ( ) which is finally followed by text_block ( ).

album ( ) is an area used for recording information used in handling a plurality of volumes, that is, a plurality of recording media, as one integrated volume. FIG. 14 is a diagram showing a detailed structure of album ( ).

As many TITLE_###.VDR files shown in FIG. 1 as titles exist. A title refers to, for example, a musical selection in the case of a compact disc or a program in the case of a television broadcasting. FIG. 15 is a diagram showing the structure of a TITLE_###.VDR file. As shown in the figure, file_type_id is placed at the head of the file to indicate that the file is TITLE_###.VDR. file_type_id is followed by title_info ( ) which is finally followed by text_block ( ). Notation ### is a string of characters representing the number of a title.

title_info ( ) is an area used for recording a start point and an end point of the title on a chunk group and other attributes of the title. FIG. 16 is a diagram showing a detailed structure of title_info ( ).

As many PROGRAM_$$$.PGI files shown in FIG. 1 as programs exist. A program comprises a plurality of cuts each specifying an area of a portion or all of a title. Cuts of a program are played back in a specified order. FIG. 17 is a diagram showing the structure of a PROGRAM_$$$.PGI file. As shown in the figure, file_type_id is placed at the head of the file to indicate that the file is PROGRAM_$$$.PGI. file_type_id is followed by program ( ) which is finally followed by text_block ( ). Notation $$$ is a string of characters representing the number of a program.

program ( ) is an area used for recording information required in an operation to collect necessary portions of titles and play back them without accomplishing irreversible editing of materials. FIG. 18 is a diagram showing a detailed structure of program ( ).

program ( ) shown in FIG. 18 has one play_list. FIG. 19 is a diagram showing details of play_list ( ).

A plurality of play_items ( ) are placed in play list. FIG. 20 is a diagram showing details of play item ( ).

As many CHUNKGROUP_@@@.CGIT files shown in FIG. 1 as many chunk groups exist. A chunk group is a data structure used for arranging a bit stream. When the user normally operates an apparatus for recording and playing back information into and from a recording medium such as a VDR (Video Disc Recorder), the user is not aware of the existence of this file.

FIG. 21 is a diagram showing a CHUNKGROUP_@@@.CGIT file. As shown in the figure, file_type_id is placed at the head of the file to indicate that the file is CHUNKGROUP_@@@.CGIT. file_type_id is followed by chunkgroup_time_base_flags and chunkgroup_time_base_offset which are followed by chunk_connection_info ( ). Finally, chunk_connection_info ( ) is followed by text_block ( ).

chunkgroup_time_base_flags are flags each associated with a reference counter of a chunk group. chunkgroup_time_base_offset shows a start time of a reference time axis of a chunk group. chunkgroup_time_base_offset is a 32-bit value set in a counter which counts up at a frequency of 90 kHz. chunk_connection_info ( ) is an area used for recording peculiar information such as a video switch-over point, and video and audio synchronization. FIG. 22 is a diagram showing a detailed structure of chunk_connection_info ( ).

chunk_connection_info ( ) includes as many loops of chunk_arrangement_info ( ) as chunks pertaining to a chunk group. FIG. 23 is a diagram showing details of chunk_arrangement_info ( ).

As many CHUNK_%%%%.ABST files shown in FIG. 1 as many chunks exist. A chunk is information file for a stream file. FIG. 24 is a diagram showing the structure of a CHUNK_%%%%.ABST file. As shown in the figure, file_type_id is placed at the head of the file to indicate that the file is CHUNK_%%%%.ABST.

The CHUNK_%%%%.MPEG2 file shown in FIG. 1 is a stream file. Unlike other files which are generally used for storing information only, this file is used for storing an MPEG bit stream.

FIG. 25 is a diagram showing a typical configuration of an optical-disc apparatus for recording and playing back information into and from an optical disc used as a recording medium including the files described above. In the optical-disc apparatus, a single optical head 2 is provided for a rewritable optical disc 1. The optical head 2 is used for both reading out and writing information from and into the optical disc 1.

After being demodulated in an RF & demodulation/modulation circuit 3, a bit stream read out by the optical head 2 from the optical disc 1 is subjected to error correction in an ECC circuit 4 before being supplied to a read-out channel buffer 6 for absorbing a difference between a read-out rate and a decode-processing rate by way of a switch 5. An output of the read-out channel buffer 6 is supplied to a decoder 7. The read-out channel buffer 6 is designed so that a system controller 13 is capable of reading and writing the read-out channel buffer 6.

A bit stream output by the read-out channel buffer 6 is decoded by the decoder 7 which outputs video and audio signals as results of decoding. The video signal output by the decoder 7 is supplied to a synthesis circuit 8 to be synthesized therein with a video signal generated by an OSD (On Screen Display) control circuit 9. A result of the synthesis is output through an output terminal P1 to a display unit be displayed on the display unit which is not shown in the figure. In the mean time, the audio signal generated by the decoder 7 is output to a speaker through an output terminal P2 to be played back in the speaker which is also not shown in the figure.

On the other hand, a video signal input from an input terminal P3 and an audio signal input from an input terminal P4 are encoded by an encoder 10 before being supplied to a write-in channel buffer 11 for absorbing a difference between an encode-processing rate and a write-in rate. The write-in channel buffer 11 is also designed so that the system controller 13 is capable of reading and writing the write-in channel buffer 11.

Data stored in the write-in channel buffer 11 is read out from the write-in channel buffer 11 and supplied to the ECC circuit 4 by way of the switch 5. In the ECC circuit 4, an error correction code is added to the data before the data is supplied to the RF & demodulation/modulation circuit 3 to be modulated thereby. A signal, strictly speaking, an RF signal, output by the RF & demodulation/modulation circuit 3 is recorded onto the optical disc 1 by the optical head 2.

An address detecting circuit 12 detects information on an address on a track on an optical disc 1 subjected to a recording or playback operation. The system controller 13 controls operations of components composing the optical-disc apparatus. The system controller 13 comprises a CPU 21 for executing various kinds of control, a ROM unit 22 for storing information such as processing programs to be executed by the CPU 21, a RAM unit 23 for temporarily storing information such as data obtained as a result in the course of processing carried out by the CPU 21 and a RAM unit 24 for storing a variety of information files to be recorded or played back into or from the optical disc 1. The CPU 21 finely adjusts the position of the optical head 2 on the basis of a result of detection output by the address detecting circuit 12. The CPU 21 also controls switching-over operations of the switch 5. Composed of a variety of switches and a variety of buttons, an input unit 14 is operated by the user for entering a variety of commands to the optical-disc apparatus.

Next, a basic operation to read in data from an information file is explained. In an operation to read in data from the VOLUME.TOC information file, for example, the CPU 21 employed in the system controller 13 first confirms the physical address at which the VOLUME.TOC file is recorded in the optical disc 1 and the length of the file by using a file-system operation instruction included in a processing program in advance. Then, the CPU 21 moves the optical head 2 to a read-out position on the basis of information on the address of the VOLUME.TOC file. Subsequently, the CPU 21 sets the optical head 2, the RF & demodulation/modulation circuit 3 and the ECC circuit 4 in a read-out mode and positions the switch 5 on the side of the read-out channel buffer 6. Furthermore, the CPU 21 finely adjusts the position of the optical head 2 before starting a read-out operation by using the optical head 2. In the read-out operation, contents of the VOLUME.TOC file are read out by the optical head 2 and demodulated by the RF & demodulation/modulation circuit 3. The output of the RF & demodulation/modulation circuit 3 is subjected to error correction in the ECC 4 before being stored in the read-out channel buffer 6.

When the amount of data stored in the read-out channel buffer 6 becomes equal to or exceeds the size of the VOLUME.TOC file, the CPU 21 halts the read-out operation. Later on, the CPU 21 reads out the data stored in the read-out channel buffer 6 and stores the data in the RAM unit 24.

Next, a basic operation to write data into an information file is explained by taking the VOLUME.TOC information file as an example. First of all, the CPU 21 searches the file system, that is, the optical disc 1, for a free area having a size equal to or larger than a VOLUME.TOC file, into which data is to be written, and confirms the address of the free area by using a file-system operation instruction included in a processing program in advance.

Then, the CPU 21 transfers the VOLUME.TOC file prepared in the RAM unit 24 and to be newly written into the optical disc 1 to the write-in channel buffer 11. The CPU 21 then moves the optical head 2 to a write-in position on the basis of information on the address of the VOL UME.TOC file. Subsequently, the CPU 21 sets the optical head 2, the RF & demodulation/modulation circuit 3 and the ECC circuit 4 in a write-in mode and positions the switch 5 on the side of the write-in channel buffer 11. Furthermore, the CPU 21 finely adjusts the position of the optical head 2 before starting a write-in operation by using the optical head 2.

In the write-in operation, the newly prepared contents of the VOLUME.TOC file are read out from the write-in channel buffer 11 and supplied to the ECC circuit 4 by way of the switch 5. In the ECC circuit 4, an error correction code is added to the contents before modulation by the RF & demodulation/modulation circuit 3. A signal output by the RF & demodulation/modulation circuit 3 is recorded into the optical disc 1 by the optical head 2. When the amount of data read out from the write-in channel buffer 11 and recorded into the optical disc 1 becomes equal to or exceeds the size of the VOLUME.TOC file, the CPU 21 halts the write-in operation.

Finally, the CPU 21 rewrites a pointer pointing to the VOLUME.TOC file on the file system, that is, the optical disc 1, so as to make the pointer point to the newly written position by using a file-system operation instruction included in the processing program in advance.

Next, a basic operation to play back a stream is explained by taking a CHUNK_0001.MPEG2 file shown in FIG. 1 as an example. First of all, the CPU 21 employed in the system controller 13 confirms the physical address at which the CHUNK_0001.MPEG2 file is recorded in the optical disc 21 and the length of the file by using a file-system operation instruction included in a processing program in advance. Then, the CPU 21 moves the optical head 2 to a read-out position on the basis of information on the address of the CHUNK_0001.MPEG2 file. Subsequently, the CPU 21 sets the optical head 2, the RF & demodulation/modulation circuit 3 and the ECC circuit 4 in a read-out mode and positions the switch 5 on the side of the read-out channel buffer 6. Furthermore, the CPU 21 finely adjusts the position of the optical head 2 before starting a read-out operation by using the optical head 2.

In the read-out operation, contents of the CHUNK_0001.MPEG2 file read out by the optical head 2 are stored in the read-out channel buffer 6 through the RF & demodulation/modulation circuit 3, the ECC circuit 4 and the switch 5. The data stored in the read-out channel buffer 6 is output to the decoder 7 to be decoded by the decoder 7 which outputs video and audio signals as results of decoding. The audio signal generated by the decoder 7 is output to the output terminal P2. In the mean time, the video signal output by the decoder 7 is supplied to the output terminal P1 through the synthesis circuit 8.

When the amount of data read out from the optical disc 1 and decoded by the decoder 7 to be finally displayed becomes equal to the size of the CHUNK_0001.MPEG2 or when an instruction to halt the read-out operation is received from the input unit 14, the CPU 21 stops the read-out and decode processing.

Next, a basic operation to record a stream into an information file is explained by taking the CHUNK_0001.MPEG2 information file as an example. First of all, the CPU 21 searches the file system, that is, the optical disc 1, for a free area having a size equal to or larger than the CHUNK_0001.MPEG2 file, into which a stream is to be written, and confirms the address of the free area by using a file-system operation instruction included in a processing program in advance.

A video signal input from the input terminal P3 and an audio signal input from the input terminal P4 are encoded by an encoder 10 before being supplied to the write-in channel buffer 11. The CPU 21 then moves the optical head 2 to a write-in position on the basis of information on the address of the CHUNK_0001.MPEG2 file. Subsequently, the CPU 21 sets the optical head 2, the RF & demodulation/modulation circuit 3 and the ECC circuit 4 in a write-in mode and positions the switch 5 on the side of the write-in channel buffer 11. Furthermore, the CPU 21 finely adjusts the position of the optical head 2 before starting a write-in operation by using the optical head 2. In the write-in operation, the newly prepared contents of the CHUNK_0001.MPEG2 file are read out from the write-in channel buffer 11 and supplied to optical head 2 by way or the switch 5, the ECC circuit 4 and the RF & demodulation/modulation circuit 3. A signal output by the RF & demodulation/modulation circuit 3 is recorded into the optical disc 1 by the optical head 2.

When the amount of data read out from the write-in channel buffer 11 and recorded into the optical disc 1 becomes equal to the size of the CHUNK_0001.MPEG2 or when an instruction to halt the write-in operation is received from the input unit 14, the CPU 21 stops the write-in processing. Finally, the CPU 21 rewrites a pointer pointing to the CHUNK_0001.MPEG2 file on the file system, that is, the optical disc 1, so as to make the pointer point to the newly written position by using a file-system operation instruction included in the processing program in advance.

Assume that information and stream files shown in FIG. 26 have been recorded in the optical disc 1. In this example, the optical disc 1 includes a file named PROGRAM_001.PGI for storing a program. In addition, the optical disc 1 also includes three title files named TITLE_001.VDR, TITLE_002.VDR and TITLE_003.VDR respectively.

Furthermore, the optical disc 1 also includes two chunk-group information files named CHUNKGROUP_001.CGIT and CHUNKGROUP_002.CGIT. On the top of that, the optical disc 1 includes three stream files named CHUNK_0001.MPEG2, CHUNK_0011.MPEG2 and CHUNK_0012.MPEG2 as well as three information files named CHUNK_0001.ABST, CHUNK_00011.ABST and CHUNK_0012.ABST associated with the CHUNK_0001.MPEG2, CHUNK_0011.MPEG2 and CHUNK_0012.MPEG2 files respectively.

FIG. 27 is a diagram showing the logical structure of the optical disc 1 containing the information and stream files shown in FIG. 26. In this example, the chunk information files named CHUNK_0001.ABST, CHUNK_0011.ABST and CHUNK_0012.ABST specify the CHUNK_0001.MPEG2, CHUNK_0011.MPEG2 and CHUNK_0012.MPEG2 stream files respectively. To put it concretely, in a chunk_file_id field of each of the CHUNK_%%%%.ABST files shown in FIG. 24, the file ID of the associated stream file is specified.

In addition, in this example, the chunk-group information file named CHUNKGROUP_001.CGIT specifies the chunk information file named CHUNK_0001.ABST whereas the chunk-group information file named CHUNKGROUP_002.CGIT specifies the chunk information files named CHUNK_0011.ABST and CHUNK_0012.ABST. To put it concretely, in a chunk_info_file id field of chunk_arrangement_info ( ) shown in FIG. 23, a file ID of chunk information is specified. This chunk_arrangement_info ( ) is included in a chunk group information file. As many chunk_arrangement_infos ( ) as chunks pertaining to a chunk group exist in the data structure. It should be noted that chunk_arrangement_info ( ) shown in FIG. 23 is described in chunk_connection_info ( ) shown in FIG. 22 and this chunk_connection_info is described in the CHUNKGROUP_###.CGIT file shown in FIG. 21.

There is only one chunk_arrangement_info ( ) in CHUNKGROUP_001. The chunk_info_file id field of this chunk_arrangement_info ( ) specifies CHUNK_0001. On the other hand, there are two chunk_arrangement_infos ( ) in CHUNKGROUP_002. The chunk info file id fields of these chunk_arrangement_infos ( ) specify CHUNK_0011 and CHUNK_0012 respectively. Thus, a chunk group can be used to specify an order in which a plurality of chunks are to be played back.

To put it concretely, first of all, an initial value of a timer for the chunk group is determined by chunkgroup_time_base_offset in the CHUNKGROUP_###.CGIT file shown in FIG. 21. Then, when each chunk is cataloged, presentation_start_cg_time_count and presentattion_end_cg_time_count of chunk_arrangement_info ( ) shown in FIG. 23 are specified.

For example, assume that the time lengths of CHUNK_0011 and CHUNK_0012 are A and B respectively as shown in FIG. 28. In this case, presentation_start_cg_count and presentattion_end_cg_count of CHUNK_0011 are equal to chunkgroup_time_base_offset and chunk_group_time_base_offset+A respectively. On the other hand, presentation_start_cg_count and presentattion_end_cg_count of CHUNK_0012 are equal to chunk-group_time_base_offset+A and chunk_group_time_base_offset+A+B respectively. By setting the fields in this way, CHUNKGROUP_002 is defined so that CHUNK_0011 and CHUNK_0012 are played back continuously.

It should be noted that, if the playback time of CHUNK_0011 overlaps the playback time of CHUNK_0012, one of the playback times can be shifted to eliminate the overlapping. In addition, transition info ( ) in chunk_arrangement_info ( ) shown in FIG. 23 is used as a descriptive field used for specifying a special effect such as a fade-in, a fade-out or a wipe in a transition from one stream to another one.

In the example shown in FIG. 26 (or FIG. 27), the TITLE_001.VDR and TITLE_002.VDR title information files specify the CHUNKGROUP_001.CGIT chunk-group information file whereas the TITLE_003.VDR title information file specifies the CHUNKGROUP_002.CGIT chunk-group information file. To put it concretely, a cgit_file_id field in title_info ( ) shown in FIG. 16 specifies the file ID of the chunk group. In addition, fields named title_start_chunk_group time_stamp and title_end_chunk_group_time_stamp are used for specifying a time range in which the title is defined in the chunk group.

In the example shown in FIG. 27, for example, TITLE_001 and TITLE_002 specify the first and second halves of CHUNKGROUP_001. It should be noted that the division conforms to a request made by the user and its position is determined arbitrarily by the user instead of being determined in advance. In this example, let the position of division into TITLE_001 and TITLE_002 be set at a location separated away from the head of CHUNKGROUP_001 by a distance of A.

TITLE_001 specifies CHUNKGROUP_001 as a chunk group and a start time of CHUNKGROUP_001 as a start time of the title. As an end time of the title, a time of a point specified by the user is specified.

That is to say, as title_start_chunk_group_time_stamp of TITLE_001, chunk-group_time_base_offset (the position of the head) of CHUNKGROUP_001 is set whereas, as title_end_chunk_group_time_stamp of TITLE_001, a sum of chunk-group_time_base_offset of CHUNKGROUP_001 and the distance A is set.

TITLE_002 specifies CHUNKGROUP_001 as a chunk group and a time of a point specified by the user is specified a start time of the title. As an end time of the title, an end time of CHUNKGROUP_001 is specified.

That is to say, as title_start_chunk_group_time_stamp of TITLE_002, a sum of chunk-group time_base_offset (the position of the head) of CHUNKGROUP_001 and the distance A is set whereas, as title_end_chunk group time stamp of TITLE_002, a sum of chunk-group time_base_offset of CHUNKGROUP_001 and the length of CHUNKGROUP_001 is set.

TITLE_003 specifies CHUNKGROUP_002 as a chunk group and a start time of CHUNKGROUP_002 is specified a start time of the title. As an end time of the title, an end time of CHUNKGROUP_002 is specified.

That is to say, as title_start_chunk_group_time_stamp of TITLE_003, chunk-group_time_base_offset (the position of the head) of CHUNKGROUP_002 is set whereas, as title_end_chunk_group_time_stamp of TITLE_003, a sum of chunk-group_time_base_offset of CHUNKGROUP_002 and the length of CHUNKGROUP_002 is set.

In addition, in this example, the program information file named PROGRAM_001.PGI specifies that part of TITLE_001 and part of TITLE_003 be played back in an order the parts are enumerated. To put it concretely, title_number in play_item ( ) shown in FIG. 20 is used for specifying a title. Times defined by a title are used for defining start and end points to extract a cut. A plurality of such cuts are gathered to compose a program.

The following is a description of an append-record operation to additionally record new information onto the optical disc 1. To put it concretely, this append-record operation is typically carried out as a video recording operation or carried out by the user by operating the input unit 14 to enter a command to perform video real-time recording to the optical-disc apparatus. In the latter case, a recording button is pressed if the video-recording end time is not known. A button for a one-touch recording function is pressed, however, for a case in which the recording end time can be predicted. The one-touch recording function is a function for carrying out video recording for a fixed period of time.

The append-record operation is explained by taking timer recording as an example. In this case, the user of the optical-disc apparatus specifies, among other things, a recording start time, a recording end time, the bit rate of a bit stream and a channel to be recorded in advance. In addition, at a point of time the video recording is reserved, the optical disc 1 is checked in advance to find out whether or not there is left a free space suited for the bit rate and the length of the recording time.

If another recording operation is carried out on the optical disc 1 between a time a reservation is made and a time to execute the reserved video recording, it is quite within the bounds of possibility that the confirmed free space for implementing the reserved video recording at the specified bit rate can not be allocated any more. In such a case, the CPU 21 either reduces the bit rate to a value smaller than the specified fore in order to record information for the reserved period of time, or records information for a period of time as long as possible by keeping the bit rate unchanged as it is. It is needless to say that the CPU 21 then carries out the recording operation further and, as an inconvenience for the reserved video recording is detected, a message informing the user of the inconvenience is issued.

As the start time of the reserved video recording is approaching, the CPU 21 uses an embedded timer and a clock signal to automatically restore the optical-disc apparatus to an operating mode from a sleep mode. Then, the CPU 21 issues a file-system operation instruction included in the processing program from the beginning to allocate an area used for recording a reserved program on the optical disc 1. That is to say, first of all, the CPU 21 subtracts the start time from the end time of the reserved recording to find the length of the recording time and, then, calculates a product of the length of the recording time and the bit rate to find the size of the necessary area to be allocated for recording the reserved program. In addition to a stream file required in the reserved recording, data may need to be stored in an information file. To be more specific, when a new title needs to be stored in a title information file, an area has to be allocated on the optical disc 1 for recording the title information file. If an area with a sufficient size can not be allocated, it is necessary to adopt the countermeasure technique described above, that is, reduction of the bit rate or carrying out a recording operation only for a period of time corresponding to the allocated area.

It should be noted that, since a new title is stored in this case, the user gives a name to a new stream file, strictly speaking, to a new stream file in a new stream directory. Let the name be ¥MPEGAV¥STREAM_003¥ CHUNK_0031. That is to say, the name of the stream file is CHUNK_0031.MPEG2 in the STREAM_003 directory under the MPEGAV directory in the root directory as shown in FIG. 29.

The CPU 21 issues instructions of execution in the recording mode to other components of the optical-disc apparatus. For example, a video signal received through the input terminal P3 and an audio signal through the input terminal P4 from a tuner not shown in the figure are encoded by the encoder 10 and then stored in a write-in channel buffer 11. Then, the CPU 21 moves the optical head 2 to a write position determined by information on an address of the area allocated earlier. The CPU 21 then sets the optical head 2, the RF & demodulation/modulation circuit 3 and the ECC circuit 4 in a write-in mode and positions the switch 5 on the side of the write-in channel buffer 11. After the position of the optical head 2 has been finely adjusted, a write-in operation using the optical head 2 is started. At that time, data to be recorded in a newly provided file named CHUNK_0031.MPEG2 is read out from the write-in channel buffer 11 to be recorded onto the optical disc 1 by way of the switch 5, the ECC circuit 4, the RF & demodulation/modulation circuit 3 and the optical head 2.

When one of the following events occurs during the write-in operation described above, the CPU 21 halts the operation.
1 The end time of the reserved video recording is reached.
2 Information can no longer be recorded onto the optical disc 1 due to a reason such as an insufficient storage capacity.
3 An instruction to stop the recording operation is received.

Next, by using a file-system operation instruction included in the processing program in advance, the CPU 21 updates a pointer pointing to CHUNK_0031.MPEG2 in the file system with a value pointing to a location at which information has been newly recorded. In addition, the CPU 21 prepares files respectively for chunk information, chunk-group information and title information, gives a name to each of the files and records the information into the files. It should be noted that free spaces for recording the files need to be allocated in advance on the optical disc 1 during the recording operation or at the reservation time.

As a result, new information files are created typically as shown in FIG. 30. In the figure, files names each with an asterisk mark '*' provided on the right side thereof are the names of the files newly created in the operation described above.

Figure 31:
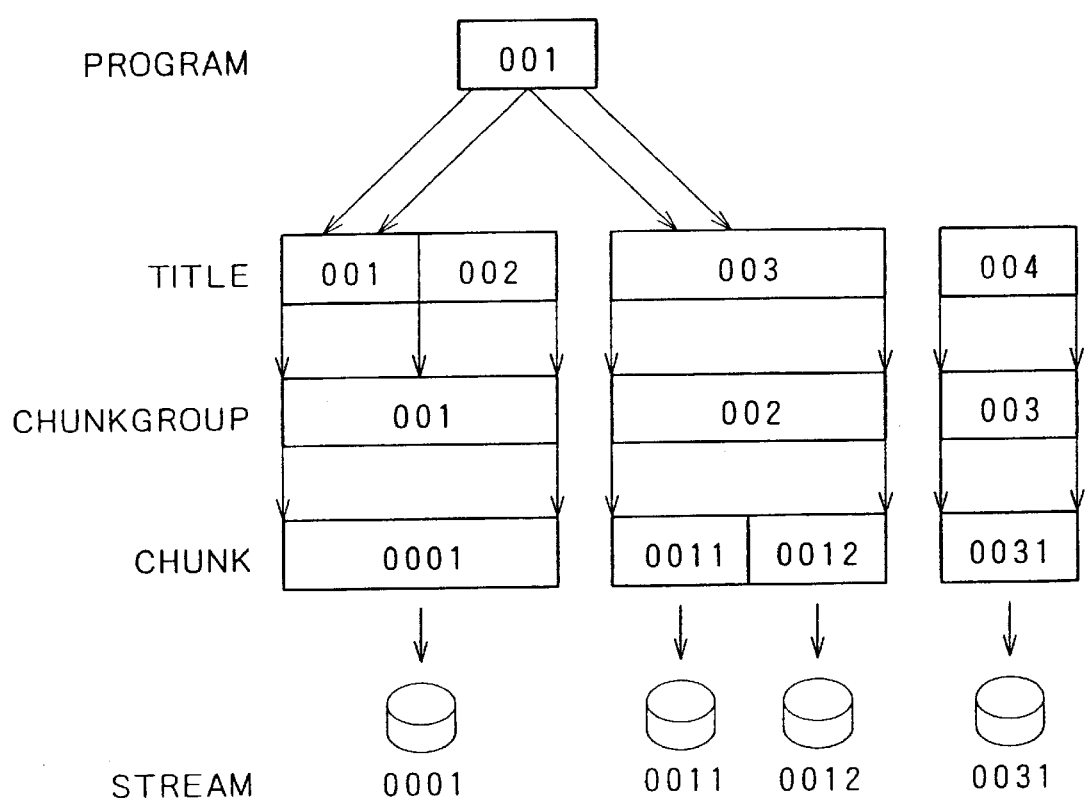
FIG. 31 is an explanatory diagram used for describing a logical organization of directories.

FIG. 31 is a diagram showing a relation among the newly created information files. As shown in the figure, TITLE_004 specifies CHUNKGROUP_003 specifying CHUNK_0031 which specifies STREAM_0031.

That is to say, a new stream is recorded in an information file as TITLE_004. By using a function of the optical-disc apparatus to verify a title, the user is capable of knowing information such as attributes of TITLE_004. In addition, TITLE_004 can be played back.

The following is a description of an operation to overwrite/record information on an optical disc 1 like one shown in FIG. 26 (or FIG. 27). Much like an operation to record a signal onto a video tape, an overwrite-record operation is an operation to record a new program over an existing program already recorded on the optical disc 1, erasing the existing program.

In the overwrite-record operation, a position to start the operation is important. Assume that the user specifies the head of TITLE_001 as a position to start and overwrite-record operation. In this case, the overwrite-record operation is carried out by overwriting existing information recorded in TITLE_001, TITLE_002 and TITLE_003 in an order they are enumerated. If the overwrite-record operation has not been finished even if the end of TITLE_003 is reached, the recording operation is continued by allocating a new free area on the optical disc 1. If TITLE_002 is specified as a location to start an overwrite-record operation, information in TITLE_001 will not be overwritten by the recording operation because TITLE_001 precedes the start location of the operation.

Assume that timer video recording is carried out by overwriting existing information starting with that at the head of TITLE_003. In this case, the user of the optical-disc apparatus specifies, among other things, a recording start time, a recording end time, the bit rate of a bit stream and a channel to be recorded in advance. In addition, the head of TITLE_003 is specified as a recording start location which is of importance to the overwrite-record operation. Furthermore, also in this case, at a point of time the video recording is reserved, the existence of a space suited for the bit rate and the video recording time on the optical disc 1 is verified in advance. In the case of an overwrite-record operation, a sum of the total size of a plurality of rewritable titles starting from a specified location and free areas on the optical disc 1 is a recordable space. To be more specific, in this case, a sum of the total size of STREAM_0011 and STREAM_0012 streams controlled by TITLE_003 and a free area on the optical disc 1 is a recordable space.

In a overwrite-record operation, for the recordable space described above, there are some items available for selection as to what order the video recording is to be actually carried out. As a first conceivable item of selection, it is possible to select a technique to record information in an order streams are specified in the title. To be more specific, in this case, it is possible to select a technique wherein the video recording is started from the head of STREAM_0011 and, as the end of STREAM_0011 is reached, the recording is continued to the head of STREAM_0012. Then, as the end of STREAM_0012 is reached, the video recording is continued to the free space on the optical disc 1. As another technique, first of all, the video recording is carried out on the free area on the optical disc 1 and, at a point of time the free area is all used up, the recording is continued to an existing stream.

The former technique is excellent in a sense that the technique emulates a video tape. That is to say, since the recording operation resembles an operation to record information onto a video tape, the operation is characterized in that the user is capable of comprehending the operation with ease. On the other hand, characterized in that an already recorded stream is erased later, the latter technique is excellent in a sense that recorded information is protected.

It should be noted that, if another recording operation is carried out on the optical disc 1 between a time a reservation is made and a time to execute the reserved video recording, it is quite within the bounds of possibility that the confirmed free space for implementing the reserved video recording at the specified bit rate can not be allocated any more. In such a case, much like the append-record operation described earlier, the CPU 21 either automatically reduces the bit rate to a value smaller than the specified fore in order to record information for the reserved period of time, or records information for a period of time as long as possible by keeping the bit rate unchanged as it is.

As the start time of the reserved video recording is approaching, the optical-disc apparatus is restored from a sleep mode to an operating mode. The CPU 21 allocates all free areas on the optical disc 1. It is needless to say that there is also a method whereby a free area is not allocated at this point of time but allocated at a point of time such an area is required. For the sake of explanation simplicity, a required area is allocated prior to the start of recording.

It should be noted that since the size of a required area is known in advance in timer recording due to the fact that a start time, an end time and a bit rate are specified, only an area with a required size or a required size plus a certain additional margin can be allocated. In case it is necessary to record information files such as a case in which a title information file to be recorded as a new title is required during recording, however, an area with a size sufficient for recording the information files needs to be allocated.

A name is given to a new stream file, strictly speaking, a new stream file in a new stream directory. Let the name be ¥MPEGAV¥STREAM_002¥CHUNK_0031. That is to say, the name of the stream file is CHUNK_0031.MPEG2 in the STREAM_002 directory under the MPEGAV directory in the root directory as shown in FIG. 32.

A video signal received through the input terminal P3 and an audio signal through the input terminal P4 from a tuner not shown in the figure are encoded by the encoder 10 and then stored in a write-in channel buffer 11. Then, the CPU 21 moves the optical head 2 to a write position determined by information on an address of the area allocated earlier. The CPU 21 then sets the optical head 2, the RF & demodulation/modulation circuit 3 and the ECC circuit 4 in a write-in mode and positions the switch 5 on the side of the write-in channel buffer 11. After the position of the optical head 2 has been finely adjusted, a write-in operation using the optical head 2 is started. At that time, data to be recorded in a newly provided file named CHUNK_0031.MPEG2 is read out from the write-in channel buffer 11 to be recorded onto the optical disc 1 by way of the switch 5, the ECC circuit 4, the RF & demodulation/modulation circuit 3 and the optical head 2.

At that time, first of all, the stream file named CHUNK_0011.MPEG2 is rewritten. After the recording has reached the end of the stream file named CHUNK_0011.MPEG2, then, the operation is continued to a stream file named CHUNK_0012.MPEG2 prior to continuation to a stream file named CHUNK_0031.MPEG2.

While the processing described above is being carried out, the CPU 21 halts the write-in operation at a point of time any one of the 3 conditions described earlier is met.

Then, the CPU 21 executes a file-system operation instruction included in the processing program in advance to update the stream files, chunk information, chunk-group information and title information.

By the way, the configuration of files is changed with timing synchronized to completion of the write-in operation. For example, when recording is carried out on the stream file named CHUNK_0031.MPEG2 after the write-in operations of the 2 stream files named CHUNK_0011.MPEG2 and CHUNK_0012.MPEG2 have been completed, the configuration of files on the optical disc 1 is changed to one shown in FIG. 33. A file name with an asterisk mark '*' appended on the right side thereof is the name of a file newly created this time.

Figure 34:
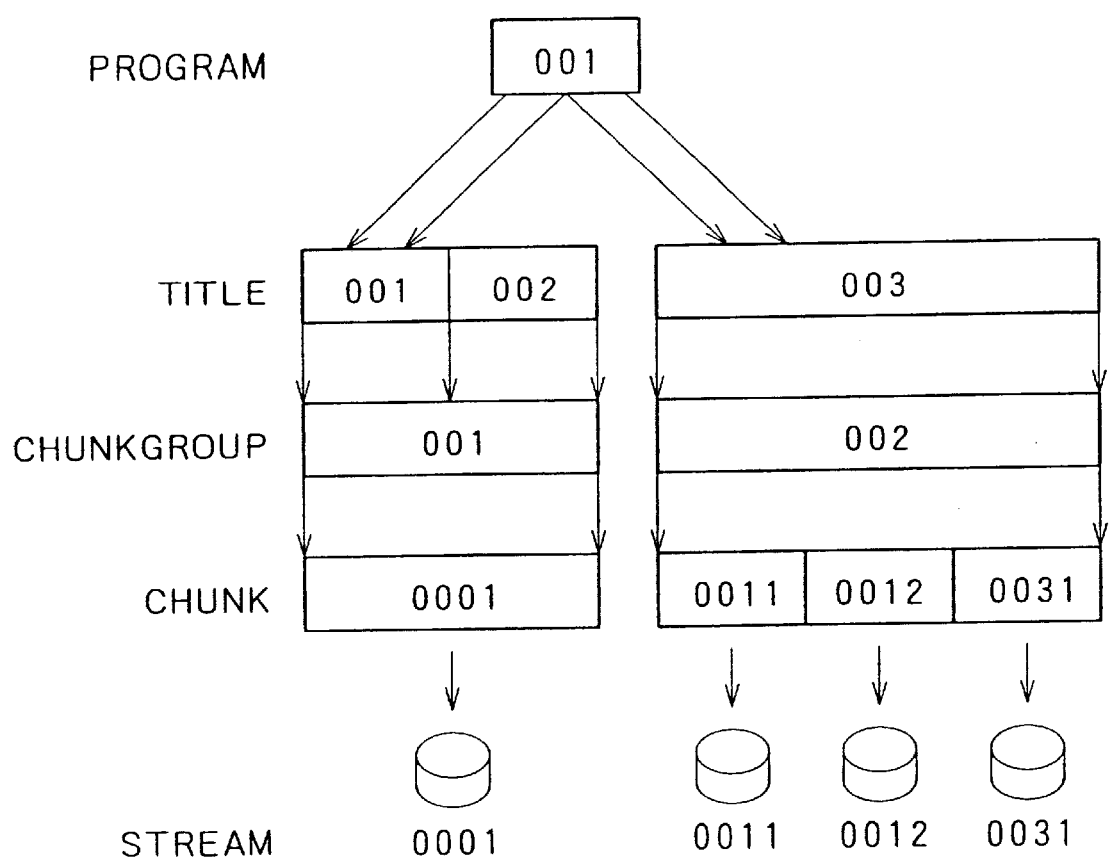
FIG. 34 is an explanatory diagram used for describing a logical organization of directories.

FIG. 34 is a diagram showing a relation of files newly created in this way, that is, files shown in FIG. 33. When compared with that shown in FIG. 31, it is obvious that CHUNK_0031 is added as a chunk included in CHUNKGROUP_002 specified by TITLE_003 and CHUNK_0031 specifies STREAM_0031.

Figure 35:
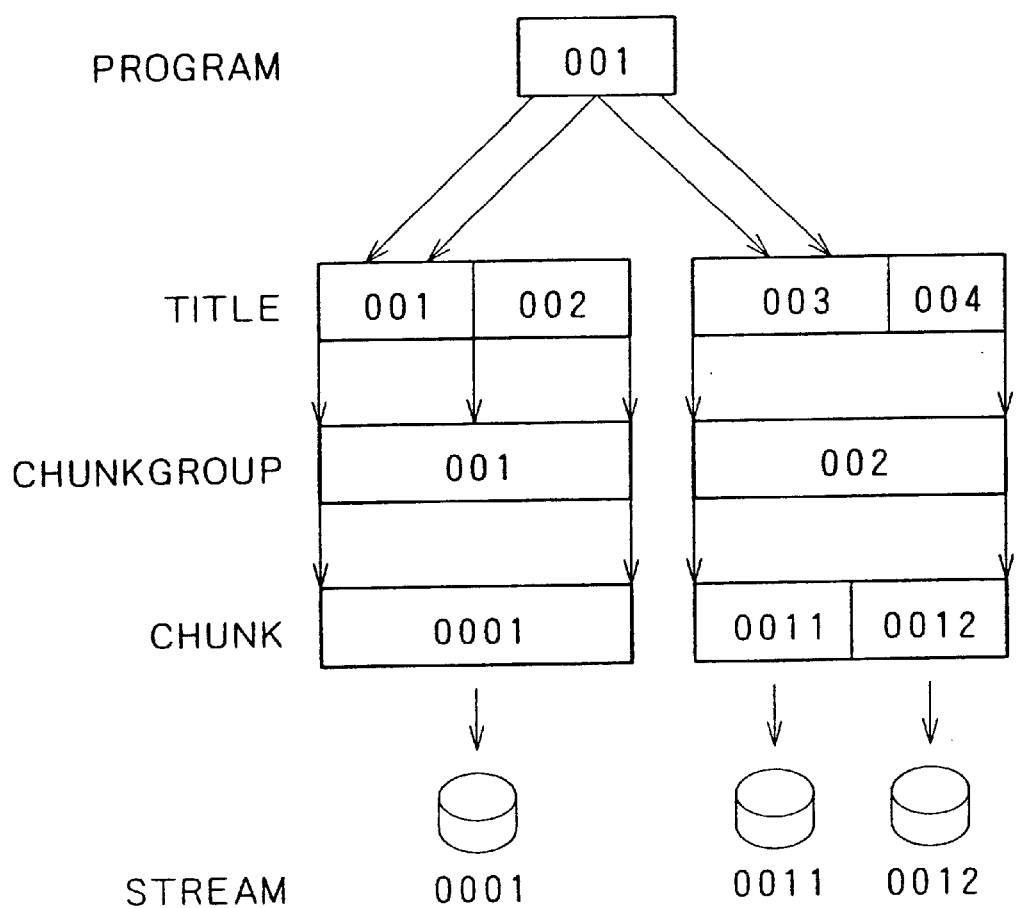
FIG. 35 is an explanatory diagram used for describing a logical organization of directories.

On the other hand, if the overwrite-record operation is completed while data is being written into an existing stream file, that is, if the overwrite-record operation is completed while data is being written into the stream file named CHUNK_0011.MPEG2 for example, the free area allocated for the overwrite operation on the stream file named CHUNK_0031.MPEG2 is released because no data is overwritten into the file. In this case, special title processing is carried out. To put it in detail, when an overwrite-record operation is started at the head of TITLE_003 and the operation is completed in the middle of it, the title is split. To be more specific, as shown in FIG. 35, new TITLE_003 is assigned to a region between the start position of the overwrite-record operation and the position of completion whereas TITLE_004 is given to an area following the region, that is, the rest of the area to which TITLE_003 is supposed to be assigned originally.

Next, an operation to play back a title is explained. Now, assume that an optical disc 1 having files shown in FIG. 26 is inserted into the optical-disc apparatus and a title is then played back from the disc 1. When the optical disc 1 is inserted into the apparatus, first of all, the CPU 21 reads out data from information files on the optical disc 1 and stores the data into the RAM unit 24. This processing is carried out by repeating the basic operation to read in data from an information file described earlier.

To be more specific, first of all, the CPU 21 reads out data from VOLUME.TOC and ALBUM.STR. Then, the CPU 21 examines the directory named TITLE to find out how many files with a name extension ".VDR" exist in the directory. A file with such a name extension is a file having title information. The number of files is equal to the number of titles. In the example shown in FIG. 26, the number of titles is three. Then, the CPU 21 reads out title information from the three files and stores the information into the RAM unit 24.

The CPU 21 controls the OSD control circuit 9 to let the OSD control circuit 9 generate character information, that is, information on titles recorded on the optical disc 1. The character information is synthesized by the synthesis circuit 8 with a video signal. A result of the synthesis is then output through the output terminal P1 to be displayed on the display unit. To be more specific, the length and attributes of each of the 3 existing titles existing in this example are displayed. The attributes include the name of the title and a date on which the title was recorded.

Assume that the user specifies TITLE_002 as a title to be played back for example. In the information file of TITLE_

002, to be more specific, in the cgit_file_id field of title_ info ( ) shown in FIG. 16, a file ID specifying CHUNKGROUP_001 is recorded. The CPU 21 records the file ID and stores CHUNKGROUP_001 in the RAM unit 24.

Then, the CPU 21 examines which CHUNK the start and end times of TITLE_002 correspond to. The start and end times are recorded respectively in the title_start_chunk_ group_time_stamp and title_end_chunk_group_time_ stamp fields of title_info shown in FIG. 16. The examination is carried out by comparison with information included in information on a CHUNKGROUP in which their respective chunks have been recorded. To be more specific, the examination is done by comparison with information recorded in the presentation start cg time count and presentation_end cg_time_count fields of chunk_ arrangement_info ( ) shown in FIG. 23. In this example, the start time of TITLE_002 is known to be in the midst of CHUNK_0001 as shown in FIG. 27. That is to say, it is obvious that, in order to play back TITLE_002 from the head thereof, the playback operation needs to be started from the middle of the CHUNK_0001.MPEG2 stream file.

Subsequently, the CPU 21 examines the stream in order to determine which part of the stream corresponds to the head of TITLE_002. That is to say, the CPU 21 computes the magnitude of an offset time (a time stamp) in the stream corresponding to the head of TITLE_002. Next, by using characteristic-point information in the CHUNK file, a playback start point corresponding to a point immediately before the start time is identified. In this way, an offset distance of the playback start point from the head of the file can be confirmed.

Then, by using a file-system operation instruction included in the processing program in advance, the CPU 21 confirms a physical address on the optical disc 1 in which CHUNK_0001.MPEG2 has been recorded and the length thereof. Further, the offset address of the playback start point found earlier is added to this physical address to finally confirm the address of the playback start point of TITLE_ 002.

Subsequently, the CPU 21 moves the optical head 2 to a read-out position determined by information on the address of the CHUNK_0001.MPEG2 file. The CPU 21 then sets the optical head 2, the RF & demodulation/modulation circuit 3 and the ECC circuit 4 in a read-out mode and positions the switch 5 on the side of the read-out channel buffer 6. After the position of the optical head 2 has been finely adjusted, a read-out operation using the optical head 2 is started. At that time, data read out from the file named CHUNK_0001.MPEG2 is stored in the readout channel buffer 6.

The data stored in the read-out channel buffer 6 is then output to the decoder 7 to be decoded thereby. As results of decoding, the decoder 7 outputs video and audio signals. At a point of time the amount of the data read out from the optical disc 1, decoded by the decoder 7 and displayed on the display unit becomes equal to the size of the CHUNK_ 0001.MPEG2 file, the CPU 21 makes the playback operation transit to TITLE_003. An operation to play back information from TITLE_003 is carried out in the same way as TITLE_002.

As the operation to play back data from the recorded titles is completed or as an instruction to halt the read-out operation is received, the read-out and decoding processing is terminated.

It should be noted that, when a new disc or a disc with a different format is inserted into the optical-disc apparatus as the optical disc 1, the CPU 21 makes an attempt to read out VOLUME.TOC and ALBUM.STR from the inserted disc. However, these files usually do not exist in the newly inserted disc. In such a case, that is, in case VOLUME.TOC and ALBUM.STR can not be read out, the CPU 21 issues a message to make a request for an instruction from the user. In response to the message, the user gives an instruction to the CPU 21 to eject the optical disc 1 in case the newly inserted disc has a different format, or to initialize the optical disc 1 in case the newly inserted disc is a new disc even with the same format. As an alternative, the instruction may cause data on the newly inserted disc to be recovered by using some methods in case the data has been destroyed from the disc which has the same format.

Next, write protection is explained more. The case of the optical disc 1 is provided with a write-inhibit notch which is shown in none of the figures. By operating the write-inhibit notch, an operation to write data over the optical disc 1 can be disabled. In addition to this write-inhibit notch, information on write protection can be recorded into the optical disc 1 as data. To be more specific, information on write protection can be written into write_protect ( ) [shown in FIG. 7] of volume_information ( ) [shown in FIG. 3] of VOLU-ME.TOC [shown in FIG. 2], flags_for_title of title_info ( ) [shown in FIG. 16] of TITLE-###.VDR [shown in FIG. 15] or flags_for_program of program ( ) [shown in FIG. 18] of PROGRAM_$$$.PGI [shown in FIG. 17].

Write protection is further explained by taking write_ protect shown in FIG. 7 as an example. write_protect_ length of write_protect ( ) shown in FIG. 7 is an area used for recording the length of write_protect ( ). As shown in FIG. 36, volume_write_protect_level is an area used for recording information used for setting write protection for all titles and all programs recorded in the optical disc 1. A level of 0 indicates that no write protection is set. That is to say, in the case of a 0 level, data can be written over the optical disc 1 freely. On the other hand, a level of 1 indicates that only volume_write_protect_level can be modified. A level of 2 indicates that ALBUM.STR and data protected by protection levels lower than 2 except 0 can be modified. A level of 3 indicates that VOLUME.TOC and data protected by protection levels lower than 3 except 0 can be modified.

A level of 4 indicates that a program and data protected by protection levels lower than 4 except 0 can be modified. A level of 5 indicates that a title and data protected by protection levels lower than 5 except 0 can be modified. Finally, a level of 6 indicates that a file with an extension .MPEG2, .ABST or .CGIT added to the name thereof as a suffix and data protected by protection levels lower than 6 except 0 can be modified.

password_enable_flag is a field used for describing a flag indicating whether password_for_volume_write_ protect to be described later is valid or invalid. If the flag indicates that password for volume_write_protect is valid, it is necessary to enter a password matching that recorded in password_for_volume_write_protect in order to modify write_protect ( ). By modification of write_protect ( ), creation of new write_protect ( ), modification of existing write_protect ( ) or deletion of existing write_protect ( ) is meant. append_only_flag is a field used for describing a flag for limiting modification of a range allowed by volume_write_protect_level to further addition only. If this flag is valid, already existing information can not be rewritten.

expiration_time_enable_flag is a field used for describing a flag indicating whether write_protect_expiration_ time ( ) to be described later is valid or invalid. number_ of_times_enable flag is a field used for describing a flag indicating whether number_of_times to be described later is valid or invalid. password_for_volume_write_protect is an area used for recording a password required for modifying write_protect ( ).

write_protect_set_time ( ) is an area used for recording a time and a date write_protect ( ) was set or modified least recently in terms of years, months, days, hours, minutes and seconds which are each expressed in the BCD format. write_protect_expiration_time ( ) is an area used for recording information on a time and a date showing a term of validity in terms of years, months, days, hours, minutes and seconds which are each expressed in the BCD format. A term of validity of a password is set in this area. When the term of validity expires, information on write_protect ( ) can be modified by the user without the need for the user to enter a password. An indefinite term of validity can also be set.

Figure 37:
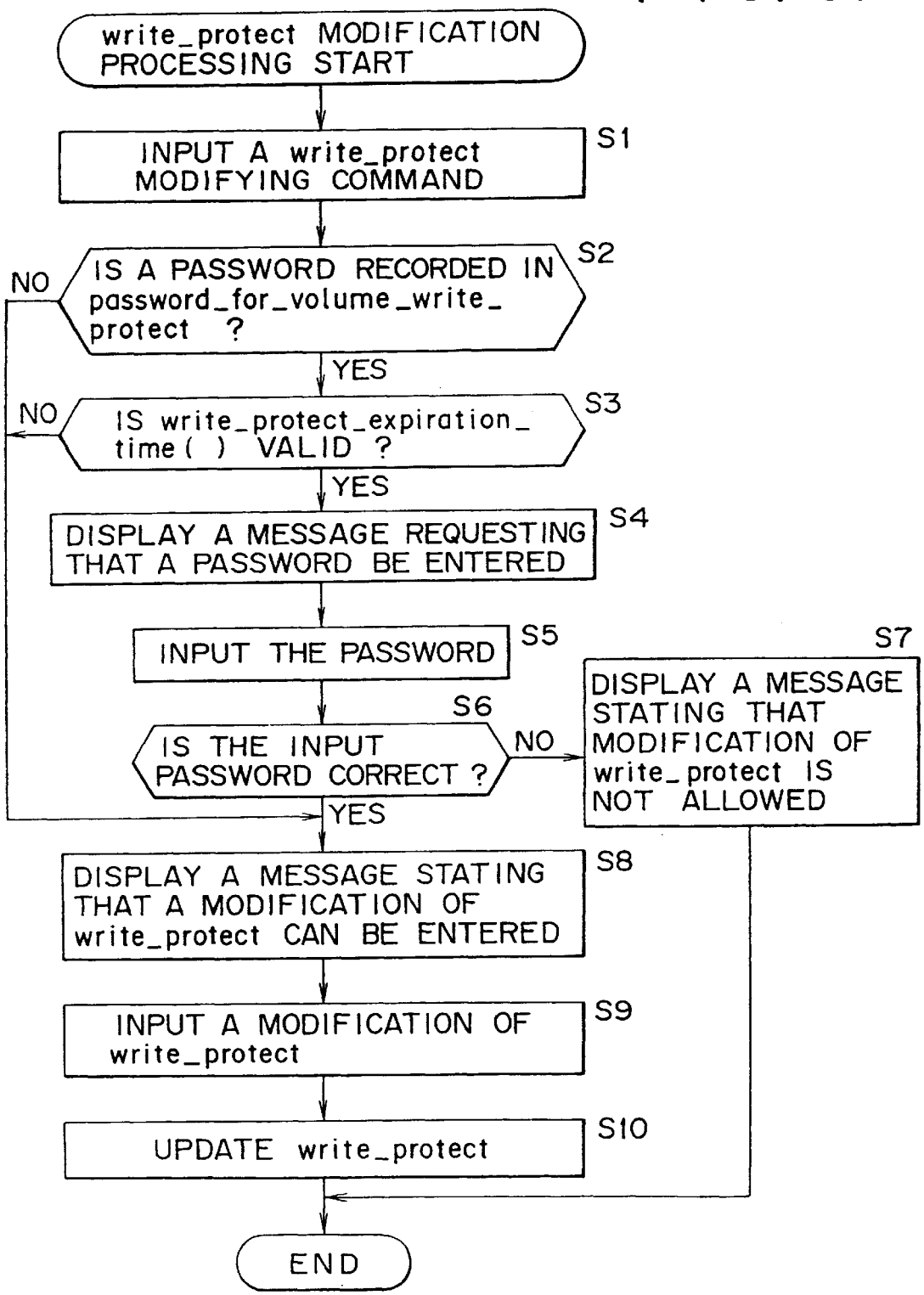
FIG. 37 is a flowchart representing processing to modify write_protect.

Next, processing to modify write_protect is explained by referring to a flowchart shown in FIG. 37. As shown in the figure, the processing begins with a step S1 at which the user enters a command to modify write_protect by operating the input unit 14. The flow of the processing then goes on to a step S2 at which the CPU 21 forms a judgment as to whether or not a predetermined password has been recorded in password_for_volume_write_protect in write_Protect ( ) of volume_information ( ) in VOLUME.TOC stored in the RAM unit 24. If password_enable_flag is 1 and a valid password has been recorded in password_for_volume_write_protect, the flow of the processing proceeds to a step S3 at which the CPU 21 forms a judgment as to whether or not write_protect_expiration_time ( ) in write_protect ( ) is still valid at the present time.

That is to say, the CPU 21 forms a judgment as to whether or not the present time is within a term of validity of the password which is recorded in write_protect_expiration_time ( ). If the outcome of the judgment indicates that the password is valid, the flow of the processing continues to a step S4 at which the CPU 21 controls the OSD control circuit 9 to let a message be generated to request the user to enter a password. The message is output through the synthesis circuit 8 and the output terminal P1 to be displayed on the display unit. The flow of the processing then goes on to a step S5 at which the user sees the message and, in response to this message, the user enters a password by operating the input unit 14.

Then, the flow of the processing proceeds to a step S6 at which the CPU 21 forms a judgment as to whether or not the password entered by the user at the step S5 is correct, that is, a judgment as to whether or not the password entered by the user at the step S5 matches the password recorded in password_for_volume_write_protect. If the outcome of the judgment indicates that the entered password matches the recorded password, the flow of the processing continues to a step S8 at which the CPU 21 controls the OSD control circuit 9 to let a message be generated to indicate that the user is allowed to change write_protect. The message is output through the synthesis circuit 8 and the output terminal P1 to be displayed on the display unit.

The flow of the processing then goes on to a step S9 at which the user sees the message and, in response to this message, the user enters information for changing write_protect by operating the input unit 14. After such information has been input, the flow of the processing proceeds to a step S10 at which the CPU 21 updates write_protect in accordance with the input information. To put it in detail, the CPU 21 updates the contents of write_protect stored in the RAM unit 24 and records the updated contents into the optical disc 1.

If the outcome of the judgment formed at the step S6 indicates that the entered password does not match the recorded password, on the other hand, the flow of the processing continues to a step S7 at which the CPU 21 controls the OSD control circuit 9 to let a message be generated and displayed on the display unit to indicate that the user is not allowed to change write_protect. In this case, the user is not capable of changing write_protect and the pieces of processing carried out at the steps S8 to S10 are skipped.

If the outcome of the judgment formed at the step S2 indicates that no password has been recorded in password_for_volume_write_protect or the outcome of the judgment formed at the step S3 indicates that write_protect_expiration_time ( ) in write_Protect ( ) has expired, indicating that a recorded password is not valid any more at the present time, on the other hand, the flow of the processing proceeds to the step S8 at which the pieces of processing of the step S8 and the subsequent steps are carried out. In this case, the user is allowed to update write_protect freely.

Figure 39:
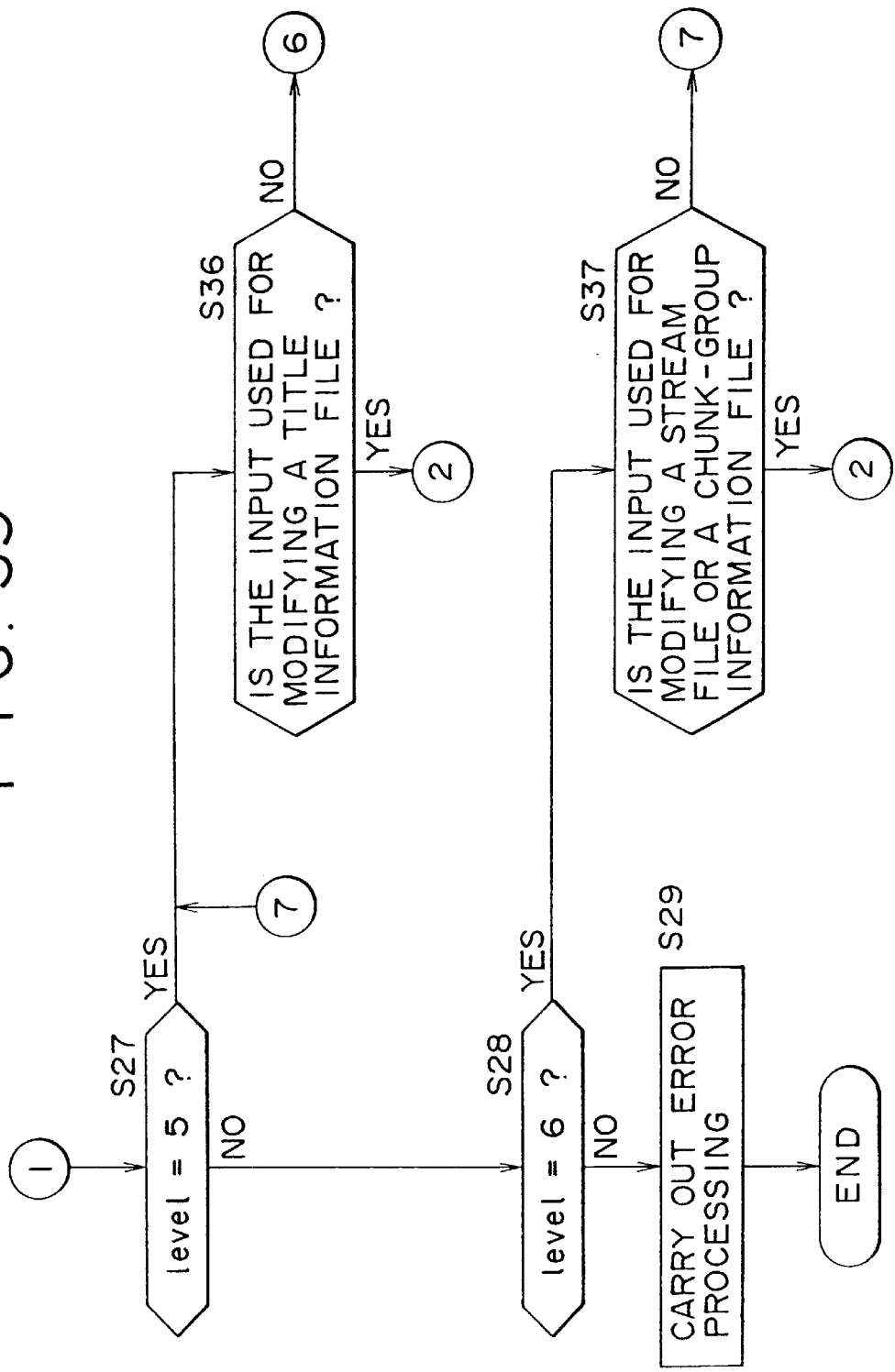
FIG. 39 is a continuation of the flowchart representing recording processing shown in FIG. 38.

Next, processing to record predetermined data into the optical disc 1 is explained by referring to a flowchart shown in FIGS. 38 and 39. This processing is started when the user enters a command to record the predetermined data by operating the input unit 14. As shown in FIG. 38, the processing begins with a step S21 at which the CPU 21 executes processing to read in volume_write_protect_level of write_protect ( ) stored in the RAM unit 24. The flow of the processing then goes on to steps S22 to S28 to form judgments as to whether or not volume_write_protect_level is set at a value of 0 to 6 respectively.

To put it in detail, if the outcome of the judgment formed at the step S22 indicates that volume_write_protect_level is set at 0, the flow of the processing proceeds to a step S30 at which the CPU 21 carries out processing to record the data in accordance with the command entered by the user by operating the input unit 14. That is to say, since the value of volume_write_protect_level indicates that an overwrite operation is not prohibited, the user is allowed to carry out processing to record data freely.

If the outcome of the judgment formed at the step S23 indicates that volume_write_protect_level is set at 1, the flow of the processing proceeds to a step S31 at which the CPU 21 forms a judgment as to whether or not the input data is data to be recorded in volume_write_protect_level itself. As described before by referring to FIG. 36, a value of volume_write_protect_level equal to 1 indicates that the user is allowed to update volume_write_protect_level itself but a write operation over other data is prohibited. Thus, if the outcome of the judgment formed at the step S31 indicates that the input data is data to be recorded in volume_write_protect_level itself, the flow of the processing proceeds to the step S30 at which the CPU 21 carries out processing to write the data over volume_write_protect_level. If the outcome of the judgment formed at the step S31 indicates that the input data is not data to be recorded in volume_write_protect_level, on the other hand, the flow of the processing continues to a step S32 at which the CPU 21 controls the OSD control circuit 9 to let a message indicating that that the recording operation is prohibited be generated and displayed on the display unit.

If the outcome of the judgment formed at the step S24 indicates that volume_write_protect_level is set at 2, the flow of the processing proceeds to a step S33 at which the CPU 21 forms a judgment as to whether or not the input data is data to be recorded in ALBUM.STR. A value of volume_write_protect_level equal to 2 indicates that the user is allowed to update only ALBUM.STR and volume_write_protect_level, that is, data at a level lower than ALBUM.STR. Thus, if the outcome of the judgment formed at the step S33 indicates that the input data is data to be recorded in ALBUM.STR, the flow of the processing proceeds to the step S30 at which the CPU 21 carries out processing to write the input data over A LBUM.STR. If the outcome of the judgment formed at the step S33 indicates that the input data is not data to be recorded in ALBUM.STR, on the other hand, the flow of the processing proceeds to the step S31 at which the CPU 21 carries out processing of this step and the subsequent processing. To put it in detail, if the outcome of the judgment formed at the step S31 indicates that the input data is data to be recorded in volume_write_protect_level itself, the recording operation is allowed, but if the outcome of the judgment formed at the step S31 indicates that the input data is not data to be recorded in volume_write_protect_level, on the other hand, the recording operation is prohibited.

If the outcome of the judgment formed at the step S25 indicates that volume_write_protect_level is set at 3, the flow of the processing proceeds to a step S34 at which the CPU 21 forms a judgment as to whether or not the input data is data to be recorded in VOLUME.TOC. A value of volume_write_protect_level equal to 3 indicates that the user is allowed to update only VOLUME.TOC, ALBUM.STR and volume_write_protect_level. Thus, if the outcome of the judgment formed at the step S34 indicates that the input data is data to be recorded in VOLUME.TOC, the flow of the processing proceeds to the step S30 at which the CPU 21 carries out processing to write the input data over existing data. If the outcome of the judgment formed at the step S34 indicates that the input data is not data to be recorded in VOLUME.TOC, on the other hand, the flow of the processing proceeds to the step S33 at which the CPU 21 carries out processing of this step and the subsequent processing. To put it in detail, if the outcome of the judgment formed at the step S33 indicates that the input data is data to be recorded in ALBUM.STR or volume_write_protect_level itself, the recording operation is allowed, but if the outcome of the judgment formed at the step S33 indicates that the input data is not data to be recorded in ALBUM.STR or volume_write_protect_level, on the other hand, the recording operation is prohibited.

If the outcome of the judgment formed at the step S26 indicates that volume_write_protect_level is set at 4, the flow of the processing proceeds to a step S35 at which the CPU 21 forms a judgment as to whether or not the input data is data to be recorded in a program information file. A value of volume_write_protect_level equal to 4 indicates that the user is allowed to update only a program information file, VOLUME.TOC, ALBUM.STR and volume_write_protect_level.

Thus, if the outcome of the judgment formed at the step S35 indicates that the input data is data to be recorded in a program information file, the flow of the processing proceeds to the step S30 at which the CPU 21 carries out processing to write the input data over existing data. If the outcome of the judgment formed at the step S35 indicates that the input data is not data to be recorded in a program information file, on the other hand, the flow of the processing proceeds to the step S34 at which the CPU 21 carries out processing of this step and the subsequent processing. To put it in detail, if the outcome of the judgment formed at the step S34 indicates that the input data is data to be recorded in VOLUME.TOC, ALBUM.STR or volume_write_protect_level itself, the recording operation is allowed, but if the outcome of the judgment formed at the step S34 indicates that the input data is not data to be recorded in VOLUME.TOC, ALBUM.STR or volume_write_protect_level, on the other hand, the recording operation is prohibited.

If the outcome of the judgment formed at the step S27 indicates that volume_write_protect_level is set at 5, the flow of the processing proceeds to a step S36 at which the CPU 21 forms a judgment as to whether or not the input data is data to be recorded in a title information file. A value of volume_write_protect_level equal to 5 indicates that the user is allowed to update only a title information file, a program information file, VOLUME.TOC, ALBUM.STR and volume_write_protect_level. Thus, if the outcome of the judgment formed at the step S36 indicates that the input data is data to be recorded in a title information file, the flow of the processing proceeds to the step S30 at which the CPU 21 carries out processing to write the input data over existing data. If the outcome of the judgment formed at the step S36 indicates that the input data is not data to be recorded in a title information file, on the other hand, the flow of the processing proceeds to the step S35 at which the CPU 21 carries out processing of this step and the subsequent processing. To put it in detail, if the outcome of the judgment formed at the step S35 indicates that the input data is data to be recorded in a program information file, VOLUME.TOC, ALBUM.STR or volume_write_protect_level itself, the recording operation is allowed, but if the outcome of the judgment formed at the step S35 indicates that the input data is not data to be recorded in a program information file, VOLUME.TOC, ALBUM.STR or volume_write_protect_level, on the other hand, the recording operation is prohibited.

If the outcome of the judgment formed at the step S28 indicates that volume_write_protect_level is set at 6, the flow of the processing proceeds to a step S37 at which the CPU 21 forms a judgment as to whether or not the input data is data to be recorded in a stream file or a chunk-group information file. A value of volume_write_protect_level equal to 6 indicates that the user is allowed to update only a stream file, a chunk-group information file, a title information file, a program information file, VOLUME.TOC, ALBUM.STR and volume_write_protect_level. Thus, if the outcome of the judgment formed at the step S37 indicates that the input data is data to be recorded in a stream file or a chunk-group information file, the flow of the processing proceeds to the step S30 at which the CPU 21 carries out processing to write the input data over existing data. If the outcome of the judgment formed at the step S37 indicates that the input data is not data to be recorded in a stream file or a chunk-group information file, on the other hand, the flow of the processing proceeds to the step S36 at which the CPU 21 carries out processing of this step and the subsequent processing. To put it in detail, if the outcome of the judgment formed at the step S36 indicates that the input data is data to be recorded in a title information file, a program information file, VOLUME.TOC, ALBUM.STR or volume_write_protect_level itself, the recording operation is allowed, but if the outcome of the judgment formed at the step S36 indicates that the input data is not data to be recorded in a title information file, a program information file, VOLUME.TOC, ALBUM.STR or volume_write_protect_level, on the other hand, the recording operation is prohibited.

If the outcome of the judgment formed at the step S28 indicates that volume_write_protect_level is not set at 6 either, on the other hand, the flow of the processing proceeds to a step S29 at which error handling is carried out. This is because volume_write_protect_level can be set only at a value in the range 0 to 6 shown in FIG. 36. Thus, a value of volume_write_protect_level in the range 7 to 15 not used for the time being is an error which needs to be processed.

FIG. 40 is an explanatory diagram used for describing a relation of volume_write_protect_level. As shown in the figure, at each level, an operation to update data of this level itself and data on the inner side of this level, that is, data at a level represented by a value smaller than a value for this level, is allowed. However, an operation to update data on the outer side of this level, that is, data at a level represented by a value greater than the value for this level, is prohibited.

write_protect ( ) has been explained so far. Information on write protection similar to write_protect is also described in flags_for_title and flags_for_program, on the basis of which similar processing is carried out.

It should be noted that write protection is controlled in accordance with the value of a logical sum of the setting position of the write-protect notch provided on the case of the optical disc 1 and pieces of information stored in write_protect ( ), flags_for_title and flags_for_program of VOLUME.TOC. To be more specific, prohibition of processing to record data is implemented even if only one of them prescribes that a write operation is prohibited.

Next, play_protect ( ) shown in FIG. 8 is further explained. In this play_protect ( ), it is possible to set protect information to be referred to in a playback operation for all titles or all programs recorded in the optical disc 1. Protect information to be referred to in a playback operation for individual titles or individual programs is recorded in flags_for_title of title_info ( ) shown in FIG. 16 or in flags_for_program of program shown in FIG. 18.

play_protect_length is an area used for recording a number expressing the length of play_protect ( ) in terms of bytes. volume_play_protect_flag is an area used for recording a flag representing protection status to be referred to in a playback operation for the entire volume (the entire optical disc 1). As shown in FIG. 41, there are 4 types of status that can be set in the flag.

To be more specific, a value of 00 set in the flag indicates that an operation to play back information from all titles and all programs is allowed. A value of 01 set in the flag indicates that an operation to play back information from a program is allowed but an operation to play back information from a title is not. On the other hand, a value of 10 set in the flag indicates that an operation to play back information from a title is allowed but an operation to play back information from a program is not. Finally, a value of 11 set in the flag indicates that an operation to play back information from all titles and all programs is prohibited.

password enable flag is a flag for indicating whether password_for_volume_play_protect is valid or invalid.

expiration_time_enable_flag is a flag for indicating whether play_protect_expiration_time ( ) to be described later is valid or invalid. If expiration_time_enable_flag indicates that play_protect_expiration_time ( ) is valid, password_for_volume_play_protect has a term of validity indicated by play_protect_expiration_time ( ).

number_of_times_enable_flag is a flag for indicating whether number_of_times to be described later is valid or invalid.

password_for_volume_play_protect is an area used for recording a password which is referred to when the level of a password or the term of validity is changed.

play_protect_set_time ( ) is an area used for recording a setting time in terms of years, months, days, hours, minutes and seconds which are each expressed in the BCD format.

play_protect expiration_time ( ) is an area for recording a term of validity in terms of years, months, days, hours, minutes and seconds which are each expressed in the BCD format. A term of validity can be set for a password. When the term expires, the play_protect information can be changed without a password. An indefinite term can be set as a term of validity.

number_of_times cited above is an area used for recording the number of times information has been recorded.

Next, processing to change play_protect is explained by referring to a flowchart shown in FIG. 42. As shown in the figure, the processing begins with a step S51 at which the user enters a command to change play_protect by operating the input unit 14. The flow of the processing then goes on to a step S52 at which the CPU 21 forms a judgment as to whether or not a predetermined password has been recorded in password_for_volume_play_protect in play_protect ( ) of volume_information ( ) in VOLUME.TOC stored in the RAM unit 24. If a password has been recorded therein, the flow of the processing proceeds to a step S53 at which the CPU 21 forms a judgment as to whether or not play_protect_expiration_time ( ) in play_protect ( ) is still valid at the present time.

That is to say, the CPU 21 forms a judgment as to whether or not the present time is within a term of validity of the password which is recorded in play_protect_expiration_time. If the outcome of the judgment indicates that the password is valid, the flow of the processing continues to a step S54 at which the CPU 21 controls the OSD control circuit 9 to let a message be generated to request the user to enter a password. The message is output through the synthesis circuit 8 and the output terminal P1 to be displayed on the display unit. The flow of the processing then goes on to a step S55 at which the user sees the message and, in response to this message, the user enters a password by operating the input unit 14.

Then, the flow of the processing proceeds to a step S56 at which the CPU 21 forms a judgment as to whether or not the password entered by the user at the step S55 is correct, that is, a judgment as to whether or not the password entered by the user at the step S55 matches the password stored in password_for_volume play_protect. If the outcome of the judgment indicates that the entered password matches the stored password, the flow of the processing continues to a step S58 at which the CPU 21 controls the OSD control circuit 9 to let a message be generated to indicate that the user is allowed to change play_protect. The message is output through the synthesis circuit 8 and the output terminal P1 to be displayed on the display unit.

The flow of the processing then goes on to a step S59 at which the user sees the message and, in response to this message, the user enters information for changing play_protect by operating the input unit 14. After such information has been input, the flow of the processing proceeds to a step S60 at which the CPU 21 updates play_protect in accordance with the input information. To put it in detail, the CPU 21 updates the contents of play_protect stored in the RAM unit 24 and records the updated contents into the optical disc 1.

If the outcome of the judgment formed at the step S56 indicates that the entered password does not match the stored password, on the other hand, the flow of the processing continues to a step S57 at which the CPU 21 controls the OSD control circuit 9 to let a message be generated and displayed on the display unit to indicate that the user is not allowed to change play_protect. In this case, the user is not allowed to change play_protect and the pieces of processing carried out at the steps S58 to S60 are skipped.

If the outcome of the judgment formed at the step S52 indicates that no valid password has been recorded in password_for_volume_play_protect or the outcome of the judgment formed at the step S53 indicates that play_protect_expiration_time ( ) in play_protect ( ) is not valid any more at the present time, on the other hand, the flow of the processing proceeds to the step S58 at which the pieces of processing of the step S58 and the subsequent steps are carried out. In this case, the user is allowed to update play_protect freely.

Next, a playback operation is explained by referring to a flowchart shown in FIG. 43. This processing is started when the user operates the input unit 14 to enter a command to play back information from the optical disc 1.

As shown in the figure, the processing begins with a step S71 at which the CPU 21 reads out volume_play_protect_flag stored in the RAM unit 24. This flag is included in play_protect ( ) of volume_information ( ) in VOLUME.TOC.

The flow of the processing then goes on to steps S72 to S75 at which the CPU 21 forms judgments as to whether volume_play_protect_flag read out at the step S71 has a value of 00, 01, 10 or 11 respectively.

To put it in detail, if the outcome of the judgment formed at the step S72 indicates that volume_play_protect flag has a value of 00, the flow of the processing proceeds to a step S77 at which the CPU 21 carries out a playback operation in accordance with a command entered by the user. That is to say, since there is no restriction on the playback operation, the operation is carries out as specified by the command.

If the outcome of the judgment formed at the step S73 indicates that volume_play_protect_flag has a value of 01, the flow of the processing proceeds to a step S78 at which the CPU 21 forms a judgment as to whether or not the user has entered a command to request a playback operation of a title. If the command specifies a playback operation of a title, the processing continues to a step S79 at which the CPU 21 controls the OSD control circuit 9 to let a message be generated to notify the user that a playback operation of a title is prohibited. The message is output through the synthesis circuit 8 and the output terminal P1 to be displayed on the display unit.

If the outcome of the judgment indicates that the command does not specify a playback operation of a title, on the other hand, the processing returns to the step S77 at which the CPU 21 carries out a playback operation in accordance with the command entered by the user. For example, a playback operation of a program is carried out.

If the outcome of the judgment formed at the step S74 indicates that volume_play_protect_flag has a value of 10, the flow of the processing proceeds to a step S80 at which the CPU 21 forms a judgment as to whether or not the user has entered a command to request a playback operation of a program. If the command specifies a playback operation of a program, the processing returns to the step S79 at which the CPU 21 controls the OSD control circuit 9 to let a message be generated to notify the user that a playback operation of a program is prohibited. If the outcome of the judgment formed at the step S80 indicates that the command does not specify a playback operation of a program, for example, if the command specifies a playback operation of a title, on the other hand, the processing returns to the step S77 at which the CPU 21 carries out a playback operation in accordance with the command entered by the user.

If the outcome of the judgment formed at the step S75 indicates that volume_play_protect_flag has a value of 11, the flow of the processing proceeds to a step S81 at which the CPU 21 forms a judgment as to whether or not the user has entered a command to request a playback operation of a title or a program. If the user has entered a command to request a playback operation of a title or a program, the flow of the processing returns to the step S79 at which the CPU 21 lets a message be generated to notify the user that the requested playback operation is prohibited. If the outcome of the judgment formed at the step S81 indicates that the command does not specify a playback operation of a title or a program, on the other hand, the processing returns to the step S77 at which the CPU 21 carries out an operation to play back data.

If the outcome of the judgment formed at the step S75 indicates that volume_play_protect_flag does not have a value of 11, on the other hand, the flow of the processing proceeds to a step S76 at which the CPU 21 carries out error processing. This is because, since the outcomes of the judgments indicate that this flag has none of values of 00, 01, 10 and 11, that is, the possible values for the flag, the error processing needs to be carried out.

As described above, an operation to play back a title or a program is controlled in accordance with the value of volume_play_protect_flag. Even if a playback operation is prohibited by a value of the flag, with a password entered, however, the playback operation can be allowed. FIG. 44 is a flowchart representing typical processing to allow a playback operation after checking an entered password even if the playback operation is prohibited by a value of the flag.

Pieces of processing carried out at steps S91 to S104 of the flowchart shown in FIG. 44 are basically the same as those of the steps S71 to S81 of the flowchart shown in FIG. 43. If the outcome of a judgment formed at a step S98 corresponding to the step S78 of the flowchart shown in FIG. 43, a step S103 corresponding to a step S80 of the flowchart shown in FIG. 43 or a step S104 corresponding to the step S81 of the flowchart shown in FIG. 43 indicates that the requested operation to play back data is prohibited by volume_play_protect_flag, the flow of the processing goes on to a step S99 at which the CPU 21 controls the OSD control circuit 9 to let a message be generated and displayed in order to request the user to enter a password. In response to the message, the user enters a password by operating the input unit 14.

The flow of the processing then proceeds to a step S100 at which the CPU 21 forms a judgment as to whether or not a password has been entered. If a password is found entered, the flow of the processing continues to a step S101 at which the CPU 21 forms a judgment as to whether or not the entered password is correct, that is, a judgment as to whether or not the password entered by the user matches the password stored in password_for_volume_play_protect. If the outcome of the judgment indicates that the entered password matches the stored password, the flow of the processing returns to a step S97 at which the CPU 21 executes the requested operation to play back data in opposition to the value of volume_play_protect_flag.

If the outcome of the judgment formed at the step S101 indicates that the entered password is not correct, on the other hand, the flow of the processing goes on to a step S102 corresponding to the step S79 of the flowchart shown in FIG. 43. At the step S102, the CPU 21 controls the OSD control circuit 9 to let a message be generated and displayed on the display unit in order to indicate that the requested playback operation is prohibited. In addition, also if the outcome of the judgment formed at the step S100 indicates that no password is entered, the message to indicate that the requested playback operation is prohibited is displayed.

The other processing is the same as that shown in FIG. 43.

Appropriate play-protect information can be recorded for a created or edited program. In this way, even if the user is allowed to freely play back titles individually, an operation to play back a program comprising a plurality of titles to be reproduced in a predetermined order can be prohibited.

Next, volume_rating ( ) shown in FIG. 6 is further explained. Much like play_protect, rating is a means or a function to classify discs in order to restrict operations to play back information from the discs. One method of implementing the rating is the use of volume_rating ( ). volume_rating ( ) is information set to limit watchers and listeners of all title or all programs recorded on the optical disc on the basis of the rating. Such information can also be set for each program or each title. The rating is exemplified below by volume_rating ( ) which is effective for all information recorded in the volume.

volume_rating_id is a descriptor used for showing that information following this descriptor is volume_rating ( ). volume_rating_length is an area used for recording the length of volume_rating ( ) expressed in terms of bytes. volume_rating_type is an area used for recording a flag representing a method of setting the rating. As shown in FIG. 45, there are three types of rating method which can be selected.

To put it in detail, a value of 00 set in this flag indicates a rating method whereby a judgment as to whether or not a watcher or a listener is allowed to play back information is formed on the basis of the age of the watcher or the listener. A value of 01 set in this flag indicates a rating method conforming to classification known as CARA established by the MPAA (Motion Picture Association of America). A value of 10 set in this flag indicates a rating method conforming to categorization established by the RSAC (Recreational Software Advisory Council).

volume_rating_password is an area used for recording a password required in modifying information on volume_rating ( ).

With a value of 00 set in volume_rating_type, a judgment as to whether or not a watcher or a listener is allowed to play back information is formed on the basis of the age of the watcher or the listener. country_code_for_rating is an area used for recording the code of a country, that is, information indicating which country the rating is applied to. age_for_volume_rating is an area used for recording an age limit. A watcher or a listener having an age at least equal to the age limit is allowed to watch or listen to video information recorded in a volume in which volume rating ( ) is recorded.

With a value of 01 set in volume_rating_type, a rating method conforming to the CARA classification is set for classifying work recorded in the volume. Video information recorded in the volume is classified into 4 categories shown in FIG. 46, namely, G, PG, PG-13 and NC17. CARA_category is an area used for recording a category of work recorded in the volume.

With a value of 10 set in volume_rating_type, a rating method conforming to the RSAC categorization is set for classifying work recorded in the volume. RSAC_category is an area used for recording one of types of categorization shown in FIG. 47, namely, Violence Rating, Nudity Rating, Sex Rating and Language Rating. On the other hand, RSAC_level is an area used for recording one of levels 0 to 4 shown in FIG. 48 for each type of categorization.

Figure 49B:
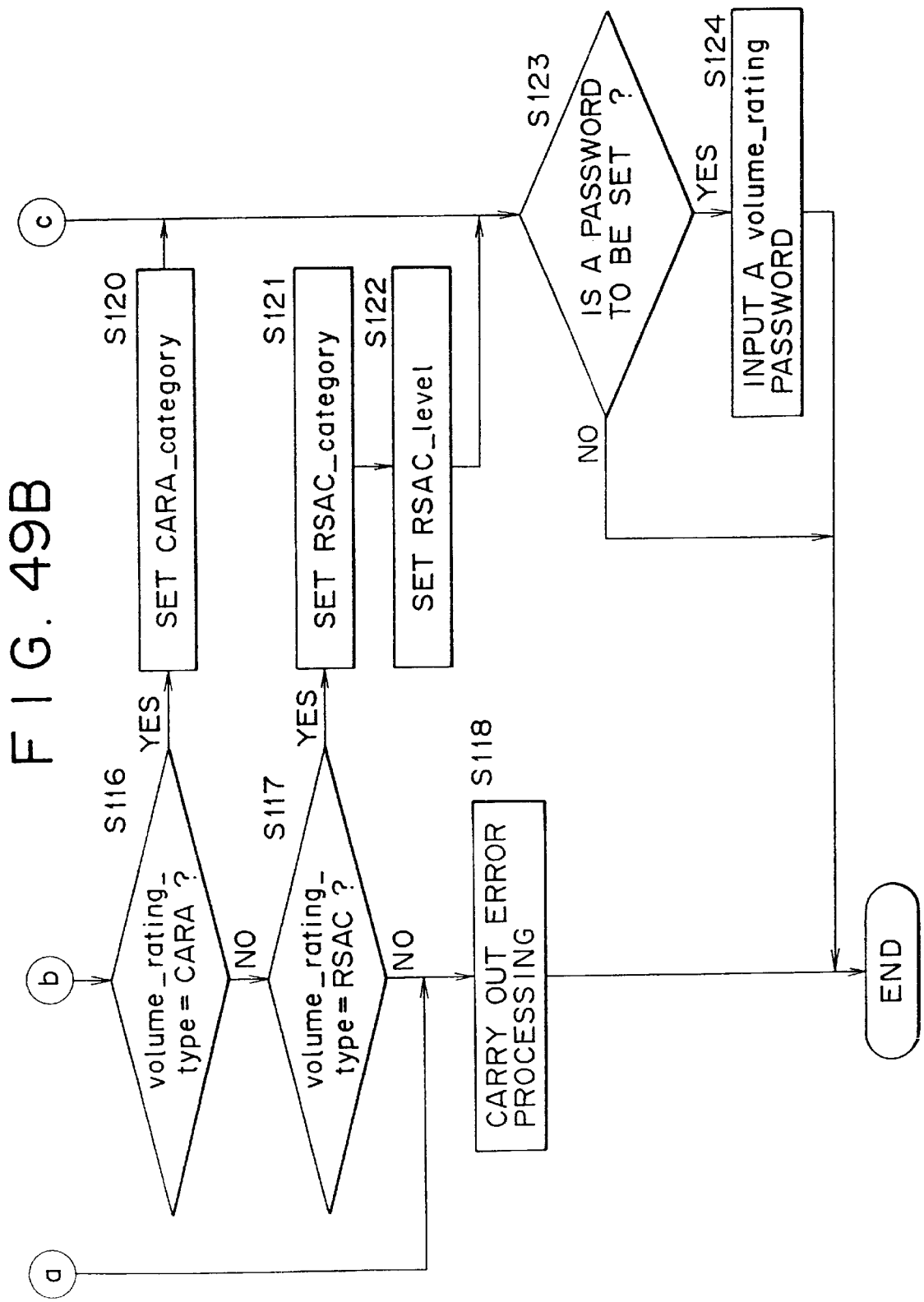

Next, processing to set volume_rating is explained by referring to a flowchart shown in FIG. 49. As shown in the figure, the processing begins with a step S111 at which the user enters a command to change volume_rating by operating the input unit 14. The flow of the processing then goes on to a step S112 at which the CPU 21 controls the OSD control circuit 9 to display a message urging the user to enter a password matching that recorded in volume_rating_password. In response to the message, the user enters a password by operating the input unit 14.

Then, the flow of the processing proceeds to a step S113 at which the CPU 21 forms a judgment as to whether or not the entered password matches that recorded in volume_rating_password. If the entered password matches that recorded in volume rating_password, the flow of the processing continues to a step S114 at which the CPU 21 controls the OSD control circuit 9 to let a message be generated to notify the user that volume_rating can be changed. This message is output to the display unit by way of the synthesis circuit 8 and the output terminal P1 to be displayed thereon. Subsequently, the flow of the processing goes on to a step S114 to let the user select a value of volume_rating_type.

If the outcome of the judgment formed at the step S113 indicates that the entered password does not match that recorded in volume_rating_password, on the other hand, the flow of the processing continues to a step S118 at which the CPU 21 controls the OSD control circuit 9 to let a message be generated and displayed on the display unit to notify the user that modification of volume_rating is prohibited. In this case, the pieces of processing carried out at the steps S114 to S117 are skipped and the user is not allowed to update the value of volume_rating.

The flow of the processing then goes on from the step S114 to a step S115 at which the CPU 21 forms a judgment as to whether or not the value of volume_rating type entered by the user is age limited. If the value of volume_rating_type is age_limited, the flow of the processing goes on to a step S119 at which the CPU 21 controls the OSD control circuit 9 to generate and display to the user an inquiry about a minimum age for limiting the age of a watcher or a listener who will be allowed to play back information recorded on the optical disc. In response to this inquiry, the user enters a command specifying a minimum age allowed to watch and listen to information played back from the volume by operating the input unit 14. The CPU 21 then sets age_for_volume_rating for the command entered by the user and further sets country_code_for_rating as well. After the processing described above has been completed, the flow proceeds to a step S123.

If the outcome of the judgment formed at the step S115 indicates that the value of volume_rating_type is not age_limited, on the other hand, the flow of the processing goes on to a step S116 at which the CPU 21 forms a judgment as to whether or not the value of volume_rating_type entered by the user is CARA. If the value of volume_rating_type is CARA, the flow of the processing continues to a step S120 at which the CPU 21 controls the OSD control circuit 9 to generate and display to the user an inquiry about a category to be set. In response to this inquiry, the user enters a command specifying a CARA category by operating the input unit 14. The CPU 21 then sets CARA_category in accordance with the command entered by the user. After the processing described above has been completed, the flow proceeds to the step S123.

If the outcome of the judgment formed at the step S116 indicates that the value of volume_rating_type is not CARA, on the other hand, the flow of the processing goes on to a step S117 at which the CPU 21 forms a judgment as to whether or not the value of volume_rating_type entered by the user is RSAC. If the value of volume_rating_type is RSAC, the flow of the processing continues to a step S121 at which the CPU 21 controls the OSD control circuit 9 to generate and display to the user an inquiry about which category defined by the RSAC is to be set. In response to this inquiry, the user enters a command specifying an RSAC category by operating the input unit 14. The CPU 21 then sets RSAC_category in accordance with the command entered by the user. Subsequently, the flow of the processing continues to a step S122 at which the CPU 21 controls the OSD control circuit 9 to generate and display to the user an inquiry about which level defined by the RSAC is to be set. In response to this inquiry, the user enters a command specifying an RSAC level by operating the input unit 14. The CPU 21 then sets RSAC_level in accordance with the command entered by the user. After the processing described above has been completed, the flow proceeds to the step S123.

At the step S123, the CPU 21 controls the OSD control circuit 9 to generate and display to the user an inquiry about whether or not volume_rating_password is to be modified. If the user enters YES by operating the input unit 14 in response to the inquiry, the flow of the processing goes on to a step S124 at which the CPU 21 controls the OSD control circuit 9 to display a message urging the user to enter a new password. In response to the message, the user enters a new password by operating the input unit 14. The CPU 21 then replaces a password recorded in volume_rating password with the new one. If the user enters NO by operating the input unit 14 in response to the inquiry issued at the step S123, on the other hand, volume_rating_password is not changed and the processing to modify volume_rating is finished.

If the outcome of the judgment formed at the step S117 indicates that the value of volume_rating_type is not RSAC either, on the other hand, the flow of the processing goes on to a step S118 at which the CPU 21 carries out error handling. This is because the value of volume_rating_type is limited to age limited, CARA and RSAC only. If the value of volume_rating type is determined to be none of them, error handling needs to be carried out.

Next, rating processing carried out during a playback operation is explained by referring to a flowchart shown in FIGS. 50 and 51. This rating processing is started by the CPU 21 along with other processing when the user inserts an optical disc 1 into an optical-disc apparatus. As shown in FIG. 50, the rating processing begins with a step S131 at which the CPU 21 reads in volume_rating ( ) recorded on the optical disc 1. To put in detail, the CPU 21 controls the optical head 2, playing back data from the optical disc 1. The data played back from the optical disc 1 is supplied to the read-in channel buffer 6 by way of the optical head 2, the RF & demodulation/modulation circuit 3, the ECC circuit 4 and the switch 5 to be once stored in the buffer 6. The data stored in the read-in channel buffer 6 is then transferred to the RAM unit 24. The CPU 21 finally reads in volume_rating ( ) from the data stored in the RAM unit 24.

The flow of the processing then goes on to a step S132 at which the CPU 21 forms a judgment as to whether or not the value of volume_rating_type included in volume_rating ( ) is age_limited. If the value of volume_rating_type included in volume_rating ( ) is age_limited, the flow of the processing proceeds to a step S136. At the step S136, the CPU 21 reads in country codes from country_code_for_rating and values of age_for_volume_rating included in volume_rating ( ) and selects a value of age_for_volume_rating for a country code set on the optical-disc apparatus.

The flow of the processing then continues to a step S137 at which the CPU 21 compares an age limit set in the optical-disc apparatus specifying the minimum age allowed to watch and listen to information played back from the optical disc 1 with the selected value of age_for_volume_rating. Then, the flow of the processing goes on to a step S142 to form a judgment as to whether or not an operation to play back information from the optical disc 1 is allowed for the age limit set in the optical-disc apparatus. If an operation to play back information from the optical disc 1 is allowed, the flow of the processing proceeds to a step S146. If the outcome of the judgment on the age limit set in the optical-disc apparatus indicates that the user is not allowed to play back information from the optical disc 1, on the other hand, the flow of the processing continues to a step S145 to display a message stating that a playback operation is prohibited and terminate the playback processing.

If the outcome of the judgment formed at the step S132 indicates that the value of volume_rating_type included in volume_rating ( ) is not age limited, on the other hand, the flow of the processing proceeds to a step S133.

At the step S133, the CPU 21 forms a judgment as to whether or not the value of volume_rating_type included in volume_rating ( ) is CARA. If the value of volume_rating_type included in volume_rating ( ) is CARA, the flow of the processing goes on to a step S138. At the step S138, the CPU 21 reads in CARA_category of volume_rating ( ). The flow of the processing then proceeds to a step S139 at which the CPU 21 compares CARA_category of volume_rating ( ) with a CARA category set in the optical-disc apparatus. Then, the flow of the processing goes on to a step S143 to form a judgment as to whether or not an operation to play back information from the optical disc 1 is allowed for the CARA category set in the optical-disc apparatus. If an operation to play back information from the optical disc 1 is allowed, the flow of the processing proceeds to the step S146. If the outcome of the judgment on the CARA category set in the optical-disc apparatus indicates that the user is not allowed to play back information from the optical disc 1, on the other hand, the flow of the processing continues to the step S145 to display a message stating that a playback operation is prohibited and terminate the playback processing.

If the outcome of the judgment formed at the step S133 indicates that the value of volume_rating_type included in volume_rating ( ) is not CARA, on the other hand, the flow of the processing proceeds to a step S134. At the step S134, the CPU 21 forms a judgment as to whether or not the value of volume_rating_type included in volume_rating ( ) is RSAC. If the value of volume_rating_type included in volume_rating ( ) is RSAC, the flow of the processing goes on to a step S140. At the step S140, the CPU 21 reads in RSAC_category and RSAC_level of volume_rating ( ). The flow of the processing then proceeds to a step S141 at which the CPU 21 compares RSAC_category and RSAC_level of volume_rating ( ) respectively with a CARA category and a CARA level set in the optical-disc apparatus. Then, the flow of the processing goes on to a step S144 to form a judgment as to whether or not an operation to play back information from the optical disc 1 is allowed for the RSAC category and the RSAC level set in the optical-disc apparatus. If an operation to play back information from the optical disc 1 is allowed, the flow of the processing proceeds to the step S146. If the outcome of the judgment on the RSAC category and the RSAC level set in the optical-disc apparatus indicates that the user is not allowed to play back information from the optical disc 1, on the other hand, the flow of the processing continues to the step S145 to display a message stating that a playback operation is prohibited and terminate the playback processing.

If the outcome of the judgment formed at the step S134 indicates that the value of volume_rating_type included in volume_rating ( ) is not RSAC either, on the other hand, the flow of the processing proceeds to a step S135 at which error handing is carried out much like the step S118 of the flowchart shown in FIG. 49.

Much like the processing shown in FIGS. 43 and 44, at the step S146, volume_play_protect_flag is checked. That is to say, when the rating is added to play_protect as a function to restrict playback operations, the rating is checked prior to the processing shown in FIGS. 43 and 44. A specified title or a specified program can not be played back from the optical disc 1 unless the results of judgments on the rating and play_protect indicate that a playback operation is allowed. In other words, if an outcome of a judgment formed in the processing to determine whether or not a playback operation is allowed on the basis of the rating or play_protect indicates that the playback operation is prohibited, an operation to play back a specified title or a specified program is not allowed.

Then, the flow of the processing goes on to a step S147. Also much like the processing shown in FIGS. 43 and 44, at the step S147, the CPU 21 forms a judgment as to whether an operation to play back information from the optical disc 1 is allowed or prohibited. If the outcome of the judgment on play_protect indicates a prohibited playback operation, the flow of the processing proceeds to the step S145. If the outcome of the judgment on play_protect indicates an allowed playback operation, on the other hand, the flow of the processing proceeds to the step S148.

At the step S148, a specified title or a specified program is played back without any further verification of protection because the title or the program has been finally judged to be information that is allowed to be played back.

As described above, the present invention is applied to an optical-disc apparatus. However, the present invention can also be applied to operations to record and play back information into and from a recording medium other than an optical disc.

It should be noted that, as a presentation medium for presenting computer programs to be executed to carry out the processing described above to the user, communication media such as a network and a satellite can be utilized in addition to recording media like a magnetic disc, a CD-ROM and a solid-state memory device.

In the recording apparatus, the recording method, the presentation medium and the recording medium according to the present invention, prohibition of a write operation over a combination of pieces of data is specified. As a result, operatability of the recording apparatus can be improved.

In the recording/playback apparatus, the recording/playback method and the presentation medium according to the present invention, specifying information stating prohibition of an overwrite operation for a combination of pieces of data is recorded into a recording medium, the specifying information for a piece of data subjected to a recording operation in accordance with a command is played back from the recording medium, and an operation to record the piece of data into the recording medium is controlled in accordance with a result of a judgment formed on the specifying information played back from the recording medium.

As a result, operatability of the recording/playback apparatus for recording and playing back data can be improved.

In the playback apparatus, the recording playback method and the presentation medium according to the present invention, an operation to play back data from a recording medium is controlled in accordance with a prescribed regulation as to whether or not the operation to play back the data recorded in the recording medium is allowed. As a result, a person recording data is capable of controlling an operation to play back the data.

A recording medium according to the present invention is also used for recording specifying information for specifying whether or not an operation to play back the data is prohibited. As a result, it is possible to provide a recording medium that allows a person recording data to control an operation to play back the data from the medium.

In the recording apparatus, the recording method and the presentation medium according to the present invention, a prescribed regulation as to whether or not to prohibit an operation to play back data recorded in a recording medium is recorded in the recording medium. As a result, it is possible to provide a recording medium that allows a person recording data to control an operation to play back the data from the medium.

In the recording/playback apparatus, the recording/playback method and the presentation medium according to the present invention, specifying information specifying whether or not to prohibit an operation to play back data recorded in a recording medium is recorded into the recording medium, the specifying information for data subjected to a playback operation in accordance with a command is played back from the recording medium, and an operation to play back data from the recording medium is controlled in accordance with a result of a judgment formed on the specifying information played back from the recording medium.

As a result, a person recording data is capable of controlling an operation to play back the data from the recording medium with a high degree of reliability.

What is claimed is:

1. A recording medium having recorded thereon a plurality of data units as well as specifying information for specifying that a write operation over data units of a first type is permitted while a write operation over data units of a second type is prohibited.

2. The recording medium of claim 1, wherein each of said data units of a second type is a combination of said data units of a first type.

3. The recording medium of claim 1, wherein said data units of a first type are each files of a first type, and said data units of a second type are files that are each a combination of said files of a first type.

4. The recording medium of claim 1, further having recorded thereon specifying information specifying a term of validity of each prohibition of a write operation.

5. A recording/playback apparatus for recording and playing back a plurality of data units into and from a recording medium, said recording/playback apparatus comprising:

recording means for recording specifying information for specifying that a write operation over data units of a first type is permitted while a write operation over data units of a second type is prohibited;

playback means for playing back said specifying information for a data unit subjected to a recording operation in accordance with a command; and control means for controlling an operation to record data units into said recording medium in accordance with the specifying information played back by said playback means.

6. The recording/playback apparatus of claim 5, wherein each of said data units of a second type is a combination of said data units of a first type.

7. The recording/playback apparatus of claim 5, wherein said data units of a first type are each files of a first type, and said data units of a second type are files that are each a combination of said files of a first type.

8. The recording/playback apparatus of claim 5, wherein said recording means further records specifying information that specifies a term of validity of each prohibition of a write operation, and said control means controls said operation to record data units further in accordance with said term of validity.

9. A recording/playback method for use in a recording/playback apparatus for recording and playing back a plurality of data units into and from a recording medium, said recording/playback method comprising the steps of:
   recording specifying information for specifying that a write operation over data units of a first type is permitted while a write operation over data units of a second type is prohibited;
   playing back said specifying information for a data unit subjected to a recording operation in accordance with a command; and
   controlling an operation to record data units into said recording medium in accordance with the specifying information played back in said playing back step.

10. The recording/playback method of claim 9, wherein each of said data units of a second type is a combination of said data units of a first type.

11. The recording/playback method of claim 9, wherein said data units of a first type are each files of a first type, and said data units of a second type are files that are each a combination of said files of a first type.

12. The recording/playback method of claim 9, further comprising:
   recording specifying information that specifies a term of validity of each prohibition of a write operation; and
   in response to a command to perform a recording operation for subsequent data units, overwriting a recorded data unit if said term of validity therefor has expired, and preventing overwriting of said recorded data unit if said term of validity has not yet expired.

13. A presentation medium for-presenting a program readable by a computer for execution to cause a recording/playback apparatus for recording and playing back a plurality of data units into and from a recording medium to carry out processing comprising the steps of:
   recording specifying information for specifying that a write operation over data units of a first type is permitted while a write operation over data units of a second type is prohibited;
   playing back said specifying information for a data unit subjected to a recording operation in accordance with a command; and
   controlling an operation to record data units into said recording medium in accordance with the specifying information played back in said playing back step.

14. The presentation medium of claim 13, wherein each of said data units of a second type is a combination of said data units of a first type.

15. The presentation medium of claim 13, wherein said data units of a first type are each files of a first type, and said data units of a second type are files that are each a combination of said files of a first type.

16. The presentation medium of claim 13, wherein said processing further comprises the steps of:
   recording specifying information specifying a term of validity of each prohibition of a write operation; and
   in response to a command to perform a recording operation for subsequent data units, overwriting a recorded data unit if said term of validity therefor has expired, and preventing overwriting of said recorded data it if said term of validity has not yet expired.

17. A recording apparatus for recording data into a recording medium, said recording apparatus comprising:
   specifying means for specifying whether or not an operation to play back individual data units from said recording medium is allowed while an operation to play back a predetermined combination of said data units is prohibited; and
   recording means for recording what is specified by said specifying means into said recording medium.

18. The recording apparatus of claim 17, wherein said specifying means further specifies a term of validity of a playback prohibition.

19. A recording method for use in a recording apparatus for recording data into a recording medium, said recording method comprising the steps of:
   specifying whether or not an operation to play back individual data units from said recording medium is allowed while an operation to play back a predetermined combination of said data units is prohibited; and
   recording what is specified at said specifying step onto said recording medium.

20. The recording method of claim 19, further comprising specifying a term of validity of a playback prohibition and recording said term of validity onto said recording medium.

21. A presentation medium for presenting a program readable by a computer for execution to cause a recording apparatus for recording data onto a recording medium to carry out processing comprising the step of:
   specifying whether or not an operation to play back individual data units from said recording medium is allowed while an operation to play back a predetermined combination of said data units is prohibited; and
   recording what is specified at said specifying step onto said recording medium.

22. The presentation medium of claim 21, wherein said processing further comprises specifying a term of validity of a playback prohibition and recording said term of validity onto said recording medium.

23. A recording/playback apparatus for recording and playing back data into and from a recording medium, said recording/playback apparatus comprising:
   recording means for recording specifying information that specifies whether or not an operation to play back individual data units from said recording medium is allowed while an operation to play back a predetermined combination of said data units is prohibited; and
   playback means for playing back said specifying information for data subjected to a playback operation in accordance with a command; and
   control means for controlling an operation to play back data from said recording medium in accordance with the specifying information played back by said playback means.

24. The recording/playback apparatus of claim 23, wherein said recording means further records a term of validity of a playback prohibition, and said control means controls the operation to playback data from said recording medium further in accordance with said term of validity which is played back by said playback means.

25. A recording/playback method for use in a recording/playback apparatus for recording and playing back data into and from a recording medium, said recording/playback method comprising:

recording specifying information that specifies whether or not an operation to play back individual data units from said recording medium is allowed while an operation to play back a predetermined combination of said data units is prohibited; and playing back said specifying information for data subjected to a playback operation in accordance with a command; and controlling an operation to play back data from said recording medium in accordance with the specifying information played back by said playback means.

26. The recording/playback method of claim 25, wherein said processing further comprises recording a term of validity of a playback prohibition, playing back said term of validity, and said controlling said operation to play back data from said recording medium further in accordance with said played back term of validity.

27. A presentation medium for presenting a program readable by a computer for execution to cause a recording/playback apparatus for recording and playing back data into and from a recording medium to carry out processing comprising the steps of:

recording specifying information that specifies whether or not an operation to play back individual data units from said recording medium is allowed while an operation to play back a predetermined combination of said data units is prohibited;

playing back said specifying information for data subjected to a playback operation in accordance with a command; and controlling an operation to play back data from said recording medium in accordance with the specifying information played back by said playback means.

28. The presentation medium of claim 27, wherein said processing further comprises recording a term of validity of a playback prohibition, playing back said term of validity, and said controlling said operation to play back data from said recording medium further in accordance with said played back term of validity.

29. A recording method for recording a plurality of data units onto a recording medium, comprising the steps of:

specifying that a write operation over at least one of said data units is prohibited;

specifying a term of validity of each prohibition of a write operation; and recording said specified write operation prohibition and term of validity on said recording medium along with said data units.

30. A recording apparatus for recording a plurality of data streams on a recording medium, comprising:

a recording unit for recording a data stream and playback control information designating a predetermined segment selected from the data stream or the connection of a plurality of data streams on the recording medium;

a reproduction unit for reproducing additional information indicative of whether overwriting and/or deletion of each playback control information is permitted or not from the recording medium; and a controller for controlling the overwriting and or deletion of the playback control information according to said additional information.

31. The recording apparatus of claim 30, further comprising:

a user interface for inputting a password;

wherein said controller controls overwriting of the additional information according to certification results of the input password.

32. The recording apparatus of claim 30, wherein said controller permits the overwriting and/or deletion of the playback control information and prohibits the overwriting of the data stream according to the additional information.

33. The recording apparatus of claim 30, wherein when a user tries to overwrite and/or delete the playback control information being prohibited, the controller controls an onscreen display control circuit to provide an alarm presentation to the user.

34. A recording method for recording a plurality of data streams on a recording medium, comprising the steps of:

recording a data stream and playback control information designating a predetermined segment selected from the data stream or the connection of a plurality of data streams on the recording medium;

reproducing additional information indicative of whether overwriting and/or deletion of each playback control information is permitted or not from the recording medium; and controlling the overwriting and/or deletion of the playback control information according to said additional information.

35. The recording method of claim 34, further comprising:

inputting a password via user interface;

wherein overwriting of the additional information is controlled according to certification results of the input password.

36. The recording method of claim 34, wherein said controlling permits the overwriting and/or deletion of the playback control information and prohibits the overwriting of the data stream according to the additional information.

37. The recording method of claim 34, wherein when a user tries to overwrite and/or delete the playback control information being prohibited, an onscreen alarm is presented to the user.

38. A presentation medium for presenting a program readable by a computer for execution to cause a recording apparatus for recording data onto a recording medium to carry out processing comprising the steps of:

recording a data stream and playback control information designating a predetermined segment selected from the data stream or the connection of a plurality of data streams on the recording medium;

reproducing additional information indicative of whether overwriting and/or deletion of each playback control information is permitted or not from the recording medium; and controlling the overwriting and/or deletion of the playback control information according to said additional information.

39. The presentation medium of claim 38, wherein said processing further comprises:

inputting a password via a user interface;

wherein overwriting of the additional information is controlled according to certification results of the input password.

40. The presentation medium of claim 38, wherein the processing permits the overwriting and/or deletion of the playback control information and prohibits the overwriting of the data stream according to the additional information.

41. The presentation medium of claim 38, wherein the processing causes an onscreen alarm to be presented to a user when the user tries to overwrite and/or delete the playback control information being prohibited.

42. A recording medium readable by a machine, said recording medium having recorded thereon:
   a plurality of data streams;
   playback control information designating a predetermined segment selected from a respective one of said data streams or the connection of a plurality of said data streams on the recording medium; and
   additional information indicative of whether or not overwriting and/or deletion of each playback control information is permitted from the recording medium.

43. The recording medium of claim 42, wherein when a user inputs a password via a user interface of said machine, overwriting of the additional information is controlled according to certification results of the input password.

44. The recording medium of claim 42, wherein the overwriting and/or deletion of the playback control information is permitted whilst the overwriting of the data stream according to the additional information is prohibited.

45. The recording medium of claim 42, wherein the machine causes an onscreen alarm to be presented to user when the user tries to overwrite and/or delete the playback control information being prohibited.

46. A reproducing apparatus for reproducing data streams from a recording medium, comprising:
   a reproducing unit for reproducing a data stream, playback control information designating a predetermined segment selected from the data stream or the connection of a plurality of data streams, and additional information indicative of whether overwriting and/or deletion of each playback control information is permitted or not from the recording medium; and
   a controller for controlling the reproduction of the data stream designated by the playback control information according to said additional information.

47. The reproducing apparatus of claim 46, further comprising:
   a user interface for inputting a password;
   wherein said controller controls the reproduction of the data stream designated by the playback control information according to a certification of said password.

48. The reproducing apparatus of claim 46, wherein when a user tries to play the data stream designated by the playback control information being prohibited, the controller controls an onscreen display control circuit to provide an alarm presentation to the user.

49. A reproducing method for reproducing data streams from a recording medium, comprising:
   reproducing a data stream, playback control information designating a predetermined segment selected from the data stream or the connection of a plurality of data streams, and additional information indicative of whether overwriting and/or deletion of each playback control information is permitted or not from the recording medium; and
   controlling the reproduction of the data stream designated by the playback control information according to said additional information.

50. The reproducing method of claim 49, further comprising:
   inputting a password via a user interface;
   wherein the reproduction of the data stream designated by the playback control information is controlled according to a certification of said password.

51. The reproducing method of claim 49, wherein when a user tries to play the data stream designated by the playback control information being prohibited, an onscreen alarm is presented to the user.

52. A presentation medium for presenting a program readable by a computer for execution to cause a reproducing apparatus for reproducing data from a recording medium to carry out processing comprising the steps of:
   reproducing a data stream, playback control information designating a predetermined segment selected from the data stream or the connection of a plurality of data streams, and additional information indicative of whether overwriting and/or deletion of each playback control information is permitted or not from the recording medium; and
   controlling the reproduction of the data stream designated by the playback control information according to said additional information.

53. The presentation medium of claim 52, wherein said processing further comprises reading an input password inputted via a user interface;
   wherein the reproduction of the data stream designated by the playback control information is controlled according to a certification of said password.

54. The presentation medium of claim 52, wherein when a user tries to play the data stream designated by the layback control information being prohibited, said processing causes an onscreen alarm to be presented to the user.

* * * * *